United States Patent
Icho et al.

(10) Patent No.: US 8,144,196 B2
(45) Date of Patent: Mar. 27, 2012

(54) DISPLAY, DISPLAY METHOD, AND DISPLAY PROGRAM

(75) Inventors: Keiji Icho, Osaka (JP); Masayuki Misaki, Hyogo (JP); Takashi Kawamura, Kyoto (JP); Kuniaki Isogai, Osaka (JP); Noriaki Horii, Osaka (JP)

(73) Assignee: Panasonic Corporation, Osaka (JP)

( * ) Notice: Subject to any disclaimer, the term of this patent is extended or adjusted under 35 U.S.C. 154(b) by 384 days.

(21) Appl. No.: 12/596,918

(22) PCT Filed: Apr. 30, 2008

(86) PCT No.: PCT/JP2008/001120
§ 371 (c)(1),
(2), (4) Date: Oct. 21, 2009

(87) PCT Pub. No.: WO2008/139717
PCT Pub. Date: Nov. 20, 2008

(65) Prior Publication Data
US 2010/0134626 A1 Jun. 3, 2010

(30) Foreign Application Priority Data
May 9, 2007 (JP) .................................. 2007-124219

(51) Int. Cl.
*G09G 5/00* (2006.01)
(52) U.S. Cl. ........................................ 348/158; 345/619
(58) Field of Classification Search .............. 348/14.07, 348/158, 333.05, 739; 345/619
See application file for complete search history.

(56) References Cited

U.S. PATENT DOCUMENTS

| 5,819,202 A | 10/1998 | Sato et al. |
| 5,966,132 A * | 10/1999 | Kakizawa et al. ............. 345/419 |
| 7,173,632 B2 * | 2/2007 | Inokuchi et al. .............. 345/619 |
| 2004/0080510 A1 * | 4/2004 | Inokuchi et al. .............. 345/440 |
| 2005/0078184 A1 | 4/2005 | Sakai et al. |
| 2007/0124695 A1 * | 5/2007 | Brodie et al. ................. 715/781 |
| 2009/0150772 A1 * | 6/2009 | Noda et al. .................... 715/277 |
| 2009/0273687 A1 * | 11/2009 | Tsukizawa et al. ......... 348/222.1 |

FOREIGN PATENT DOCUMENTS
EP 0 512 543 11/1992
(Continued)

OTHER PUBLICATIONS

International Search Report issued Jun. 3, 2008 in International (PCT) Application No. PCT/JP2008/001120.

*Primary Examiner* — Moustafa M Meky
(74) *Attorney, Agent, or Firm* — Wenderoth, Lind & Ponack, L.L.P.

(57) ABSTRACT

The present invention aims to provide a display device that can display relationships between a plurality of users in an easy-to-visually-acknowledge manner.
The present invention is a system composed of a data sensing unit 1, a positional relationship detection unit 2, a user groping unit 3, and a positional relationship display unit 4. The user grouping unit 3 groups the users into a plurality of groups based on information pieces relating to positional relationships between the users, which are detected by the positional relationship detection unit 2. Based on information pieces relating to the groups extracted by the user grouping unit 3, the positional relationship display unit 4 arranges and displays the groups on a screen in conformity with a positional relationship between the groups.

21 Claims, 37 Drawing Sheets

FOREIGN PATENT DOCUMENTS

| | | |
|---|---|---|
| EP | 0 587 115 | 3/1994 |
| JP | 6-67726 | 3/1994 |
| JP | 6-111197 | 4/1994 |
| JP | 9-6432 | 1/1997 |
| JP | 2001-184493 | 7/2001 |
| JP | 2003-150639 | 5/2003 |
| JP | 2005-117542 | 4/2005 |
| WO | 2006/028154 | 3/2006 |

* cited by examiner (i)　　　　　　(ii)　　　　　　(iii)

DISPLAY, DISPLAY METHOD, AND DISPLAY PROGRAM

TECHNICAL FIELD

The present invention relates to a technique to construct an interface for displaying relationships between a plurality of users in an easy-to-visually-acknowledge manner compared to conventional techniques.

BACKGROUND ART

Recently, in the field of position display technology, there are several techniques to display a position of a person or a running vehicle in a room or on a map. For instance, there is a technique to acquire a current position (i.e., absolute position) of a running unattended vehicle (see Patent Document 1). According to this technique, the unattended vehicle runs in a predetermined area covered by a ceiling, to certain parts of which devices to display absolute positions thereof are attached. An infrared imaging device mounted on the body of the vehicle can take an image of the ceiling above the vehicle, and acquire a corresponding one of the absolute positions. Also, there is a technique to display, on a map presented on a display device, a position of a delivery destination. This technique is, specifically, a delivery navigation system using an electronic baggage tag composed of a response circuit that stores and transmits delivery information (see Patent Document 2). Furthermore, there is a monitoring system for (i) referring to images taken by at least one of a plurality of cameras so as to detect people captured in the images, and (ii) adjusting the ranges of scenes that can be imaged by the cameras (see Patent Document 3).

Patent Document 1: Japanese Unexamined Patent Application Publication No. H06-67726
Patent Document 2: Japanese Unexamined Patent Application Publication No. H06-111197
Patent Document 3: Japanese Unexamined Patent Application Publication No. 2005-117542

DISCLOSURE OF THE INVENTION

Problem to be Solved by the Invention

The above techniques are merely mapping the absolute position of a user or a running vehicle in a room or on a map. Considering that a screen size is limited, if a positional relationship between a plurality of users (hereinafter, "between-user positional relationship") is displayed even though the users are scattered in a large area and distant from one another, it will be difficult to visually acknowledge details of the between-user positional relationship.

On the other hand, if only a part of the large area in which the users are scattered is displayed, it will be easy to visually acknowledge a positional relationship between users who exist in said part of the area. This, however, leaves a positional relationship between users who exist in other parts of the area undisplayed, thus making it impossible to grasp a positional relationship between all users.

The present invention is made to solve the above problem. It is an object of the present invention to provide a display device, a display method and a display program that can display between-user positional relationships in an easy-to-visually-acknowledge manner.

Means to Solve the Problem

To solve the above problem, the present invention is a display device for visually displaying, on a display screen, positional relationships between a plurality of target objects, the display device comprising: an acquisition unit operable to acquire position information pieces each of which indicates a position of a corresponding one of the target objects; a categorization unit operable to categorize the target objects into a plurality of groups in accordance with the acquired position information pieces; a calculation unit operable to calculate an inter-group positional relationship by using the acquired position information pieces, the inter-group positional relationship indicating a positional relationship between the groups; a determination unit operable to determine one or more partitions by which the display screen is partitioned into a plurality of areas, each partition being tilted with respect to a reference axis in accordance with the calculated inter-group positional relationship, the reference axis being parallel to one of edges of the display screen; and a display unit operable to display, in each of the areas partitioned by the one or more partitions on the display screen, a positional relationship between the target objects belonging to a corresponding one of the groups.

The present invention also provides a display method and a display program to be used in the above display device.

The above display device is, for example, a device shown in FIG. 36 or 37. The "target objects" may be "users" (i.e., humans) that will be explained in the following Embodiments and modification examples, vehicles (e.g., cars and bicycles), livestock, wild animals, and the like. The functions of the "acquisition unit" are achieved by a data sensing unit 1 and a positional relationship detection unit 2, which will be explained in Embodiment 1 below. The functions of the "categorization unit" are achieved by a user grouping unit 3. The functions of the "calculation unit" are achieved by a reference axis setting subunit 401, a group information analysis subunit 402, and an inter-group relationship analysis subunit 403. The functions of the "determination unit" are achieved by a screen allocation ratio calculation subunit 404, an on-screen arrangement position calculation subunit 405, and an on-screen partition calculation subunit 406. The functions of the "display unit" are achieved by an allocation display calculation subunit 407 and a screen display subunit 408.

Effects of the Invention

According to the above structure, the calculation unit calculates an inter-group positional relationship indicating a positional relationship between the groups, the determination unit determines one or more partitions each of which is tilted in accordance with the calculated inter-group positional relationship, and the display unit displays, in each of the areas partitioned by the one or more partitions on the display screen, a positional relationship between the target objects belonging to a corresponding one of the groups. The above structure therefore makes it easy to visually acknowledge the positional relationship between the target objects belonging to each group. Furthermore, as the one or more partitions, by which the display screen is partitioned into the plurality of areas, are each tilted in accordance with the inter-group positional relationship, the above structure has an outstanding effect of making it possible to visually acknowledge the inter-group positional relationship as well.

In the above display device, the calculation unit may further calculate (i) two group positions that respectively indicate positions of two of the groups, and (ii) an angle of tilt of a first straight line with respect to the reference axis, the first straight line being perpendicular to a second straight line connecting between the two group positions, and the determination unit may determine the one or more partitions so that one of the one or more partitions that is to be displayed between the two groups has the calculated angle of tilt with respect to the reference axis.

According to the above structure, each partition has an angle of tilt that is the same as an angle formed between (i) the reference axis and (ii) the first straight line that is perpendicular to the second straight line connecting between positions of a corresponding one of group pairs. This makes it possible to visually acknowledge the inter-group positional relationship with higher accuracy.

Also, the determination unit may determine the one or more partitions so that a size of each area on the display screen is proportional to an areal size of the corresponding group.

The above structure makes it easy to visually acknowledge the areal size of each group, based on the size of the corresponding area on the display screen to which the group is allocated. Here, the "areal size" of each group may denote the number of the target objects belonging to the group, or a size of an actual area occupied by the target objects belonging to the group (e.g., the smallest circle including all of the target objects belonging to the group, or the radius of such a smallest circle).

Also, the inter-group positional relationship calculated by the calculation unit may further indicate, for each pair of the groups, a distance therebetween, and the determination unit may determine the one or more partitions so that a width of each partition that is to be displayed between a corresponding one of the group pairs is proportional to the distance between the corresponding group pair.

The above structure makes it easy to visually acknowledge the distance between each group pair based on the width of the partition displayed therebetween.

Also, the display unit may display the positional relationship between the target objects belonging to each group at a different reduction ratio. The display unit may further display, in each area on the display screen, information indicating a reduction ratio at which the corresponding group is displayed.

The above structure has an outstanding effect of making it easy to visually recognize differences between the sizes of the groups, even when each group is displayed on the display screen at a different reduction ratio.

Also, the categorization unit may further calculate a distance between each pair of the target objects by using the position information pieces, and categorize the target objects into the plurality of groups so that, in each group, the calculated distance between any pair of the target objects belonging to the group is smaller than a threshold value.

According to the above structure, a plurality of target objects that are positioned close to one another can be categorized into the same group. Therefore, the above structure has an outstanding effect of explicitly displaying the positional relationship between the target objects constituting each group, especially in a case where the target objects are scattered distant from each other.

Also, the acquisition unit may further acquire direction information pieces each of which indicates a direction that the corresponding target object is facing. The categorization unit may further calculate a distance between each pair of the target objects by using the position information pieces, and categorize the target objects into the plurality of groups so that the following conditions are both satisfied in each group: (i) the calculated distance between any pair of the target objects belonging to the group is smaller than a threshold value; and (ii) extended lines of the directions that the target objects belonging to the group are facing intersect with one another.

According to the above structure, the target objects are categorized into the groups by using not only the distances between the target objects, but also the direction information pieces. This makes it possible to extract, for example, a group of target objects that are having a conversation, facing one another.

Also, the above display device may further comprise: a sound acquisition unit operable to acquire sound made by each target object; and a sound information analysis unit operable to perform time-domain analysis and frequency-domain analysis on each sound acquired, wherein the display unit further generates images respectively in accordance with results of the analyses made by the sound information analysis unit, and displays each image in one of the areas on the display screen where the corresponding target object is displayed.

According to the above structure, the display unit generates images respectively in accordance with results of the analyses made by the sound information analysis unit, and displays each image in one of the areas on the display screen where the corresponding target object is displayed. Therefore, the above structure makes it possible to visually acknowledge, in one glance, information pieces relating to the sounds made by the target objects belonging to each group, in addition to the positional relationship between the target objects constituting each group.

Also, in the above display device, (i) the sound information analysis unit further extracts, from each sound acquired, a characteristic thereof, (ii) each of the results of the analyses made by the sound information analysis unit shows the characteristic of the sound made by the corresponding target object, and (iii) the display unit further displays each image, which indicates the characteristic of the sound made by the corresponding target object, in one of the areas on the display screen where the corresponding target object is displayed.

The above structure makes it easy to visually acknowledge the characteristic of the sound (voice) made by each target object.

Also, by using each sound acquired, the sound information analysis unit may further generate, for each group, a conversation activity level indicating how actively conversations are made between the target objects belonging to the group. Each of the results of the analyses made by the sound information analysis unit may show the conversation activity level calculated for the corresponding group. The display unit may further display each image, which indicates the conversation activity level calculated for the corresponding group, in one of the areas on the display screen where the corresponding group is displayed.

The above structure makes it easy to visually acknowledge how actively conversations are made in each group.

Also, in the above display device, the acquisition unit further acquires direction information pieces each of which indicates a direction that the corresponding target object is facing. Here, the display device further comprises: a calculation target position acquisition unit operable to acquire calculation target positions whose attention levels are to be respectively calculated, each attention level indicating to what extent a corresponding one of the calculation target positions is attracting attention from the target objects; and an attention level calculation unit operable to calculate the attention level of each calculation target position in accordance with (i) the directions indicated by the direction information pieces and (ii) a distance between the calculation target position and each of the positions indicated by the position information pieces, wherein the display unit further displays, on the display screen, the calculation target positions in such a manner that each calculation target position is highlighted according to the attention level thereof.

The above structure makes it possible to visually acknowledge one or more positions to which the target objects are paying attention, and the attention level of each of the one or more positions.

Also, in the above display device, each target object may carry a camera, and the attention level calculation unit may further identify, for each calculation target position, at least one of the target objects whose camera has an angle of view including the calculation target position. Here, the attention level of each calculation target position is higher as (i) the distance between the calculation target position and the at least one target object identified therefor is smaller, and (ii) an absolute value of an angle between (a) a bisector of the angle of view of the camera carried by the at least one target object and (b) a line connecting between the calculation target position and the at least one target object is smaller.

It is considered that each target object is paying more attention to an object that is close to the target object and is on the central line of the field of view possessed by the target objects than to an object that is not. Accordingly, considering that the bisector of the angle of view of each camera is the central line of the field of view possessed by the corresponding target object, the above structure makes it easy to visually acknowledge a position to which may target objects are paying attention, by calculating the attention levels with higher accuracy and displaying the calculated attention levels on the display screen.

Also, the calculation target position acquisition unit may acquire the positions of the target objects respectively as the calculation target positions.

The above structure makes it easy to visually acknowledge one or more of the target objects that are attracting attention from other target objects.

Also, when each of the calculated attention levels is higher than a predetermined value, the display unit may display the corresponding calculation target position on the display screen in such a manner that the corresponding target position is highlighted.

According to the above structure, one or more positions that are attracting great attention from the target objects can be explicitly displayed Also, the above display device may further comprise a repetition control unit operable to cause the acquisition unit, the categorization unit, the calculation unit, the determination unit, and the display unit to respectively repeat the acquisition of position information pieces, the categorization of the target objects, the calculation of an inter-group positional relationship, the determination of one or more partitions, and the display of each partition, groups, and a positional relationship between the target objects belonging to each group.

The above structure makes it possible to visually acknowledge (i) temporal changes in the inter-group positional relationship, and (ii) temporal changes in the positional relationship between the target objects belonging to each group.

The present invention is also a display device for visually displaying, on a display screen, positional relationships between a plurality of target objects, the display device comprising: an acquisition unit operable to acquire (i) position information pieces each of which indicates a position of a corresponding one of the target objects, and (ii) direction information pieces each of which indicates a direction that the corresponding target object is facing; a calculation target position acquisition unit operable to acquire calculation target positions whose attention levels are to be respectively calculated, each attention level indicating to what extent a corresponding one of the calculation target positions is attracting attention from the target objects; an attention level calculation unit operable to calculate the attention level of each calculation target position in accordance with (i) the positions indicated by the position information pieces and (ii) the directions indicated by the direction information pieces; and a display unit operable to display, on the display screen, (i) the positional relationships between the target objects and (ii) the calculation target positions in such a manner that the calculation target positions are highlighted according to the attention levels thereof.

The above structure makes it easy to visually acknowledge one or more positions to which the target objects are paying attention, and the attention level of each of the one or more positions.

Also, in the above display device, each target object may carry a camera, and the attention level calculation unit may further identify, for each calculation target position, at least one of the target objects whose camera has an angle of view including the calculation target position. Here, the attention level of each calculation target position is higher as (i) the distance between the calculation target position and the at least one target object identified therefor is smaller, and (ii) an absolute value of an angle between (a) a bisector of the angle of view of the camera carried by the at least one target object and (b) a line connecting between the calculation target position and the at least one target object is smaller.

It is considered that each target object is paying more attention to an object that is close to the target object and is on the central line of the field of view possessed by the target objects than to an object that is not. Accordingly, considering that the bisector of the angle of view of each camera is the central line of the field of view possessed by the corresponding target object, the above structure makes it possible to determine the attention levels with higher accuracy.

Also, the calculation target position acquisition unit may acquire the positions of the target objects respectively as the calculation target positions.

The above structure has an outstanding effect of making it easy to visually acknowledge which one or more of the target objects are attracting attention from other target objects.

Also, when each of the calculated attention levels is higher than a predetermined value, the display unit may display the corresponding calculation target position on the display screen in such a manner that the corresponding target position is highlighted.

According to the above structure, one or more positions that are attracting great attention from the target objects can be explicitly displayed.

DESCRIPTION OF NUMERICAL REFERENCES

Figure 1:
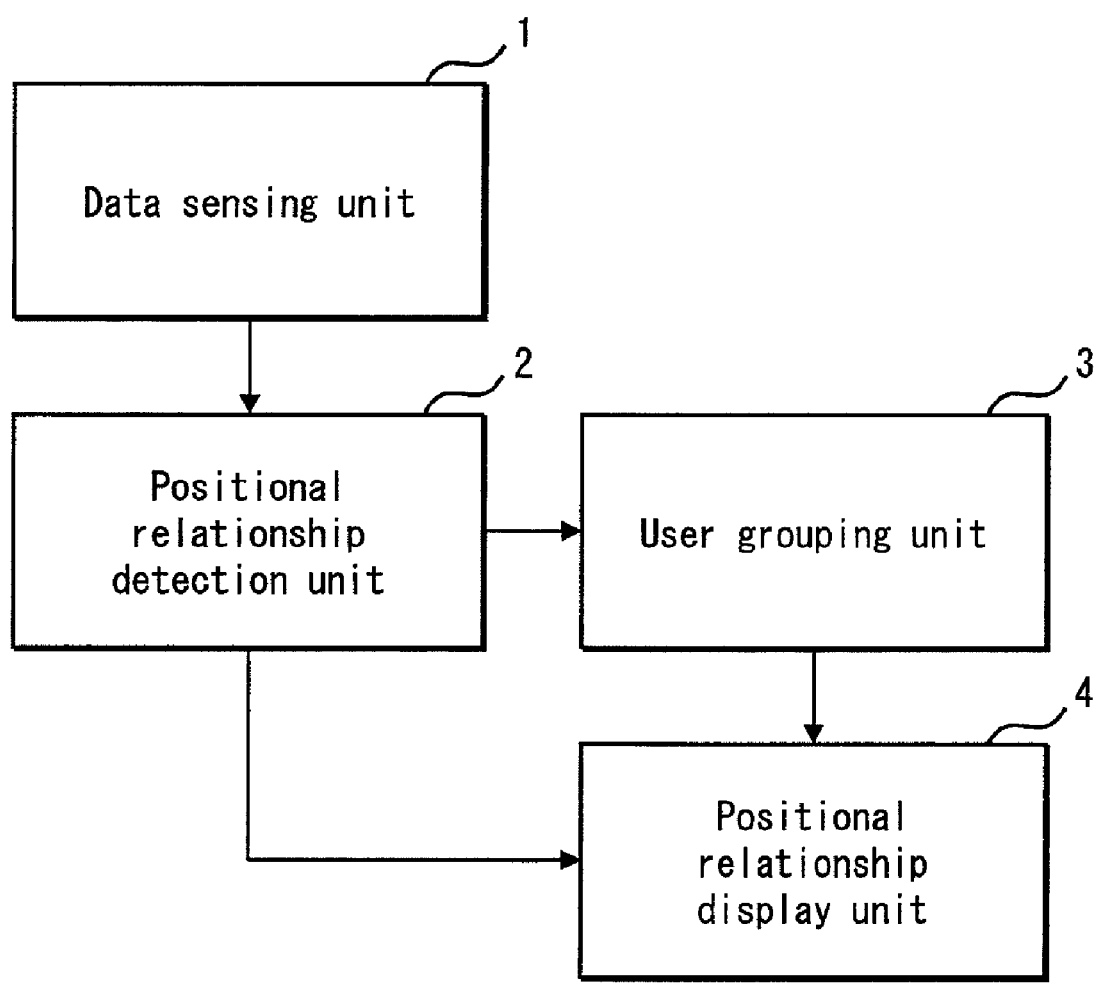
FIG. 1 is a functional block diagram of the structure of a system pertaining to Embodiment 1 of the present invention, the system (i) detecting between-user positional relationships from data pieces sensed, and (ii) accordingly displaying the detected positional relationships.

1 Data sensing unit
2 Positional relationship detection unit
3 User grouping unit
4 Positional relationship display unit
5 Sound information analysis unit
6 Attention level calculation unit
7 Positional relationship display unit
401 Reference axis setting subunit
402 Group information analysis subunit
403 Inter-group relationship analysis subunit
404 Screen allocation ratio calculation subunit
405 On-screen arrangement position calculation subunit
406 On-screen partition calculation subunit
407 Allocation display calculation subunit
408 Screen display subunit
501 Time domain information analysis subunit
502 Frequency domain information analysis subunit
503 Conversation display information calculation subunit
504 Group conversation activity level calculation subunit
1000 Terminal device
2001 STB device
2002 TV device

BEST MODE FOR CARRYING OUT THE INVENTION

The following describes embodiments of the present invention with reference to the accompanying drawings.

1. Embodiment 1

FIG. 1 shows the structure of a system pertaining to Embodiment 1 of the present invention, the system (i) detecting between-user positional relationships from data pieces sensed, and (ii) accordingly displaying the detected positional relationships. As shown in FIG. 1, this system is composed of a data sensing unit 1, a positional relationship detection unit 2, a user grouping unit 3, and a positional relationship display unit 4.

The data sensing unit 1 senses data pieces for detecting positional relationships, by using sensors (e.g., cameras and microphones) worn/carried by the users, sensors attached to environmental infrastructures, or the like. The positional relationship detection unit 2 detects the between-user positional relationships based on the data pieces sensed by the data sensing unit 1. The user grouping unit 3 groups the users into a plurality of groups based on information pieces relating to the between-user positional relationships, which are detected by the positional relationship detection unit 2. The positional relationship display unit 4 arranges and displays the groups on a screen based on (i) the information pieces relating to the between-user positional relationships, which are detected by the positional relationship detection unit 2, and (ii) information pieces relating to the groups extracted by the user grouping unit 3.

Below, detailed descriptions are given of the structures of the above-described constituent elements.

1.1 Positional Relationship Detection Unit 2

The positional relationship detection unit 2 detects the between-user positional relationships based on the data pieces sensed by the data sensing unit 1, and outputs the information pieces relating to the detected between-user positional relationships to the user grouping unit 3 and the positional relationship display unit 4.

Here, the information pieces relating to the between-user positional relationships are information pieces relating to relative positions of the users in relation to one another, or information pieces relating to relative positions of the users in relation to the reference position, which is a position of one of the users.

Figure 2:
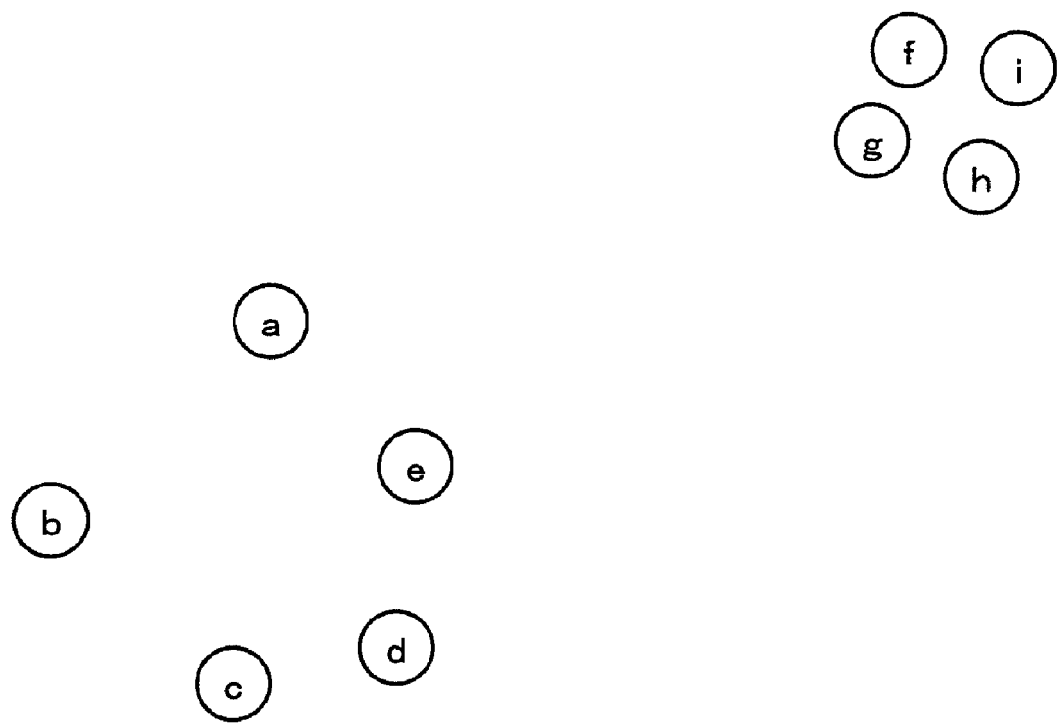
FIG. 2 exemplarily shows positional relationships between a plurality of users (a to i), which are detected by a positional relationship detection unit 2.

FIG. 2 exemplarily shows positional relationships between a plurality of users (a-i), which are displayed based on information pieces relating to positional relationships between the users (a to i) that are detected by the positional relationship detection unit 2.

More specifically, the positional relationship detection unit 2 may, for example, extract relative positions of the users in relation to one another (e.g., the direction in which the user b exists from a viewpoint of the user a, the distance between the users a and b, the direction in which the user c exists from a viewpoint of the user b, and the distance between the users b and c) as the information pieces relating to the between-user positional relationships.

As another example, the positional relationship detection unit 2 may hypothetically determine an xy-coordinate plane including (i) an origin, which is a position of one of the users (e.g., the user a) shown in FIG. 2, (ii) an x-axis that is in line with the direction the user a is facing, and (iii) a y-axis that is perpendicular to the x-axis. In this case, the positional relationship detection unit 2 calculates coordinates of the positions of the users (xa, ya), (xb, yb), (xc, yc) . . . (xi, yi) on the xy-coordinate plane, and outputs, as the information pieces relating to the between-user positional relationships, a set of (i) identification information pieces indicating the users, (ii) the calculated coordinates, and (iii) information relating to the x- and y-axes.

Alternatively, in a case where one of the sensors is provided at a predetermined position in a room, the positional relationship detection unit 2 may (i) calculate the position of each user in relation to said one of the sensors (e.g., the distance between each user and said one of the sensors, and the direction in which each user exists from a viewpoint of said one of the sensors), and (ii) output, as the information pieces relating to the between-user positional relationships, a pair of (i) the identification information indicating the users, and (ii) the calculated positions.

Alternatively, in a case where the sensors worn by the users have GPS signal reception functions, the positional relationship detection unit 2 may calculate the latitudes and longitudes of the positions of the users, and output, as the information pieces relating to the between-user positional relationships, the calculated latitudes and longitudes.

1.2 User Grouping Unit 3

Figure 3:
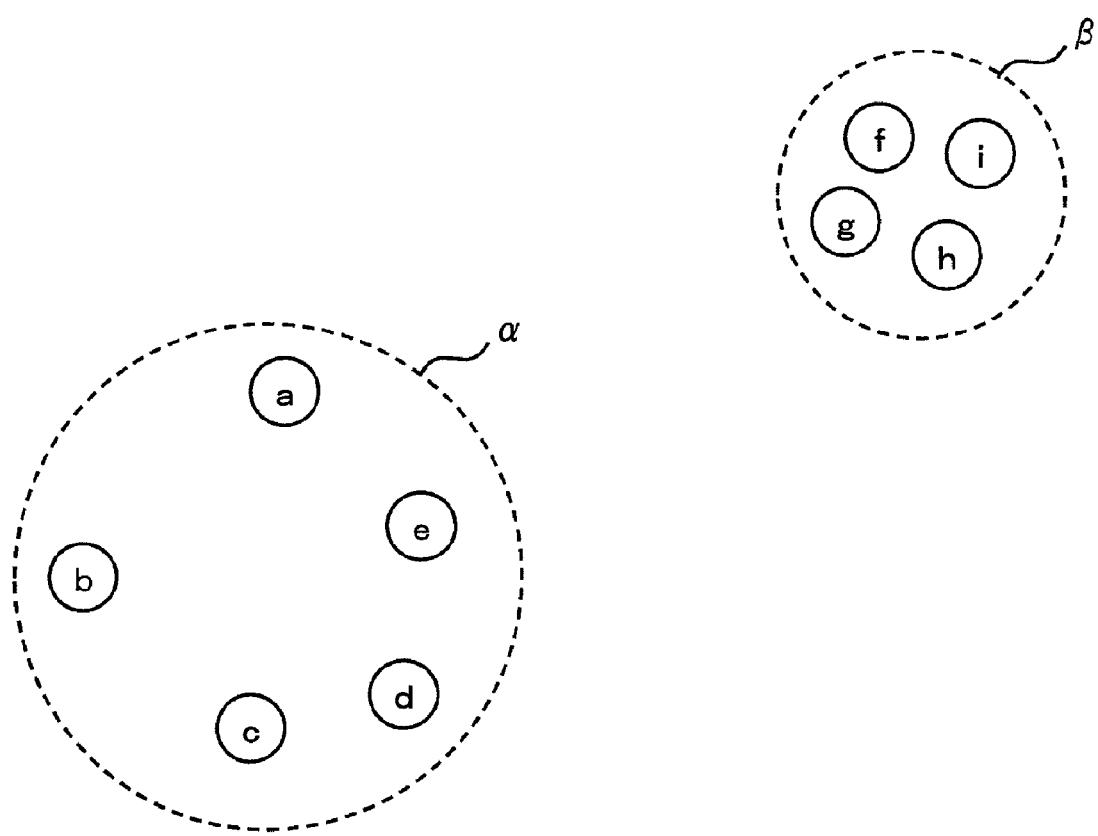
FIG. 3 exemplarily shows a result of grouping performed by a user grouping unit 3 after information pieces relating to the between-user positional relationships are input thereto.

FIG. 3 exemplarily shows a result of grouping performed by the user grouping unit 3 after the positional relationship detection unit 2 has input thereto the information pieces relating to the detected between-user positional relationships illustrated in FIG. 2. Referring to FIG. 3, each of groups G (Gα and Gβ) encircled by dotted lines represents a group of users. Here, grouping of the users is performed by executing processing (e.g., clustering of the users) based on the information pieces relating to the between-user positional relationships. For example, each group is extracted by performing the following hierarchical processing (1) to (3). Here, the distance between targets x1 and x2 is expressed as D [x1, x2] (e.g., the distance between users u1 and u2 is expressed as D [u1, u2], and the distance between clusters C1 and C2 is expressed as D [C1, C2]).

(1) Firstly, a default state is set by preparing N clusters C (in the example of FIG. 3, N is nine), each cluster C including only one user.

(2) Once the default state has been thus set, the distance D [C1, C2] between every possible cluster pair is calculated, and a cluster pair with the shortest distance is combined into one cluster. This processing is sequentially performed.

(3) When the distance D [C1, C2] between a cluster pair becomes equal to or larger than a predetermined value (or, a value set in accordance with the average or the like of the distances D [u1, u2] between the users, a value set in accordance with a total size of an area occupied by all of the users, etc.), the above clustering processing (2) is ended, and the resultant clusters C (in the example of FIG. 3, Gα and Gβ) are regarded as groups G.

The distance D [C1, C2] between a cluster pair is calculated by using the following (Equation 1).

< Expression 1 >

$$D[C1, C2] = \min_{u1 \in C1, u2 \in C2} D[u1, u2] \quad \text{(Equation 1)}$$

or $$D[C1, C2] = \frac{1}{n1 \times n2} \sum_{u1 \in C1} \sum_{u1 \in C2} D[u1, u2]$$

(Here, n1 is the number of users belonging to the cluster C1, and n2 is the number of users belonging to the cluster C2.)

Note, grouping is not limited to being performed using the above-mentioned method.

The user grouping unit 3 then outputs, to the positional relationship display unit 4, information pieces relating to the extracted groups, specific examples of which include identification information pieces indicating the groups and identification information pieces indicating the users belonging to the respective groups (e.g., data pieces indicating Gα={a, b, c, d, e} and Gβ={f, g, h, i}).

1.3 Positional Relationship Display Unit 4

Figure 4:
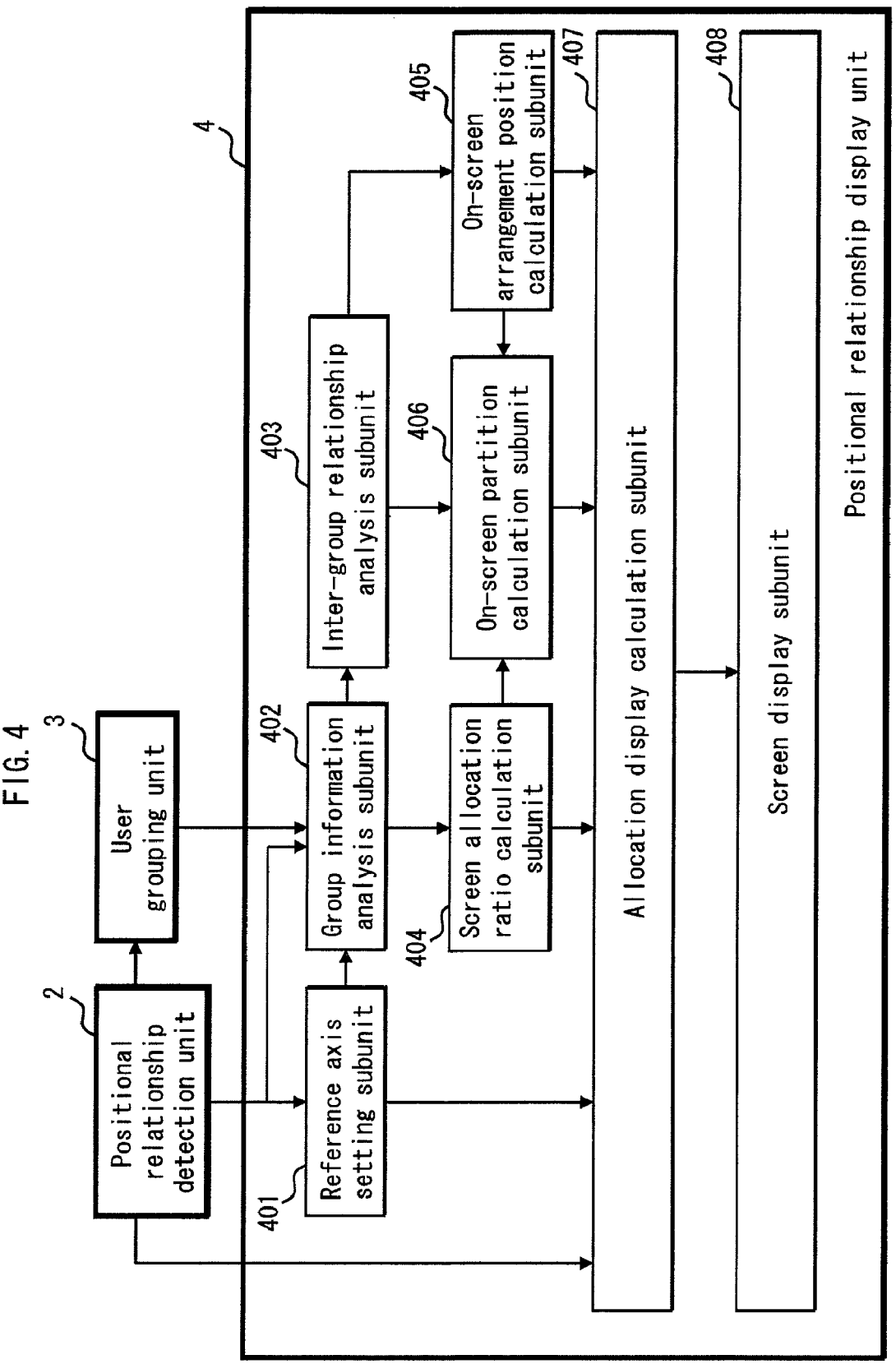
FIG. 4 is a functional block diagram of and internal structure of a positional relationship display unit 4.
Figure 5:
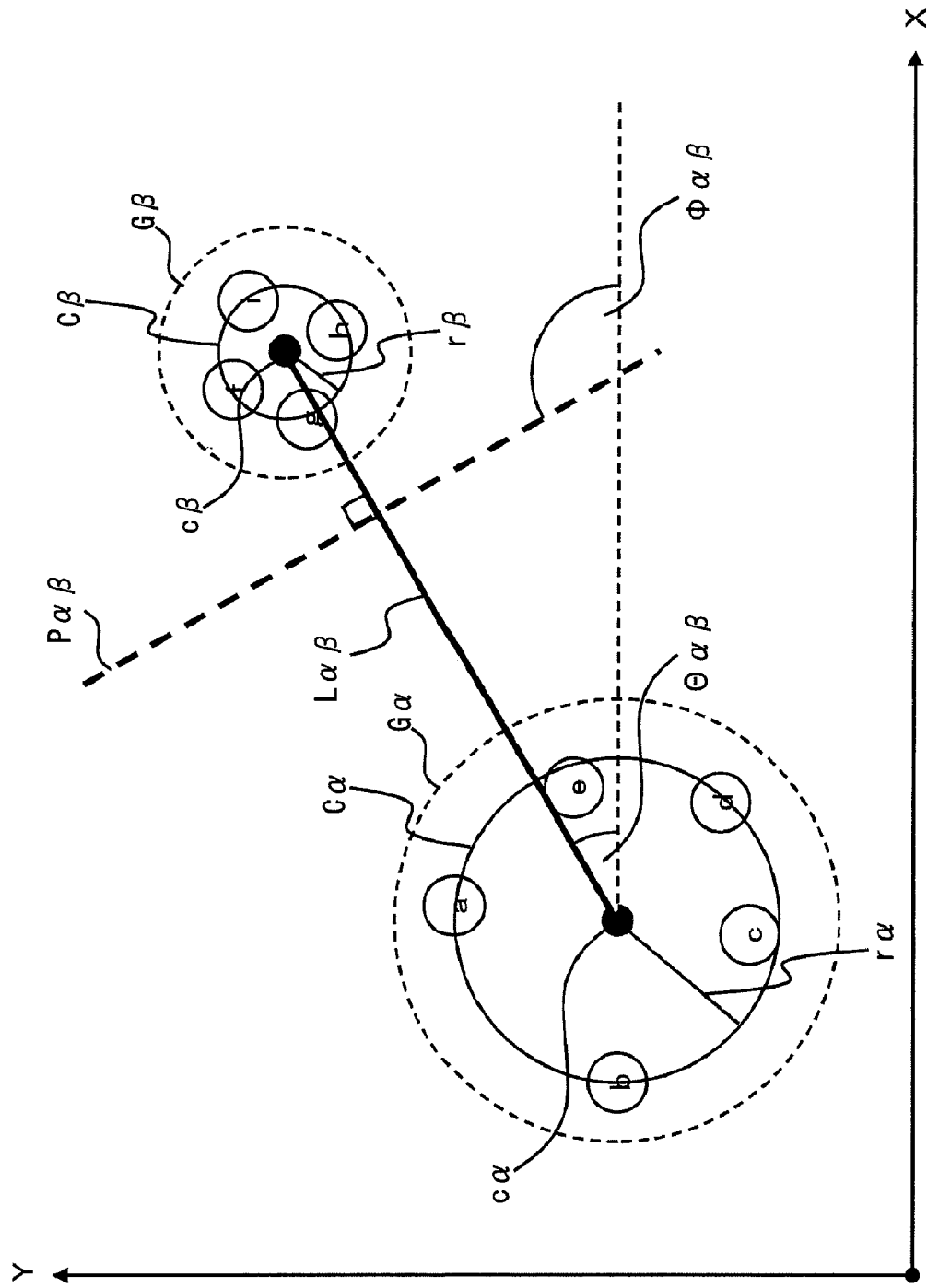
FIG. 5 exemplarily shows processing performed by the positional relationship display unit 4.

FIG. 4 shows an internal structure of the positional relationship display unit 4. The positional relationship display unit 4 is composed of a reference axis setting subunit 401, a group information analysis subunit 402, an inter-group relationship analysis subunit 403, a screen allocation ratio calculation subunit 404, an on-screen arrangement position calculation subunit 405, an on-screen partition calculation subunit 406, an allocation display calculation subunit 407, and a screen display subunit 408. With reference to FIGS. 4 and 5, the following describes processing performed by the constituent elements of the positional relationship display unit 4.

(1) Reference Axis Setting Subunit 401

The reference axis setting subunit 401 sets axes for defining positions, based on the information pieces relating to the between-user positional relationships. For example, as shown in FIG. 5, the reference axis setting subunit 401 sets the X- and Y-axes for defining positions on the XY-plane.

For example, in a case where the information pieces relating to the between-user positional relationships have been mapped on a map (e.g., in a case where the information pieces relating to the between-user positional relationships have been expressed as latitudes and longitudes), the reference axis setting subunit 401 may set the X- and Y-axes so that they are parallel to the east-west direction and the north-south direction, respectively. In this case, the reference axis setting subunit 401 generates a conversion matrix or a conversion expression that converts the latitude/longitude of each user into coordinates on the XY-coordinate plane.

In a case where the information pieces relating to the between-user positional relationships have been mapped in the room (i.e., in a case where the information pieces relating to the between-user positional relationships indicate positions of the users in relation to a given position in the room), the reference axis setting subunit 401 may set the X- and Y-axes so that they conform to the axes defining positions in the room. For instance, the reference axis setting subunit 401 may regard the intersection of two room walls that are at right angles to each other as the origin, and determine an axis parallel to the room walls as the X-axis and an axis parallel to the floor of the room as the y-axis. In this case, the reference axis setting subunit 401 generates a conversion matrix or a conversion expression that converts the position of each user, which has been detected by the positional relationship detection unit 2, into coordinates on the XY-coordinate system.

In a case where only the between-user positional relationships have been detected without the information pieces relating to the between-user positional relationships mapped in association with information to be referred to in detecting positions (e.g., the above-described map information pieces and in-room position information pieces), the X- and Y-axes for defining positions on the XY-plane may be set arbitrarily. For example, when the positions of the users are expressed as coordinates on the hypothetically determined xy-coordinate plane whose origin is a position of one of the users (as exemplarily described in the above section 1.1), the reference axis setting subunit 401 may directly use the hypothetically determined x- and y-axes as the X- and Y-axes, or set the X- and Y-axes in parallel with the hypothetically determined x- and y-axes, respectively. In this case, the reference axis setting subunit 401 again generates a conversion matrix or a conversion expression that converts the positions of the users into coordinates on the newly set XY-coordinate system.

The reference axis setting subunit 401 then outputs the conversion matrix or the conversion expression generated in the above manner.

(2) Group Information Analysis Subunit 402

The group information analysis subunit 402 analyzes information pieces relating to the groups, based on (i) the information pieces relating to the between-user positional relationships, (ii) the information pieces relating to the groups extracted by the user grouping unit 3, and (iii) the conversion matrix or conversion expression generated by the reference axis setting subunit 401.

The following description will be given under the assumption that, as an example, the information pieces relating to the between-user positional relationships are identification information pieces indicating (i) coordinates of the users on the hypothetically determined xy-coordinate system whose origin is a position of one of the users, and (ii) the users (more specifically, a (xa, ya), b (xb, yb) . . . ). The following description will also be given under the assumption that, as an example, the information pieces relating to the groups are (i) identifiers of the respective groups and (ii) identification information pieces for identifying the users belonging to the respective groups (more specifically, Gα={a, b, c, d, e}, Gβ={f, g, h, i}).

As one example of the above analysis, the group information analysis subunit 402 firstly converts coordinates indicating the position of each user into coordinates on the XY-coordinate system, by using the conversion matrix (or conversion expression) generated by the reference axis setting unit 401. The group information analysis subunit 402 then calculates, for each group G (in the example of FIG. 5, Gα and Gβ), coordinates of the centroid c (cα and cβ) of the group on the XY-coordinate system set by the reference axis setting unit 401, based on the coordinates of the users u belonging to the group. Using the following (Equation 2), the group information analysis subunit 402 further calculates, for each group, the radius r (rα and rβ) of the smallest circle C (Cα and Cβ) including all the coordinates of the users u belonging to the group around the centroid c.

< Expression 2 >

$$r = \max_{u \in G} D[u, c] \qquad \text{(Equation 2)}$$

The group information analysis subunit 402 also counts, for each group G, the number of users u belonging to the group G.

(3) Inter-group Relationship Analysis Subunit 403

The inter-group relationship analysis subunit 403 analyzes information relating to an inter-group relationship, based on the information pieces relating to the groups (e.g., cα, cβ, rα, and rβ of FIG. 5, and the number of users belonging to each group) which are analyzed by the group information analysis subunit 402.

For instance, the inter-group relationship analysis subunit 403 calculates (i) an angle of tilt 812 (in FIG. 5, Θαβ) of a line L12 (Lαβ) connecting between the centroids c1 and c2 (cα and cβ) of the groups G1 and G2 (Gα and Gβ), and (ii) an angle of tilt Φ12 (Φαβ) of a line P12 (Pαβ) perpendicular to the line L12.

The target of analysis made by the inter-group relationship analysis subunit 403 is not limited to the above. The inter-group relationship analysis subunit 403 may analyze other data, such as the length of the line L12 connecting between the centroids c1 and c2 (in FIG. 5, cα and cβ) of the groups G1 and G2 (Gα and Gβ).

(4) Screen Allocation Ratio Calculation Subunit 404

Based on the information pieces relating to the groups (e.g., cα, cβ, rα, and rβ of FIG. 5, and the number of users belonging to each group), which are analyzed by the group information analysis subunit 402, the screen allocation ratio calculation subunit 404 calculates a ratio between areas of a screen to each of which a different one of the groups would be allocated when displaying, on the screen, the information pieces relating to the between-user positional relationships. For example, such a ratio may be proportional to one of the following ratios: (i) a ratio between the radiuses (in FIG. 5, $r\alpha$ and $r\beta$) of the smallest circles C ($C\alpha$ and $C\beta$) that each include coordinates of users u belonging to the corresponding group around the centroid c (i.e., $r\alpha$:$r\beta$); (ii) a ratio between the areas of such smallest circles C; and (iii) a ratio between the number of users u belonging to one group G and the number of users u belonging to another group G (i.e., 5:4).

(5) On-screen Arrangement Position Calculation Subunit 405

Based on the information relating to the inter-group relationship, which is analyzed by the inter-group relationship analysis subunit 403, the on-screen arrangement position calculation subunit 405 calculates on-screen arrangement positions in each of which a different one of the groups would be arranged when displaying, on the screen, the information pieces relating to the between-user positional relationships. For instance, the on-screen arrangement positions of the groups G1 and G2 are set in the following procedure. When an angle of tilt $\Theta 12$ (in FIG. 5, $\Theta\alpha\beta$) of the line L2 ($L\alpha\beta$) connecting between the centroids c1 and c2 ($c\alpha$ and $c\beta$) of the groups G1 and G2 ($G\alpha$ and $G\beta$) is $-45°$ to $45°$ or $135°$ to $225°$, the groups G1 and G2 are arranged side by side on the screen. When an angle of tilt $\Theta 12$ is $-135°$ to $-45°$ or $45°$ to $135°$, the groups G1 and G2 are arranged one above the other on the screen. In the example of FIG. 5, the following relationship is satisfied: $0<\Theta\alpha\beta<45°$. Accordingly, the on-screen arrangement position calculation subunit 405 sets the on-screen arrangement positions of $G\alpha$ and $G\beta$ such that they are arranged side by side on the screen (i.e., the former to the right and $G\beta$ (to the left) side by side on the screen.

(6) On-screen Partition Calculation Subunit 406

The on-screen partition calculation subunit 406 determines a display position and width of a partition (hereinafter referred to as "on-screen partition") that separates one group from another, the on-screen partition being displayed when displaying the information pieces relating to the between-user positional relationships on the screen. At this time, the display position and width of the on-screen partition are determined based on (i) the information relating to the inter-group relationship, which is analyzed by the inter-group relationship analysis subunit 403, (ii) the ratio between areas of the screen to which the respective groups would be allocated, the ratio being calculated by the screen allocation ratio calculation subunit 404, and (iii) the on-screen arrangement positions of the groups, which are calculated by the on-screen arrangement position calculation subunit 405.

For instance, the on-screen partition calculation subunit 406 assumes that an angle of tilt of the on-screen partition to be displayed on the screen between the groups G1 and G2 is equal to the angle of tilt $\Phi 12$ (in FIG. 5, $\Phi\alpha\beta$) of the line P12 ($P\alpha\beta$) perpendicular to the line L12 ($L\alpha\beta$) connecting between the centroids c1 and c2 ($c\alpha$ and $c\beta$) of the groups G1 and G2 ($G\alpha$ and $G\beta$). Also, the on-screen partition calculation subunit 406 also calculates the display position of the on-screen partition such that (i) areas of the screen separated by the on-screen partition conform to the ratio between areas of the screen to which the respective groups are allocated, the ratio being calculated by the screen allocation ratio calculation subunit 404, and (ii) the on-screen arrangement positions of the groups conform to the on-screen arrangement positions calculated by the on-screen arrangement position calculation subunit 405.

The on-screen partition calculation subunit 406 may take into consideration information relating to the distance between the groups (in FIG. 5, the length of the line $L\alpha\beta$ connecting between the centroids $c\alpha$ and $c\beta$ of the groups $G\alpha$ and $G\beta$ in determining the width or the like of the on-screen partition.

(7) Allocation Display Calculation Subunit 407

The allocation display calculation subunit 407 acquires (i) the information pieces relating to the between-user positional relationships, (ii) the X- and Y-axes set by the reference axis setting subunit 401, (iii) the ratio between areas of the screen to which the respective groups are allocated, the ratio being calculated by the screen allocation ratio calculation subunit 404, (iv) the on-screen arrangement positions of the groups, which are calculated by the on-screen arrangement position calculation subunit 405, and (v) information relating to the on-screen partition calculated by the on-screen partition calculation subunit 406.

Upon acquiring the above information pieces, the allocation display calculation subunit 407 calculates a display size of each group so that, when displaying the between-user positional relationships on the screen, each group would fit in the corresponding area of the screen allocated thereto.

For instance, the allocation display calculation subunit 407 calculates on-screen display positions/sizes of the users belonging to the respective groups G, so that each of the smallest circles C (in FIG. 5, $C\alpha$ and $C\beta$), which includes coordinates of the users u belonging to the corresponding group G around the centroid c, can easily fit in the area of the screen allocated to the corresponding group G. At this time, the allocation display calculation subunit 407 calculates the on-screen display positions of the users so that relative positional relationships between the users belonging to the respective groups are maintained.

(8) Screen Display Subunit 408

The screen display subunit 408 has a display mechanism, such as a liquid crystal display, and a speaker.

Based on the screen display method calculated by the allocation display calculation subunit 407, the screen display subunit 408 displays the on-screen partition that separates one group of users from another. Although not illustrated, the positional relationship display unit 4 also includes an input subunit (e.g., a touchscreen and various types of input keys) that receives an operation from an operator. The screen display subunit 408 creates, in advance, the linkage between data pieces (e.g., images and sound data pieces) sensed by the sensors worn/carried by the users, and constructs a UI for the operator. If the operator selects a position of one of the users via the input subunit while the positions of the users belonging to the respective groups are being displayed by the screen display subunit 408, this UI will cause playback or pop-up display of data pieces sensed by the sensor worn/carried by said one of the users.

Figure 6:
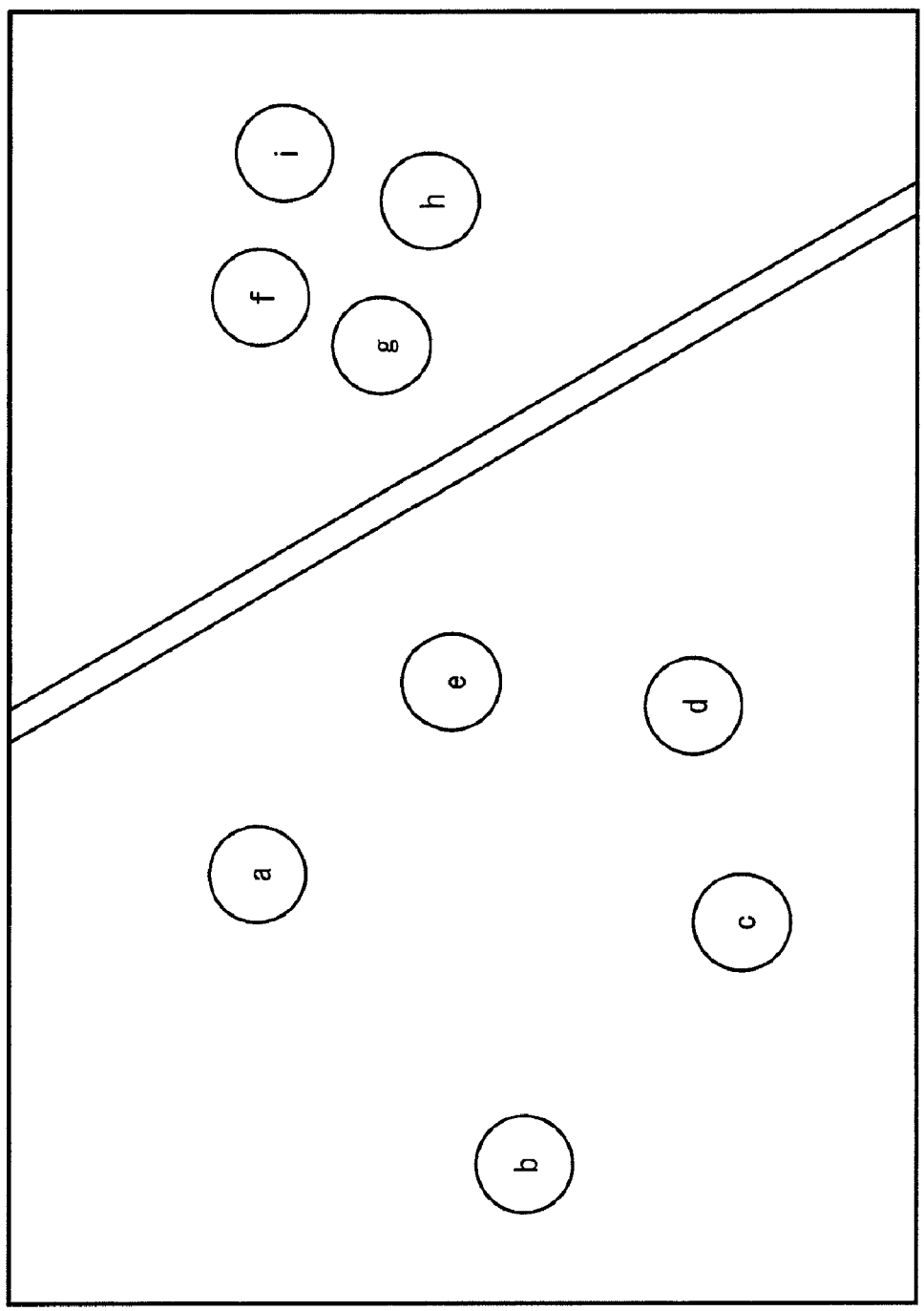
FIG. 6 exemplarily shows a display style according to which the positional relationship display unit 4 displays a screen.

FIG. 6 exemplarily shows a screen displayed by the screen display subunit 408 when the processing shown in FIG. 5 has been performed by the user grouping unit 3 and the positional relationship display unit 4. For instance, assume a case where the users are wearing/carrying sensors such as cameras and microphones. In this case, if a position of one of the users is selected while the between-user positional relationships are being displayed, then data pieces sensed by the sensor worn/carried by said one of the users (e.g., pictures or videos taken by the camera, and sound captured by the microphone) will be displayed or played back on a main window or a pop-up window on the screen.

Figure 7:
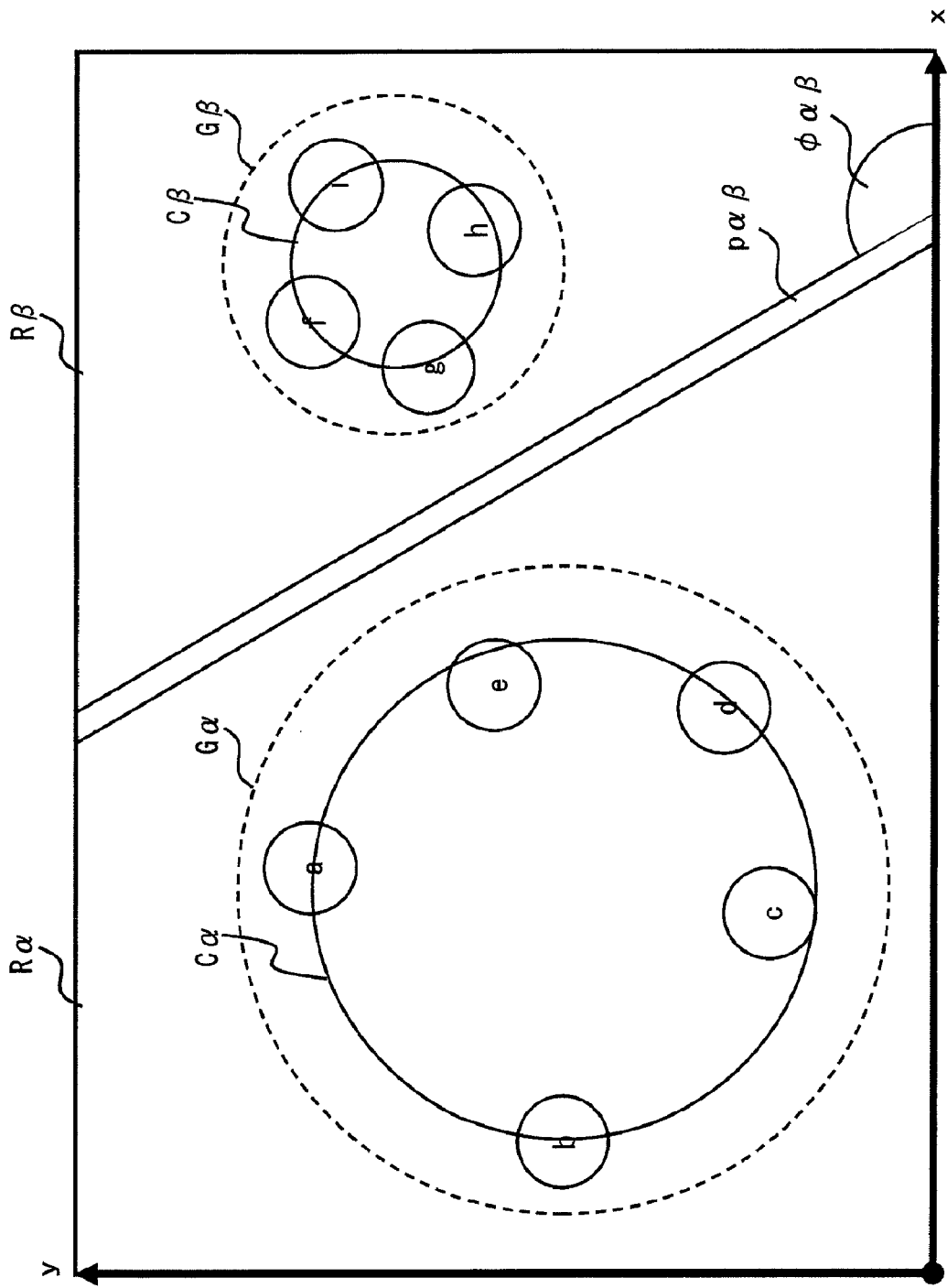
FIG. 7 shows the diagram of FIG. 6, to which supplementary lines and the like have been added to assist comprehension.

FIG. 7 shows the diagram of FIG. 6, to which supplementary lines and the like have been added to assist comprehension. The x- and y-axes for defining positions on the screen of FIG. 7 extend in the same direction as the X- and Y-axes for defining positions on the plane of FIG. 5, respectively. As shown in FIG. 7, the on-screen partition p$\alpha\beta$ based on the x- and y-axes is displayed so that (i) a ratio between two areas R$\alpha$ and R$\beta$ on the screen is equal to the ratio calculated by the screen allocation ratio calculation subunit 404, and (ii) positions of the two areas R$\alpha$ and R$\beta$ on the screen are the same as the on-screen arrangement positions of the groups, which are calculated by the on-screen arrangement position calculation subunit 405. Also, an angle of tilt $\phi\alpha\beta$ of the on-screen partition p$\alpha\beta$ based on the x- and y-axes is equal to the angle of tilt $\Phi\alpha\beta$ of the line P$\alpha\beta$ (shown in FIG. 5) based on the X- and Y-axes, which is calculated by the on-screen partition calculation subunit 406. Furthermore, each of the smallest circles (C$\alpha$ and C$\beta$), which includes users belonging to the corresponding group (G$\alpha$ or G$\beta$), is displayed so that it easily fits in the corresponding one of the areas (R$\alpha$ and R$\beta$) of the screen.

Figure 8:
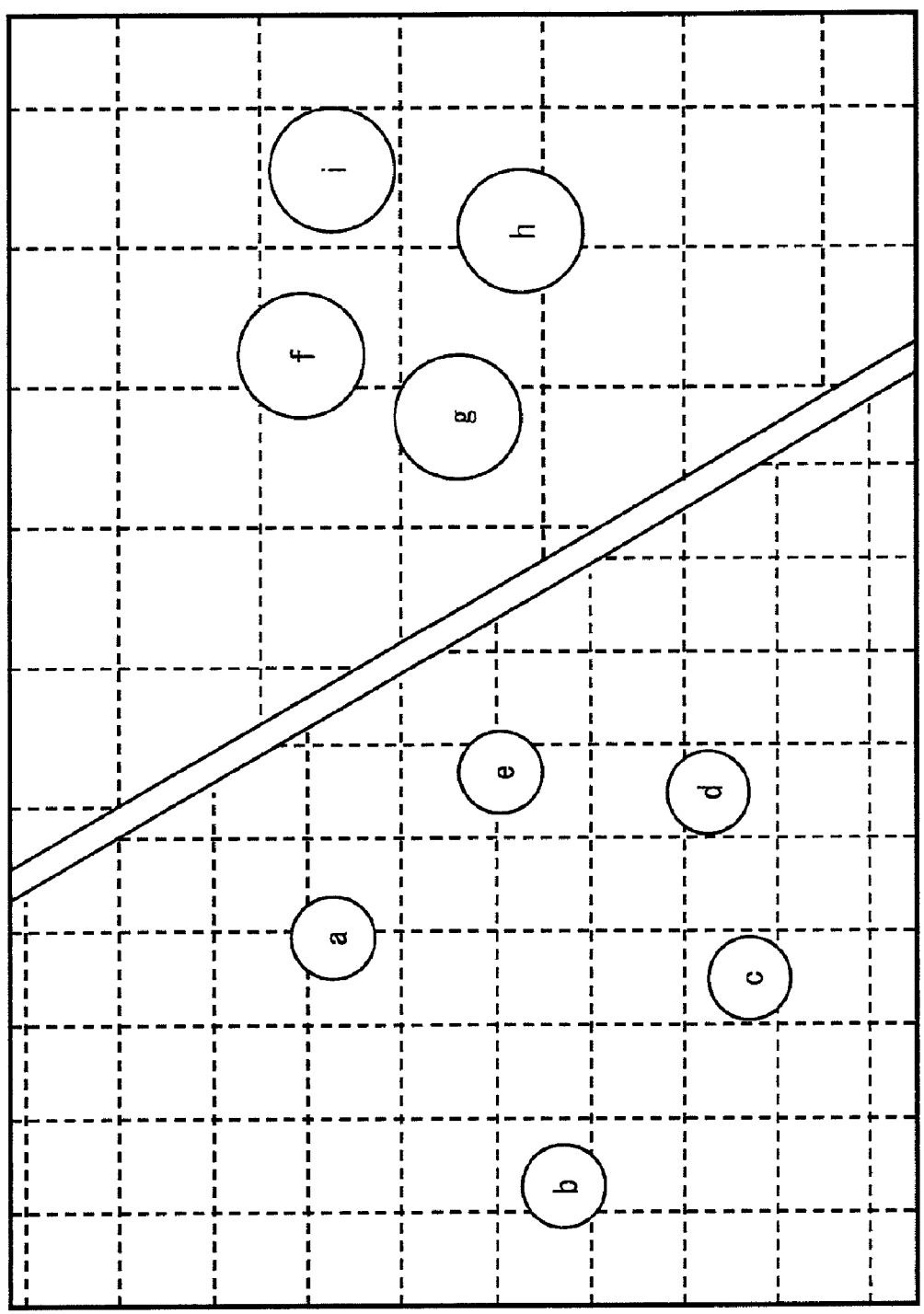
FIG. 8 exemplarily shows a display style according to which the positional relationship display unit 4 displays the screen, the display style allowing an operator to grasp scale ratios of respective groups, which suggest real sizes of the groups.

In a case where a ratio between areas of the screen to each of which the corresponding group is allocated is calculated by the screen allocation ratio calculation subunit 404 based on, for instance, the ratio between the number of users u belonging to one group G and the number of users u belonging to another group G, the between-user positional relationships may be displayed on the screen in different degrees of scale from one group to another. In this case, the screen display subunit 408 may display, for example, a grid background in each area of the screen as shown in FIG. 8, so that the operator can grasp a ratio between the scale of one group and the scale of another group. Here, the blocks of the grid backgrounds displayed for respective groups would be of the same size in reality (in the real between-user positional relationships). Furthermore, the screen display subunit 408 may display, for example, graphics representing the positions of the users in different sizes as shown in FIG. 8, so that the operator can grasp a ratio between the scale of one group and the scale of another group. Here, the sizes of the graphics representing the positions of the users belonging to respective groups would be the same as one another in reality (in the real positional relationships between the users).

As long as the difference between the scale of one group and the scale of another group can be visually acknowledged, the screen display subunit 408 may employ other display methods than the above-described display method, with which dotted lines forming a grid are displayed. For example, the screen display subunit 408 may display, in each area of the screen, (i) a scale bar showing the scale of the corresponding group, or (ii) a numerical value indicating a reduction ratio between the size of the corresponding group as shown on the screen and the real-life size of the same.

1.4 Operations of System

Figure 9:
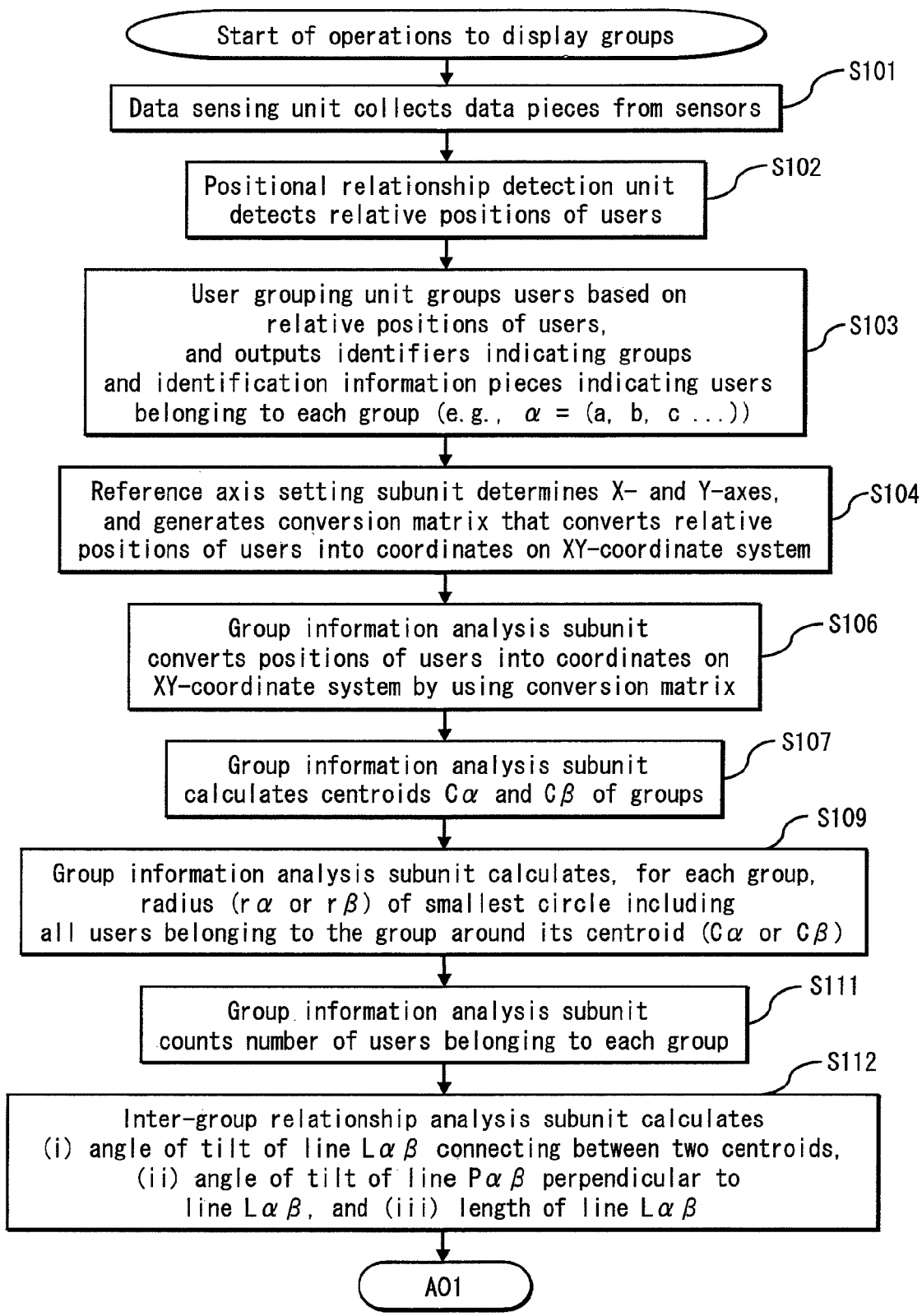
FIG. 9 is a flowchart of operations of the system.
Figure 10:
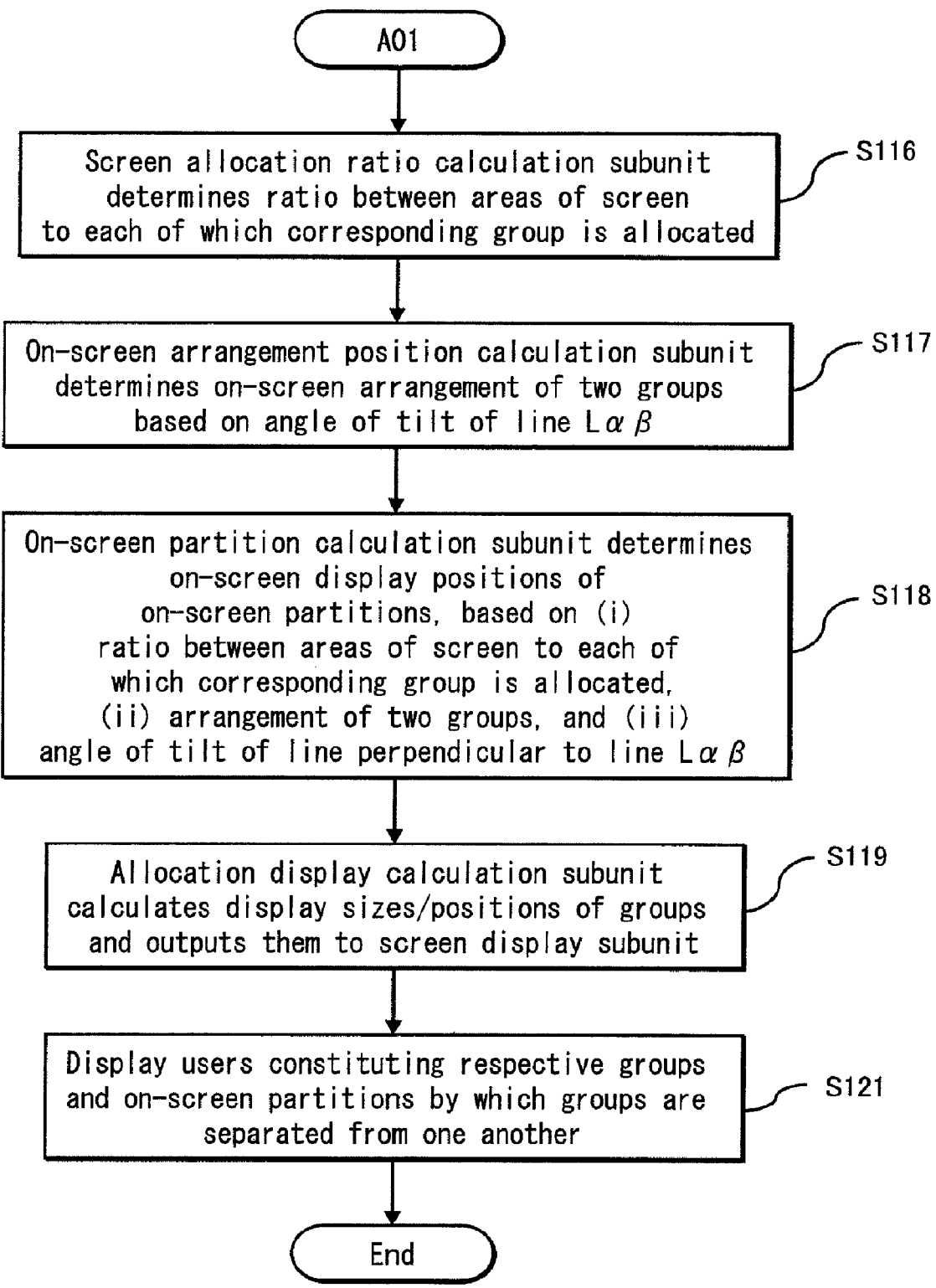
FIG. 10 is a flowchart of operations of the system, continuing from FIG. 9.

With reference to flowcharts of FIGS. 9 and 10, the following describes a series of operations of the overall system pertaining to the present embodiment. Note, the following description is of an exemplary case where the screen display is performed based on data pieces detected by the sensors worn by the users, rather than on data pieces detected by sensors provided at given locations.

Firstly, the data sensing unit 1 collects the data pieces from the sensors worn by the users (Step S101) and outputs the collected data pieces to the positional relationship detection unit 2.

The positional relationship detection unit 2 detects relative positions of the users based on the received data pieces (Step S102), and outputs, to the user grouping unit 3 and the positional relationship display unit 4, the detected relative positions in one-to-one correspondence with identification information pieces indicating the users. Here, as one example, the positional relationship detection unit 2 outputs positions of the users on the coordinate plane whose origin is the position of the user a (namely, a (xa, ya), b (xb, yb), c (xc, yc) . . . ).

The user grouping unit 3 groups the users into a plurality of groups based on the relative positions of the users received from the positional relationship detection unit 2, and outputs, to the positional relationship display unit 4, (i) identifiers indicating the groups and (ii) identification information pieces indicating the users belonging to the respective groups (Step S103). Here, as one example, the users are positioned as shown in FIG. 3. The user grouping unit 3 groups the users into groups $\alpha$ and $\beta$, and outputs group configuration information pieces G$\alpha$={a, b, c, d, e} and G$\beta$={f, g, h, i, j}.

The reference axis setting subunit 401 of the positional relationship display unit 4 receives the relative positions of the users detected by the positional relationship detection unit 2. Upon such reception, the reference axis setting subunit 401 arbitrarily determines the X- and Y-axes, and calculates a conversion matrix (or a conversion expression) that converts the received relative positions into coordinates on the XY-plane formed by the determined X- and Y-axes (Step S104). The reference axis setting subunit 401 then outputs the calculated conversion matrix to the group information analysis subunit 402 and the allocation display calculation subunit 407.

The group information analysis subunit 402 receives (i) the relative positions of the users, namely a (xa, ya), b (xb, yb), c (xc, yc) . . . , from the positional relationship detection unit 2, (ii) the group configuration information pieces G$\alpha$={a, b, c, d, e} and G$\beta$={f, g, h, i, j} from the user grouping unit 3, and (iii) the conversion matrix from the reference axis setting subunit 401.

Upon receiving the above information pieces, the group information analysis subunit 402 firstly converts the relative positions of the users into coordinates on the XY-coordinate system, by using the conversion matrix (Step S106). Then, the group information analysis subunit 402 calculates the centroids c$\alpha$ and c$\beta$ of the groups on the XY-coordinate system, based on (i) the converted coordinates of the users, namely a (Xa, Ya), b (Xb, Yb), c (Xc, Yc) . . . , and (ii) the received group configuration information pieces G$\alpha$={a, b, c, d, e} and G$\beta$={f, g, h, i, j} (Step S107). The group information analysis subunit 402 also calculates, for each group, the radius (r$\alpha$ or r$\beta$) of the smallest circle including all the users belonging to the group around the centroid (Step S109). The group information analysis subunit 402 further counts, for each group, the number of users belonging to the group (Step S111). Then, the group information analysis subunit 402 outputs, to the inter-group relationship analysis subunit 403 and the screen allocation ratio calculation subunit 404, (i) the identification information pieces of the users, (ii) the converted coordinates of the users, namely a (Xa, Ya), b (Xb, Yb), c (Xc, Yc) . . . , (iii) coordinates of the calculated centroids c$\alpha$ and c$\beta$, (iv) the radiuses r$\alpha$ and r$\beta$, (v) the number of users belonging to each group, and (vi) the received group configuration information pieces G$\alpha$={a, b, c, d, e} and G$\beta$={f, g, h, i, j}.

Based on the coordinates of the centroids cα and cβ of the groups received from the group information analysis subunit 402, the inter-group relationship analysis subunit 403 calculates (i) the angle of tilt of the line Lαβ connecting between the two centroids, and (ii) the angle of tilt of the line perpendicular to the line Lαβ, and (iii) the length of the line Lαβ (Step S112).

Next, the inter-group relationship analysis subunit 403 outputs (i) the calculated angle of tilt of the line Lαβ and the calculated angle of tilt of the line perpendicular to the line Lαβ to the on-screen arrangement position calculation subunit 405, and (ii) the length of the line Lαβ to the on-screen partition calculation subunit 406.

The screen allocation ratio calculation subunit 404 receives, from the group information analysis subunit 402, (i) the identification information pieces of the users, (ii) the coordinates of the users, namely a (Xa, Ya), b (Xb, Yb), c (Xc, Yc) . . . , (iii) the coordinates of the centroids cα and cβ, (iv) the radiuses rα and rβ, (v) the number of users belonging to each group, and (vi) the group configuration information pieces Gα={a, b, c, d, e} and Gβ={f, g, h, i, j}.

Upon receiving the above information pieces, the screen allocation ratio calculation subunit 404 determines the ratio between areas of the screen to each of which the corresponding group would be allocated (Gα:Gβ) (Step S116), and outputs the determined ratio to the on-screen partition calculation subunit 406. The screen allocation ratio calculation subunit 404 also outputs the following received items to the allocation display calculation subunit 407: (i) the identification information pieces of the users; (ii) the coordinates of the users, namely a (Xa, Ya), b (Xb, Yb), c (Xc, Yc) . . . ; (iii) the coordinates of the centroids cα and cβ; (iv) the radiuses rα and rβ; (v) the number of users belonging to each group; (vi) the group configuration information pieces Gα={a, b, c, d, e} and Gβ={f, g, h, i, j}; and (vii) the calculated ratio between areas Gα:Gβ.

The on-screen arrangement position calculation subunit 405 acquires, from the inter-group relationship analysis subunit 403, the angle of tilt of the line Lαβ and the angle of tilt of the line perpendicular to the line Lαβ. Then, the on-screen arrangement position calculation subunit 405 calculates, from the acquired angles of tilt, arrangement of the two groups on the screen (Step S117). As information indicating the calculated arrangement, the on-screen arrangement position calculation subunit 405 outputs, for example, a one-bit flag to the on-screen partition calculation subunit 406 and the allocation display calculation subunit 407. For instance, a flag "0" indicates that the two groups are to be displayed side by side, and a flag "1" indicates that the two groups are to be displayed one above the other.

The on-screen partition calculation subunit 406 receives (i) the length of the line Lαβ and the angle of tilt of the straight line Pαβ from the inter-group relationship analysis subunit 403, (ii) the ratio between areas Gα:Gβ from the screen allocation ratio calculation subunit 404, and (iii) the information indicating the arrangement from the on-screen arrangement position calculation subunit 405. Upon receiving these information pieces, the on-screen partition calculation subunit 406 determines the display position, the width, and the angle of tilt of the on-screen partition on the screen, based on the received information pieces (Step S118). The on-screen partition calculation subunit 406 then outputs the determined display position, width, and angle of tilt of the on-screen partition to the allocation display calculation subunit 407.

The allocation display calculation subunit 407 receives, from the screen allocation ratio calculation subunit 404, (i) the identification information pieces of the users, (ii) the coordinates of the users, namely a (Xa, Ya), b (Xb, Yb), c (Xc, Yc) . . . , (iii) the coordinates of the centroids cα and cβ, (iv) the radiuses rα and rβ, (v) the group configuration information pieces Gα={a, b, c, d, e} and Gβ={f, g, h, i, j}, and (vi) the number of users belonging to each group. Furthermore, the allocation display calculation subunit 407 receives (i) the display position, the width, and the angle of tilt of the on-screen partition on the screen from the on-screen partition calculation subunit 406, and (ii) the flag indicating the arrangement of the groups from the on-screen arrangement position calculation subunit 405. Here, specifically speaking, the allocation display calculation subunit 407 acquires, via the screen allocation ratio calculation subunit 404, the following two data pieces calculated by the group information analysis subunit 402: (i) the coordinates of the users on the XY-coordinate system; and (ii) the number of users belonging to each group. However, alternatively, the allocation display calculation subunit 407 may acquire (i) the relative positions of the users from the positional relationship detection unit 2 and (ii) the conversion matrix from the reference axis setting subunit 401, so as to calculate the above two data pieces on its own.

Upon receiving the above data pieces, the allocation display calculation subunit 407 calculates the display size and the display position of each group (specifically, the latter denotes the on-screen display positions of the users constituting the respective groups), so that each group can easily fit in a corresponding one of the two areas separated by the on-screen partition on the screen. The allocation display calculation subunit 407 also calculates the on-screen display area of the on-screen partition based on the display position, the width, and the angle of tilt of the on-screen partition. The allocation display calculation subunit 407 then outputs, to the screen display subunit 408, the calculated on-screen display positions of the users and the calculated on-screen display area of the on-screen partition (Step S119.

The screen display subunit 408 receives, from the allocation display calculation subunit 407, the on-screen display positions of the users and the on-screen display area of the on-screen partition. Based on these received data pieces, the screen display subunit 408 generates a screen showing a user group constituting the group Gα and a user group constituting the group Gβ, each user group being arranged in a corresponding one of the two areas separated by the on-screen partition. The screen display subunit 408 then displays the generated screen on a display (Step S121).

1.5 Additional Notes to and Modifications of Embodiment 1

Figure 11:
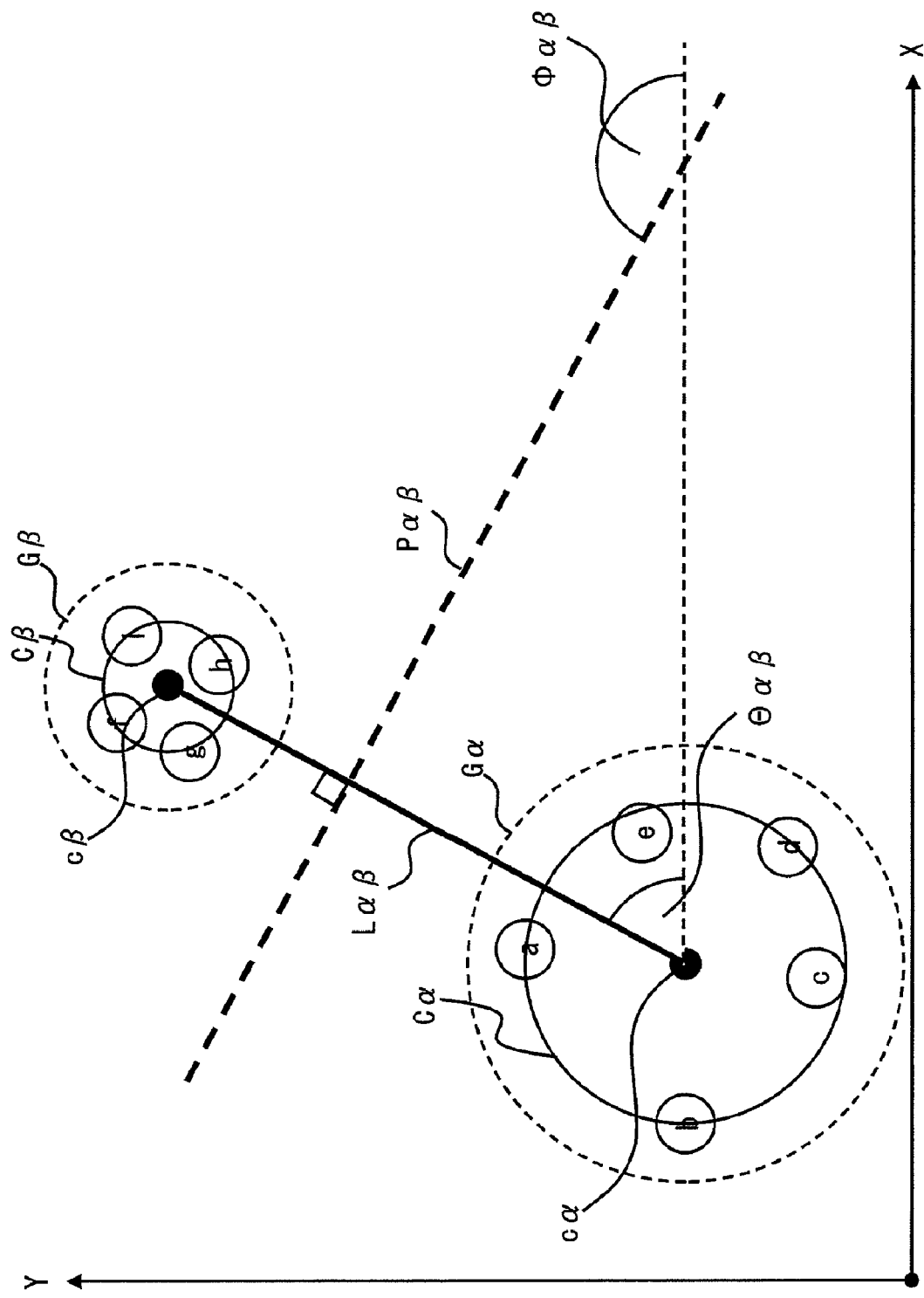
FIG. 11 exemplarily shows processing performed by the positional relationship display unit 4.
Figure 12:
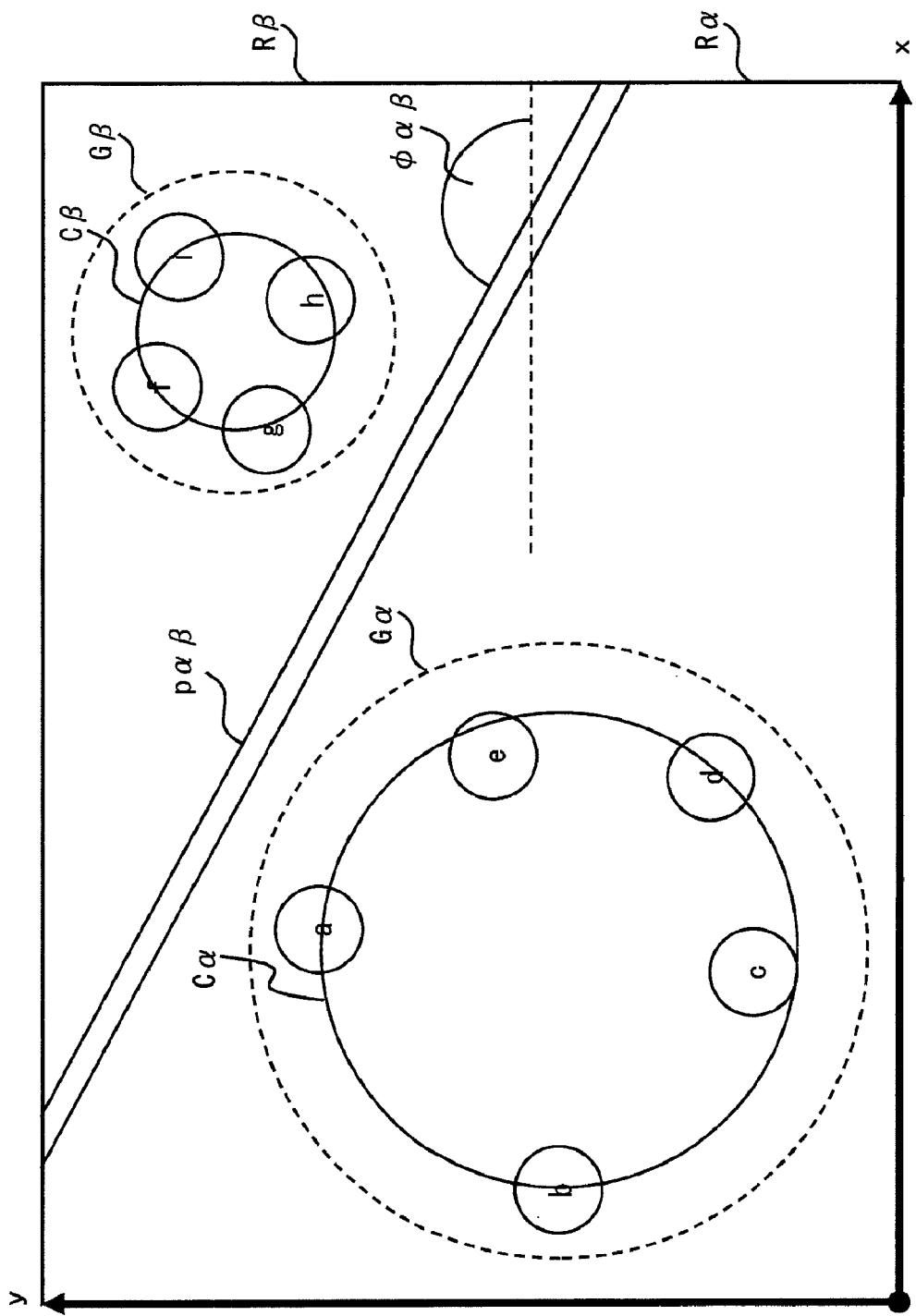
FIG. 12 exemplarily shows a display style according to which the positional relationship display unit 4 displays the screen (although not displayed in reality, supplementary lines and the like are also shown to assist comprehension)

(1) The above has described an exemplary case (examples shown in FIGS. 2 to 3 and 5 to 8) where, as a result of the on-screen arrangement position calculation subunit 405 calculating the on-screen arrangement positions of the groups, the groups are displayed side by side on the screen (Θαβ is −45° to 45° or 135° to 225°. However, there also may be a case where, as a result of the on-screen arrangement position calculation subunit 405 calculating the on-screen positions of the groups, the groups are displayed one above the other on the screen (Θαβ is −135° to −45° or 45° to 135°, as exemplarily shown in FIG. 11. In such a case, the positional relationship display unit 4 displays the screen according to the display style shown in FIG. 12 (although not displayed in reality, supplementary lines and the like are added to FIG. 12 to assist comprehension). The x- and y-axes of FIG. 12 that define on-screen positions extend in the same directions as the X- and Y-axes of FIG. 11 that define positions on a plane, respectively. The areas Rα and Rβ of the screen shown in FIG. 12 are set in the following manner. The areas Rα and Rβ are separated by the on-screen partition pαβ based on the x- and y-axes, such that they conform to (i) the ratio between sizes of areas of the screen to each of which a corresponding one of the groups is allocated, the ratio being calculated by the screen allocation ratio calculation subunit 404, and (ii) the on-screen arrangement positions of the groups calculated by the on-screen arrangement position calculation subunit 405. Also, the on-screen partition calculation subunit 406 sets the angle of tilt φαβ of the on-screen partition pαβ with respect to the x- and y-axes, such that the angle of tilt φαβ is equal to the angle of tilt Φαβ of the line Pαβ of FIG. 11 with respect to the X- and Y-axes. Furthermore, information pieces Cα and Cβ are displayed in such a manner that they can easily fit in the areas Rα and Rβ of the screen, respectively, the information pieces Cα and Cβ relating to the positional relationships between the users belonging to the groups Gα and Gβ.

Figure 13:
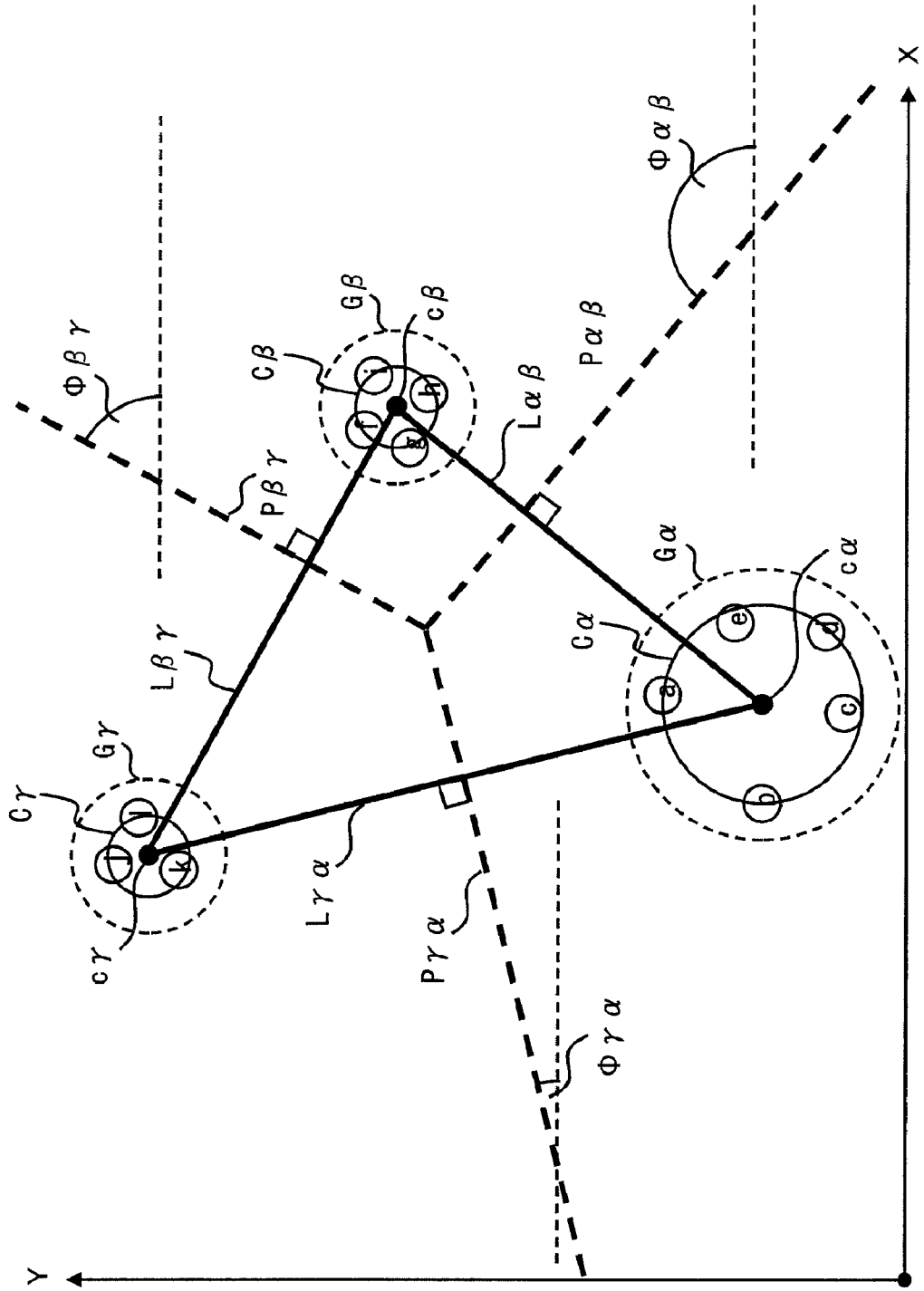
FIG. 13 exemplarily shows processing performed by the positional relationship display unit 4.
Figure 14:
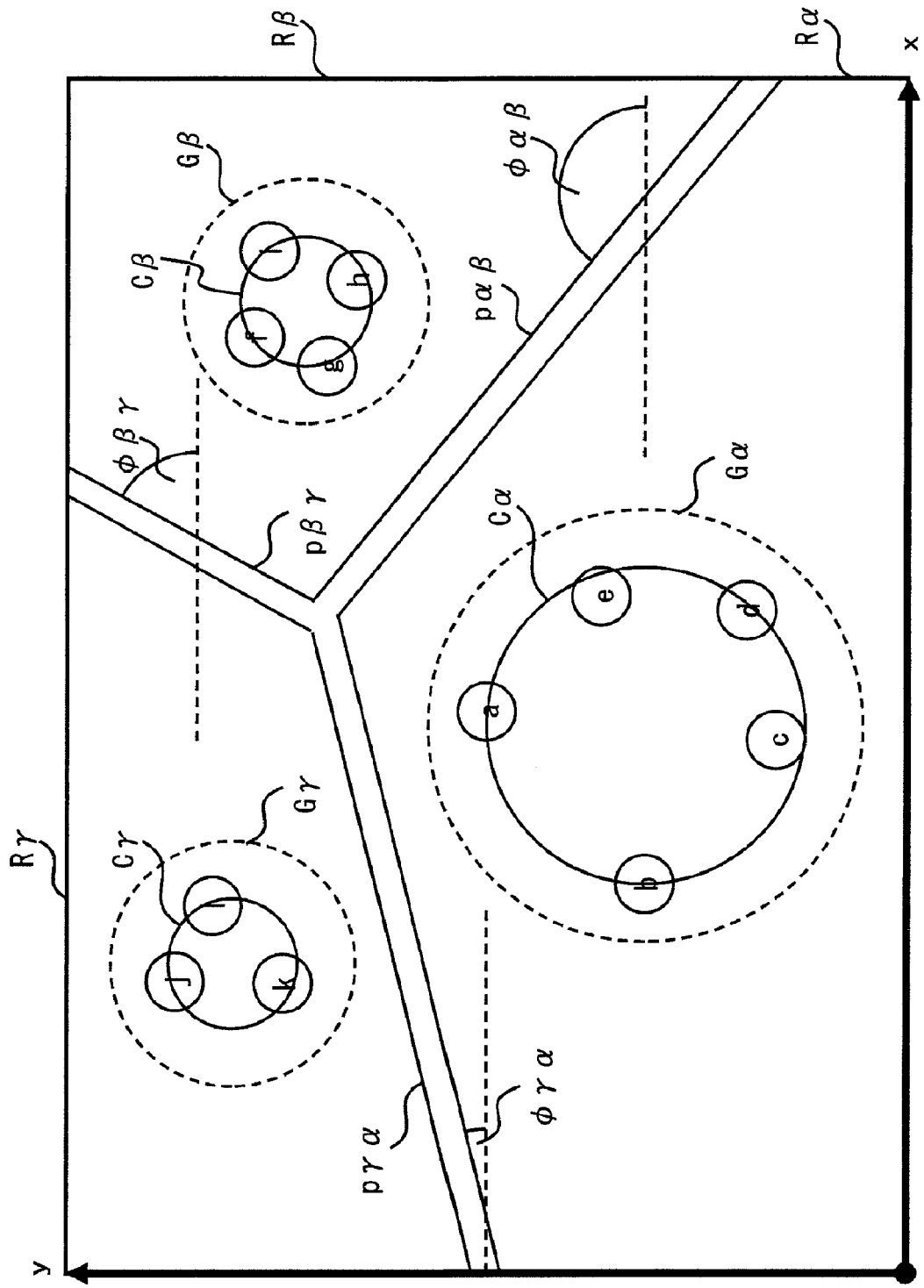
FIG. 14 exemplarily shows a display style according to which the positional relationship display unit 4 displays the screen (although not displayed in reality, supplementary lines and the like are also shown to assist comprehension)

(2) The above has described an exemplary case where the user grouping unit 3 extracts two groups. However, the above-described processing is also applicable to a case where the user grouping unit 3 extracts three groups or more. For example, there may be a case where, as a result of the on-screen arrangement position calculation subunit 405 calculating the on-screen arrangement positions of a plurality of groups, the groups are displayed on the screen in the following procedure: (i) a group Gα is below a group Gβ; (ii) the group Gβ is to the right of a group Gγ; and (iii) the group Gγ is above the group Gα, (shown in FIG. 13). In such a case, the positional relationship display unit 4 displays a screen according to the display style shown in FIG. 14 (although not displayed in reality, supplementary lines and the like are added to FIG. 14 to assist comprehension). The x- and y-axes of FIG. 14 that define on-screen positions extend in the same directions as the X- and Y-axes of FIG. 11 that define positions on a plane, respectively. The areas Rα, rβ, and Rγ of the screen shown in FIG. 14 are set in the following procedure. The areas Rα, rβ, and Rγ are separated by on-screen partitions pαβ, pβγ and pγα based on the x- and y-axes, such that they conform to (i) the ratio between sizes of areas of the screen to each of which a corresponding one of the groups is allocated, the ratio being calculated by the screen allocation ratio calculation subunit 404, and (ii) the on-screen arrangement positions of the groups calculated by the on-screen arrangement position calculation subunit 405. Also, the on-screen partition calculation subunit 406 sets the angles of tilt φαβ, φβγ and φγα of the on-screen partitions pαβ, pβγ and pγα with respect to the x- and y-axes, such that the angles of tilt φαβ, φβγ and φγα are respectively equal to the angles of tilt Φαβ, Φβγ and Φγα of the lines Pαβ, Pβγ and Pγα of FIG. 13 with respect to the X- and Y-axes. Furthermore, information pieces Cα, Cβ, and Cγ are displayed in such a manner that they can easily fit in the areas Rα, rβ, and Rγ of the screen, respectively, the information pieces Cα, Cβ, and Cγ relating to the positional relationships between the users belonging to the groups Gα, Gβ and Gγ.

(3) The above has described an exemplary case where the user grouping unit 3 groups a plurality of users into a plurality of groups only in accordance with between-user positional relationships. However, such grouping may be performed also in accordance with the directions the users are facing, conversation information of each user (e.g., timing at which each user has a conversation, and identification information identifying a user with whom each user has a conversation), and the like.

Figure 15:
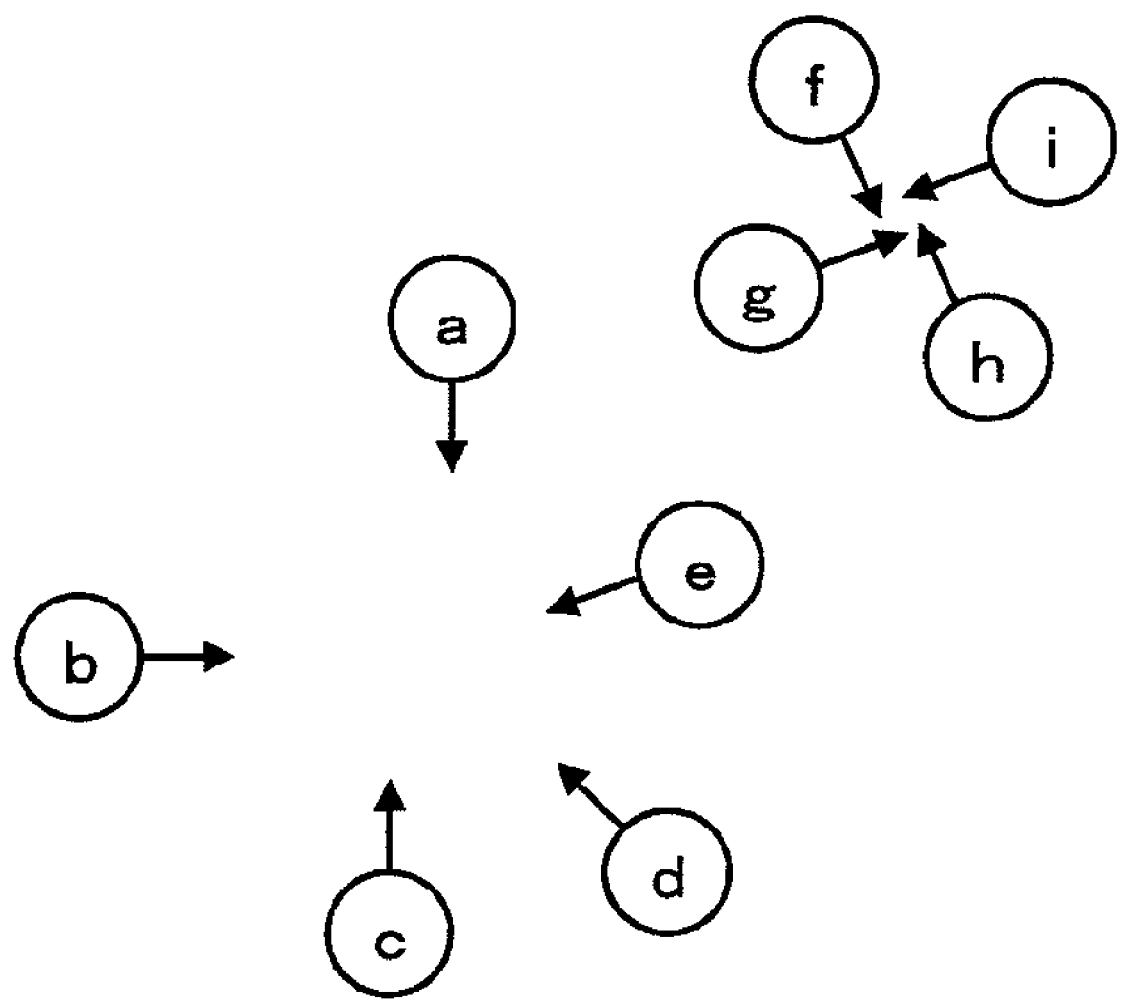
FIG. 15 exemplarily shows positional relationships between the users (a to i) and relationships between directions that the users (a to i) are facing, which are detected by the positional relationship detection unit 2.
Figure 16:
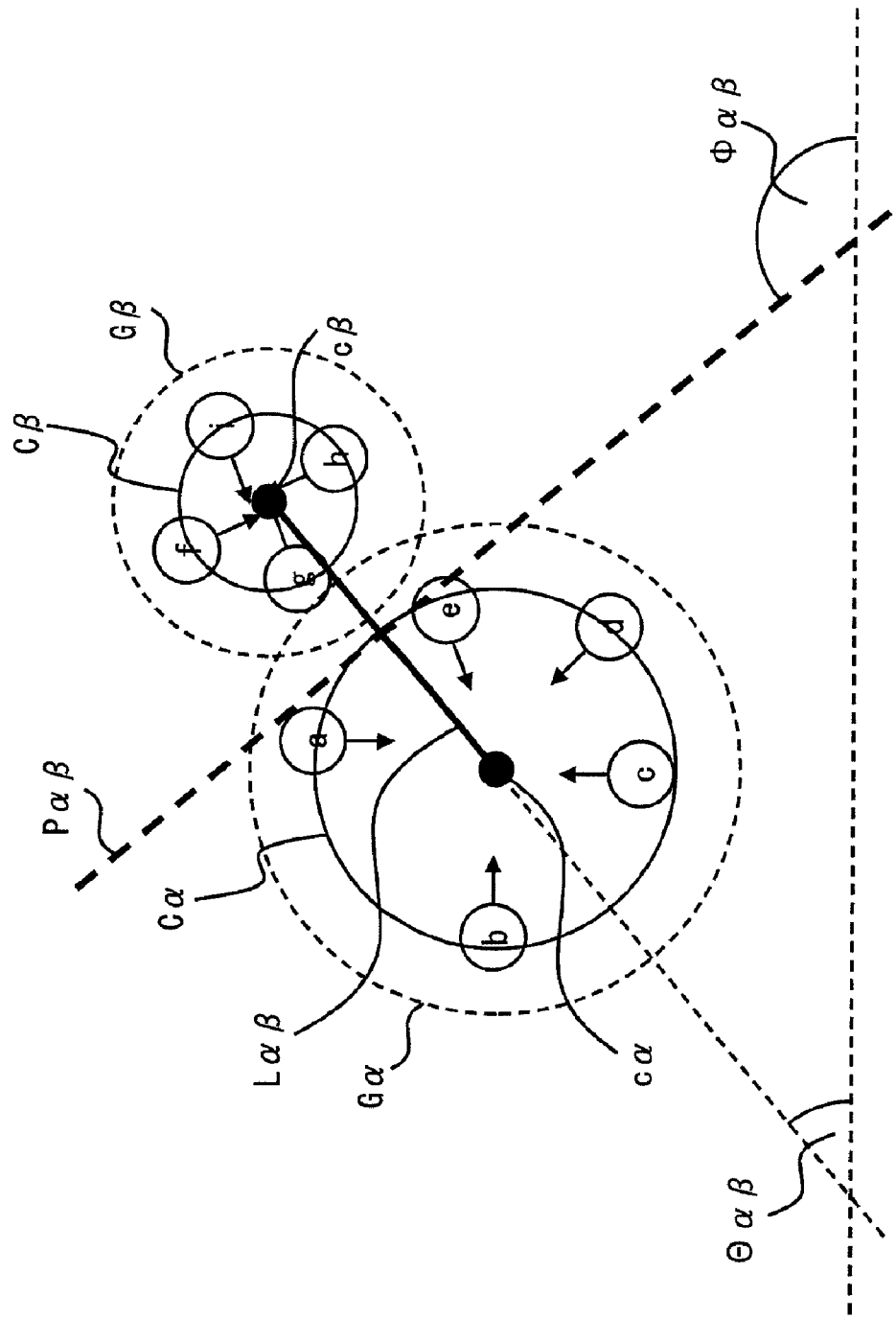
FIG. 16 exemplarily shows a result of grouping performed by the user grouping unit 3 after information pieces are input thereto, the information pieces relating to the between-user positional relationships and the relationships between the directions that the users are facing.
Figure 17:
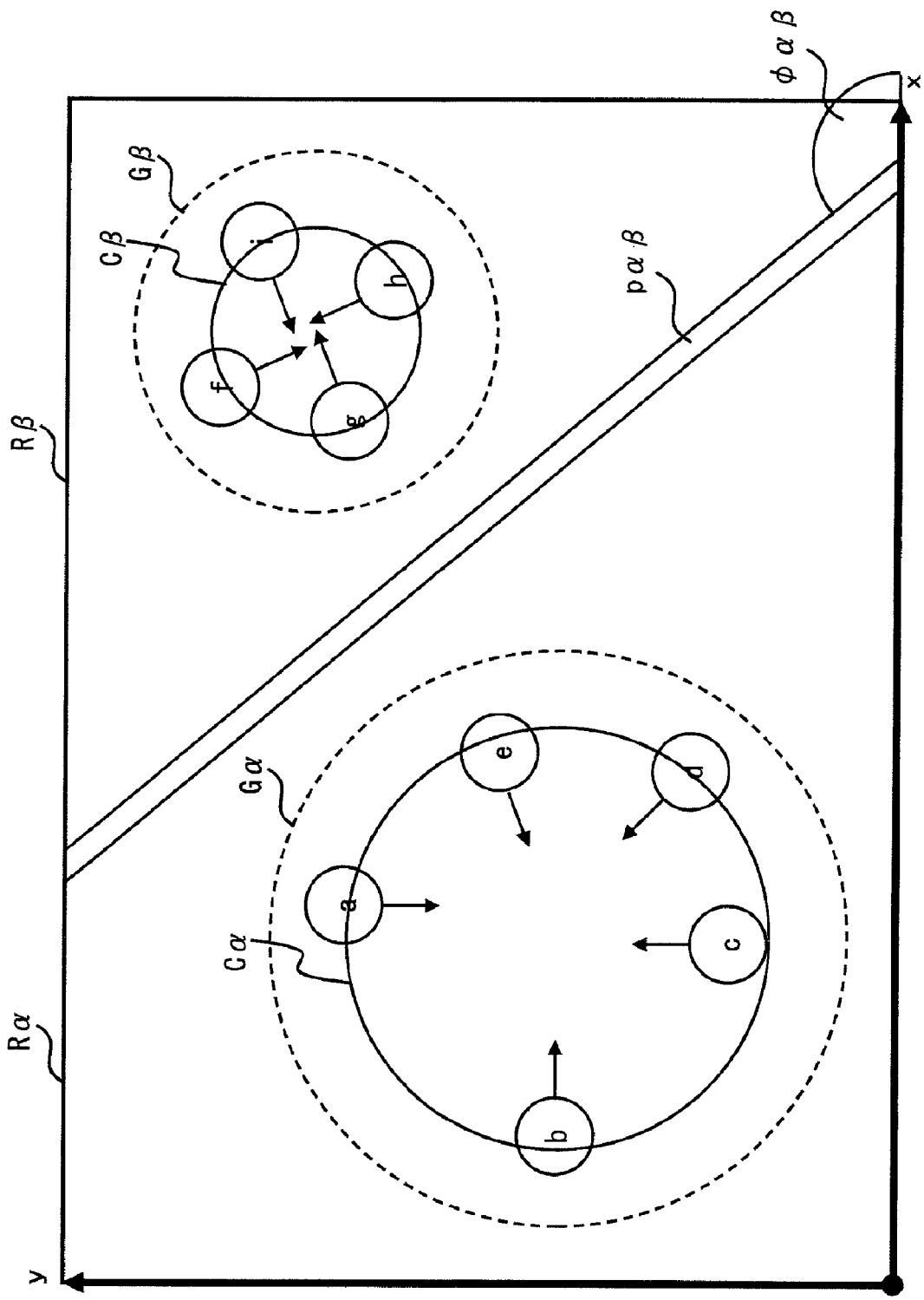
FIG. 17 exemplarily shows a display style according to which the positional relationship display unit 4 displays the screen.

As one example, FIG. 15 shows positional relationships between users a to i, and the directions the bodies of the users are facing. Arrows illustrated in FIG. 15 respectively indicate the directions the bodies of the users are facing. In the example of FIG. 15, if the user grouping unit 3 performs the grouping also in accordance with the directions the users are facing, the conversation information of each user (e.g., timing at which each user has a conversation, and identification information identifying a user with whom each has a conversation), and the like, then the user grouping unit 3 will be able to extract groups that cannot be extracted when the grouping is performed only in accordance with the between-user positional relationships. FIG. 16 shows communication groups Gα and Gβ that are each constituted by one or more of the users shown in FIG. 15, the groups Gα and Gβ being extracted not only based on the between-user positional relationships, but also based on the directions the users are facing and the like. After the grouping, if the positional relationship display unit 4 performs the above-described processing as shown in FIG. 16, then the between-user positional relationships will be displayed on the screen according to the display style shown in FIG. 17 (although not displayed in reality, supplementary lines and the like are added to FIG. 17 to assist comprehension).

In this case, the positional relationship detection unit 2 outputs, to the user grouping unit 3, information pieces indicating the directions the users are facing, in addition to the information pieces relating to the between-user positional relationships.

The user grouping unit 3 performs the grouping based on the received information pieces, namely (i) the information pieces relating to the between-user positional relationships, and (ii) the information pieces indicating the directions the users are facing. More specifically, the above-described clustering is performed so that, in each cluster, (i) the distance between any cluster pair is smaller than the predetermined value, and (ii) assuming that a first line originates from the position of one user and extends in the direction that said one user is facing, and that a second line originates from the position of another user and extends in the direction that said another user is facing, a distance between (a) a point at which the first line and the second line intersect each other and (b) the position of said one user is shorter than a threshold value.

(4) The above has described an exemplary case where the positional relationship display unit 4 displays information pieces utilized by the user grouping unit 3. However, the positional relationship display unit 4 does not need to display all of the information pieces utilized by the user grouping unit 3. Also, the positional relationship display unit 4 may visually display information pieces that are not utilized in performing the grouping, such as the directions the users are facing and conversation information pieces.

(5) The above has described an exemplary case where temporal positional relationships between a plurality of users are displayed. Alternatively, continual positional relationships between a plurality of users may be displayed dynamically in the following procedure. The data sensing unit 1 consecutively senses data pieces for detecting the positional relationships. The positional relationship detection unit 2 consecutively detects the between-user positional relationships based on the data pieces consecutively sensed by the data sensing unit 1. The user grouping unit 3 consecutively groups the users into a plurality of groups, based on the information pieces relating to the between-user positional relationships, which have been consecutively detected by the positional relationship detection unit 2. The positional relationship display unit 4 arranges and displays the groups on the screen, based on (i) the information pieces relating to the positional relationships between the users and (ii) information pieces relating to the groups that have been consecutively extracted by the user grouping unit 3.

(6) The above has described an exemplary case where positional relationships between a plurality of users are displayed. Alternatively, other relationships between the users than such positional relationships may be displayed. For instance, the X- and Y-axes may be set in view of closeness between the users, the closeness being represented by, for example, the number/frequency of email exchanges between the users, the number/frequency of conferences attended by the users, and the number/frequency of meetings between the users. Then, the users are mapped in such a manner that the greater these numbers/frequencies are, the closer the distance between the users is. This way, relationships between the users can be displayed in the similar manner as the between-user positional relationships shown in FIG. 5. By performing the above processing, the closeness between the users can be displayed according to the display style shown in FIG. 6. The same rule applies to other relationships between the users.

2. Embodiment 2

Figure 18:
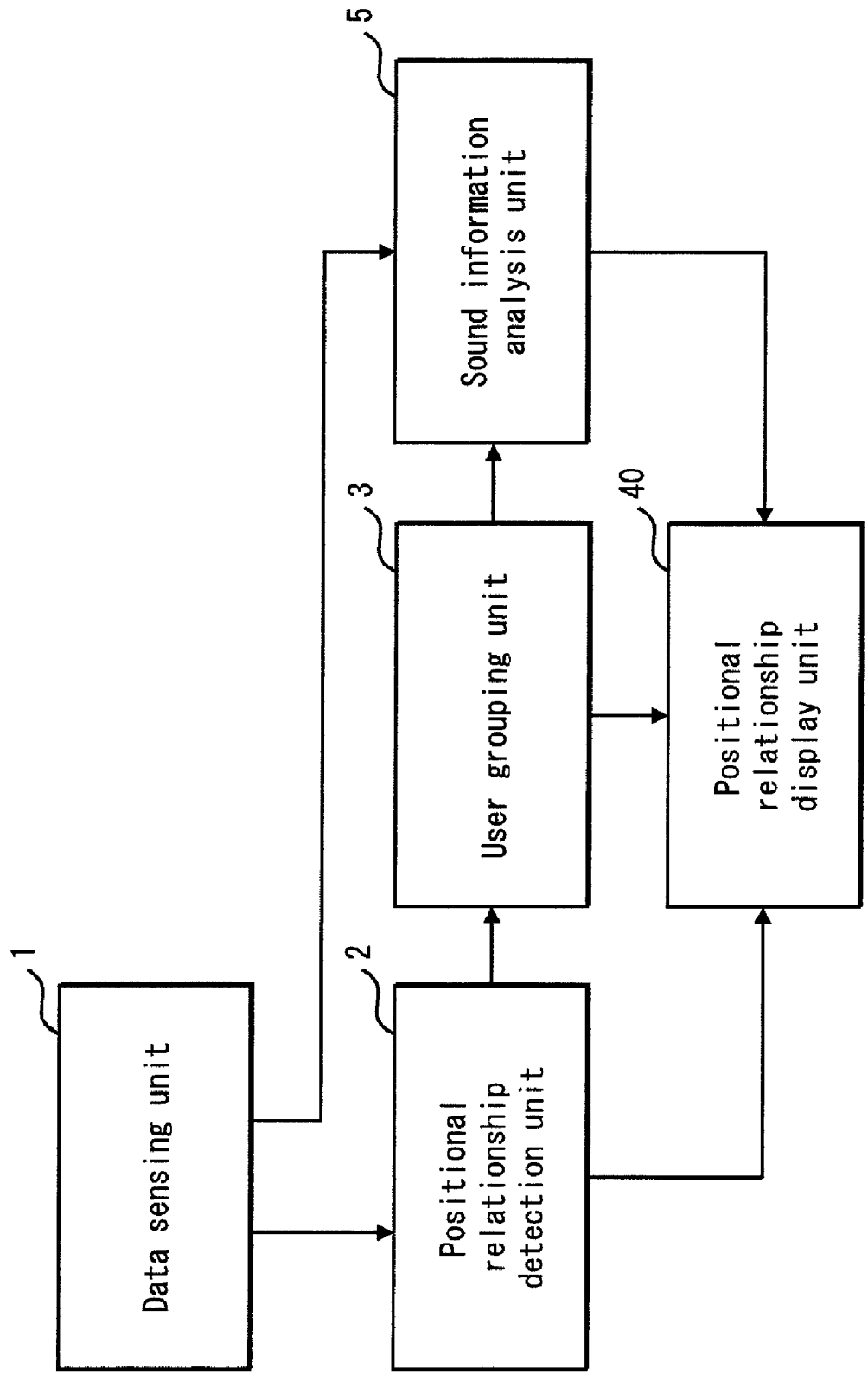
FIG. 18 is a functional block diagram of the structure of a system pertaining to Embodiment 2 of the present invention, the system (i) detecting between-user positional relationships from data pieces sensed, (ii) accordingly displaying the detected positional relationships, and (iii) visually displaying conversation statuses of the users.

FIG. 18 shows the structure of a system pertaining to Embodiment 2 of the present invention. The system pertaining to Embodiment 2 includes a sound information analysis unit, in addition to all the compositional elements explained in Embodiment 1. Furthermore, in Embodiment 2, each of the sensors worn by the users includes a microphone. For example, the users wear directional microphones that are positioned facing the mouths of the users, so that the microphones can only detect voices of the users as reliably as possible. The microphones may have signal processing functions to, for example, suppress noise other than the voices of the users.

In the present embodiment, as is the case with Embodiment 1, positional relationships between a plurality of users are detected from sensed data pieces, and the detected between-user positional relationships, as well as speech statuses of the users, are visually displayed. Descriptions of a positional relationship detection unit 2 and a user grouping unit 3 are omitted, as they are structured the same as their counterparts in Embodiment 1, which are shown in FIG. 1. A data sensing unit 1 senses data pieces for detecting positional relationships and sound information pieces relating to sounds made by the users, by using the sensors worn/carried by the users, sensors attached to environmental infrastructures, and the like. A sound information analysis unit 5 analyzes the sound information pieces relating to the sounds made by the users, and calculates activity levels of conversations made in the groups extracted by the user grouping unit 3.

A positional relationship display unit 40 arranges and displays the groups on the screen, based on (i) the information pieces relating to the between-user positional relationships, which have been detected by the positional relationship detection unit 2, and (ii) the information pieces relating to the groups extracted by the user grouping unit 3. The positional relationship display unit 4 also visually displays the speech statuses of the users and conversation statuses of the groups, which have been calculated by the sound information analysis unit 5.

Below, a detailed description is given of Embodiment 2, with a focus on the sound information analysis unit 5.

2.1 Sound Information Analysis Unit 5

Figure 19:
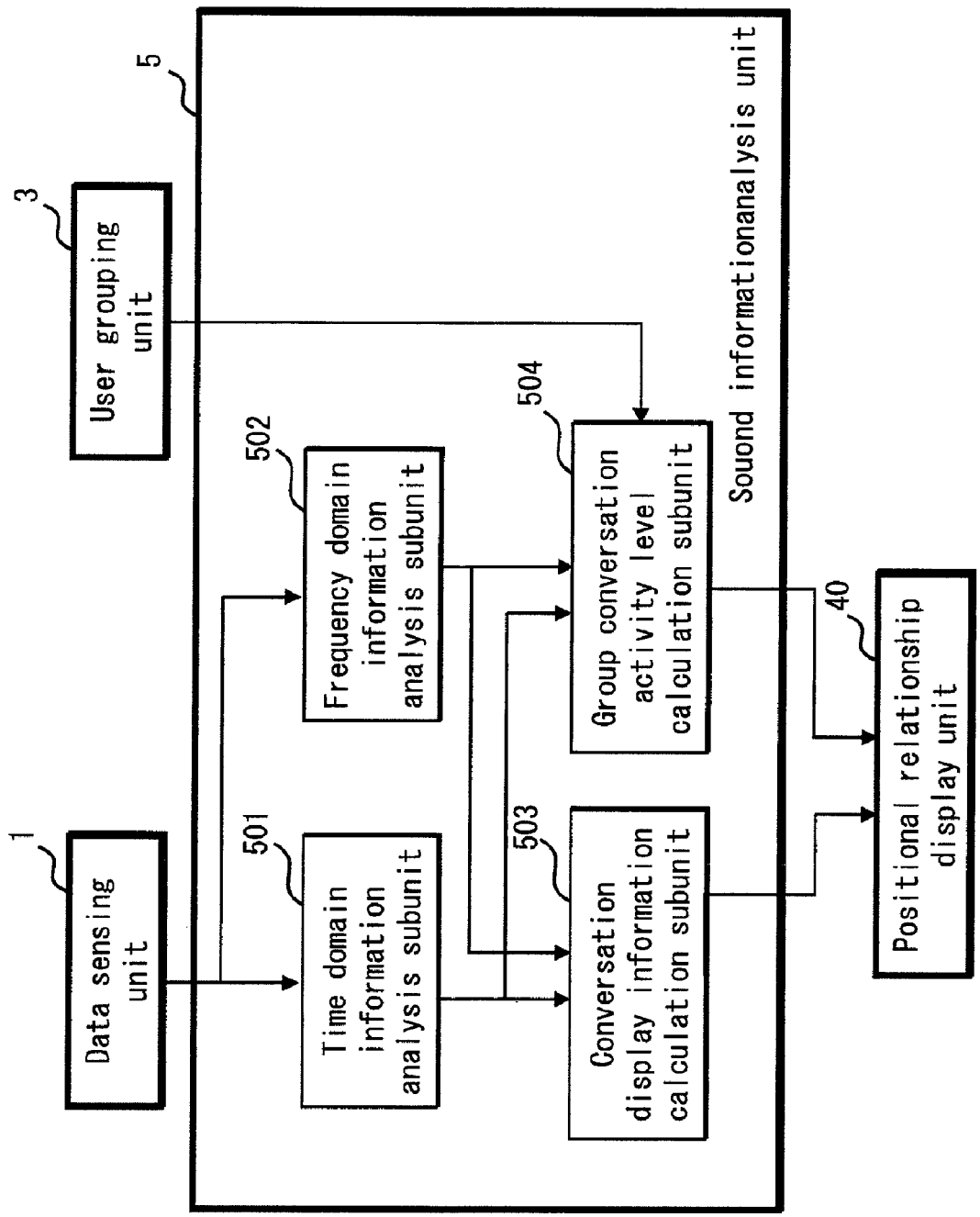
FIG. 19 is a functional block diagram of an internal structure of a sound information analysis unit 5.

FIG. 19 shows an internal structure of the sound information analysis unit 5. As shown in FIG. 19, the sound information analysis unit 5 is composed of a time domain information analysis subunit 501, a frequency domain information analysis subunit 502, a conversation display information calculation subunit 503, and a group conversation activity level calculation subunit 504. Descriptions of these compositional elements are given below.

The time domain information analysis subunit 501 and the frequency domain information analysis subunit 502 calculate a physical characteristic amount of the voice of each user, with reference to the sound information pieces of the users acquired from the data sensing unit 1. It is generally well-known that the three auditory components of a sound are loudness, pitch, and timbre.

(1) Time Domain Information Analysis Subunit 501

The time domain information analysis subunit 501 sequentially calculates, for each user, power information piece that expresses loudness of the voice of the user. At the same time, the time domain information analysis subunit 501 also detects, from temporal changes in the power information, a start and an end of a speech made by each user. The time domain information analysis subunit 501 outputs, to the conversation display information calculation subunit 503, (i) the calculated power information pieces and (ii) information pieces that each show the start and end of a corresponding one of the speeches.

Furthermore, the time domain information analysis subunit 501 periodically calculates, for each user, (i) a speech frequency Nc, which is the number of speeches made by the user per unit of time, (ii) a speech duration rate Rs per unit of time, and (iii) standard deviation Srs of the speech duration rate Rs. Then, the time domain information analysis subunit 501 outputs, to the group conversation activity level calculation subunit 504, the calculated (i) conversation frequency Nc, (ii) speech duration rate Rs, and (iii) standard deviation Srs of the speech duration rate Rs, of each user.

(2) Frequency Domain Information Analysis Subunit 502

The frequency domain information analysis subunit 502 periodically calculates, for each user, (i) a pitch frequency that expresses the pitch of the voice, and (ii) a spectral centroid correlated with the timbre of the voice.

The pitch frequency changes with time, and gives accents and intonations to words, phrases, and clauses. As the average of values of the pitch frequency differs depending on the sex and age of the user, the pitch frequency is regarded to be expressing prosodiac information. One method to calculate the pitch frequency is to use a cepstrum that is estimated from a harmonic level of the frequency. Another method to calculate the pitch frequency is to use an algorithm that is estimated from the cyclicity of a waveform with use of an autocorrection function.

Meanwhile, the spectral centroid is calculated by (i) analyzing a sound spectrum and (ii) calculating a high-harmonic frequency component to be the center of harmonic frequency components.

Then, the frequency domain information analysis subunit 502 outputs the calculated pitch frequency and spectral centroid to the conversation display information calculation subunit 503.

Furthermore, the frequency domain information analysis subunit 502 sequentially analyzes the sound information pieces of the users so as to (i) distinguish among normal sound, cheer/laughter, and silence, and (ii) calculates, for each user, a frequency Na of cheer/laughter periods per unit of time. The frequency domain information analysis subunit 502 then outputs, to the group conversation activity level calculation subunit 504, the frequency Na of the cheer/laughter periods that has been calculated for each user.

(3) Conversation Display Information Calculation Subunit 503

The conversation display information calculation subunit 503 calculates information pieces for visually displaying the speech statuses of the users on the screen, based on the physical characteristic amounts of the voices of the users (i.e., the power information pieces, the information pieces each indicating the start and end of the corresponding speech, the pitch frequencies, and the spectral centroids), which have been calculated by the time domain information analysis subunit 501 and the frequency domain information analysis subunit 502.

For example, by using the power information pieces calculated by the time domain information analysis subunit 501, the conversation display information calculation subunit 503 generates information pieces for visually displaying the loudness and direction of the voice of each user (e.g., identification information pieces indicating the users, and image data pieces for forming graphics that will be exemplarily explained below).

Figure 24:
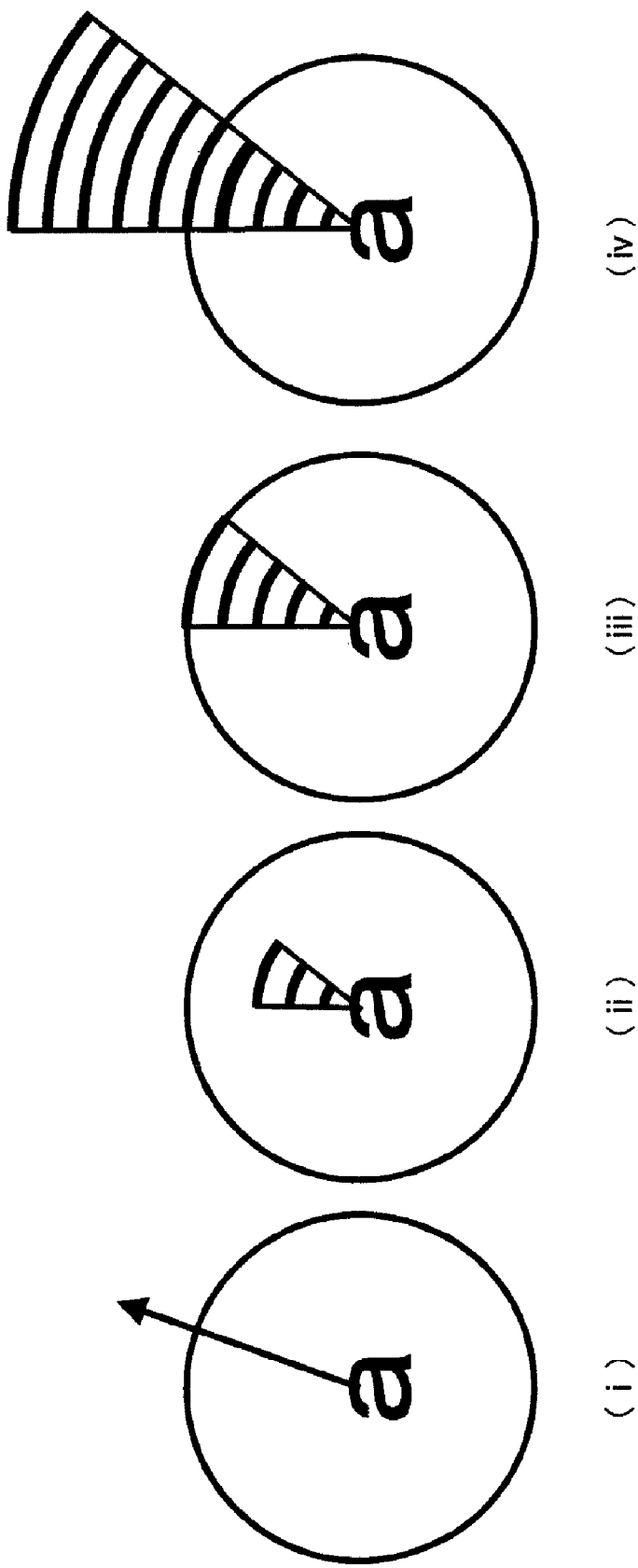
FIG. 24 exemplarily shows a method for visually expressing loudness of a voice.

FIG. 24 exemplarily shows a method for visually expressing loudness of a voice. An arrow shown in the illustration (i) of FIG. 24 indicates the direction the user a is facing. Fan-shaped graphics shown in the illustrations (ii), (iii) and (iv) of FIG. 24 each indicate the direction and loudness of the voice of the user a. The illustration (i) of FIG. 24 shows a silent status (where no sound is made). In each of the illustrations (ii), (iii), and (iv) of FIG. 24, loudness of the voice of the user a is indicated by the size of the fan-shaped graphic; the larger the size of the fan-shaped graphic is, the larger the loudness is.

In the example of FIG. 24, the conversation display information calculation subunit 503 determines which graphic to display, based on the power information pieces and the information pieces each indicating the start and end of the corresponding speech, which have been calculated by the time domain information analysis subunit 501. During a silent period, the conversation display information calculation subunit 503 does not cause display of any fan-shaped graphic, but merely causes display of an arrow indicating the direction the user a is facing, as shown in the illustration (i) of FIG. 24. On the other hand, from a start to an end of a sound period (where a sound is made), the conversation display information calculation subunit 503 causes display of a fan-shaped graphic whose radius has a length proportional to the loudness of the voice indicated by the corresponding power information (shown in the illustrations of (ii), (iii), and (iv) of FIG. 24). At this time, the conversation display information calculation subunit 503 sets minimum and maximum values for the length of the radius of a fan-shaped graphic in advance, so that the power information pieces are mapped in accordance with the minimum and maximum values. This can prevent display of graphics that are larger than are necessary.

Figure 25:
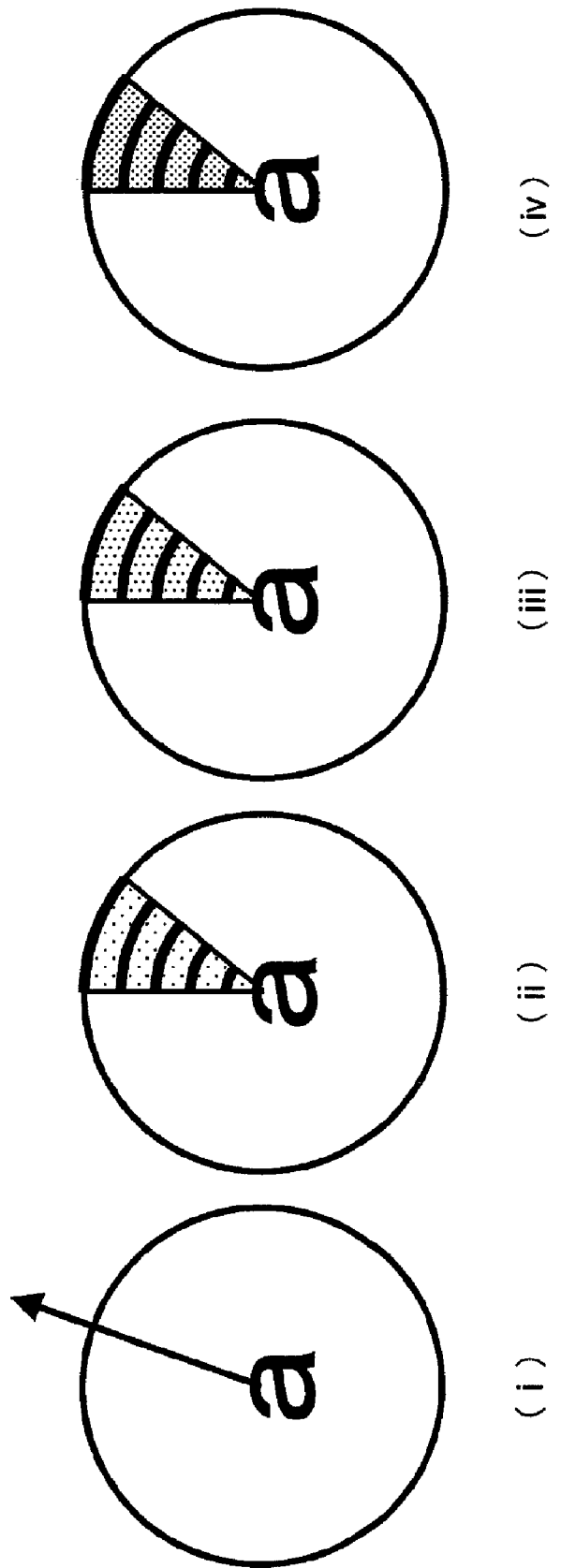
FIG. 25 exemplarily shows another method for visually expressing loudness of a voice.

FIG. 25 exemplarily shows another method for visually expressing loudness of a voice. An arrow shown in the illustration (i) of FIG. 25 indicates the direction the user a is facing. Fan-shaped graphics shown in the illustrations (ii), (iii), and (iv) of FIG. 24 each indicate the direction and loudness of the voice of the user a. The illustration (i) of FIG. 25 shows a silent status. In each of the illustrations (ii), (iii), and (iv) of FIG. 25, loudness of the voice of the user a is indicated by the saturation of the color of the fan-shaped graphic; the higher the saturation is, the larger the loudness is.

In the example of FIG. 25, the conversation display information calculation subunit 503 sets a color of the fan-shaped graphic, so that the saturation of the color is proportional to the loudness of the voice indicated by the corresponding power information calculated by the time domain information analysis subunit 501. In this case, unlike the example of FIG. 24, the size of the fan-shaped graphic does not change. This is considered to be advantageous in the sense that, especially when there are a large number of users to be displayed, the fan-shaped graphics do not take much space when displayed on the screen.

Although it has been described above that the loudness of each voice is expressed in accordance with the corresponding power information piece, each voice may instead be expressed in accordance with other information, such as an average amplitude value.

As another example, the conversation display information calculation subunit 503 may generate information pieces that each express the pitch of the voice of the corresponding user, by using the pitch frequencies calculated by the frequency domain information analysis subunit 502.

Figure 26:
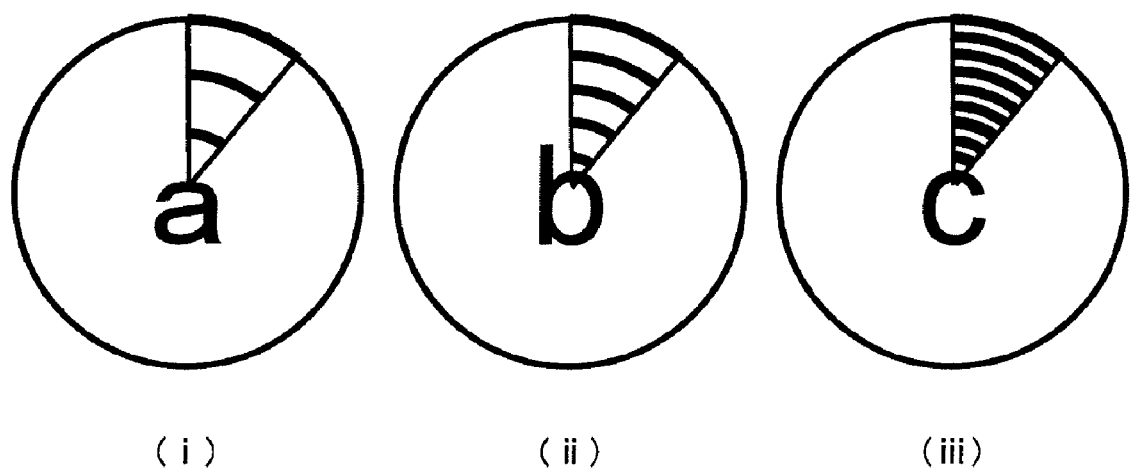
FIG. 26 exemplarily shows a method for visually expressing pitch of a voice.

FIG. 26 exemplarily shows a method for visually expressing the pitch of a voice. In each of the illustrations (i), (ii), and (iii) of FIG. 26, the pitch frequency of the voice of the user a, b, or c is indicated by the distance between stripes of the fan-shaped graphic. Here, as one example, the smaller the distance between the stripes is, the larger the pitch frequency is. In other words, of the voices of the three users, the voice of by the user a has the smallest pitch frequency (shown in the illustration (i) of FIG. 26), and the voice of the user c has the largest pitch frequency (shown in the illustration (iii) of FIG. 26).

Timbre information pieces each indicate the timbre of the voice of the corresponding user. The timbre information pieces are expressed by using information pieces indicating the spectral centroids calculated by the frequency domain information analysis subunit 502. Each of the timbre information pieces is expressed by (i) averaging a corresponding one of the spectral centroids in a predetermined time period, and (ii) mapping an information piece indicating the timbre information piece in the form of hue (red, orange, yellow, green, blue, indigo, and violet).

In the above-described manner, the conversation display information calculation subunit 503 maps the physical characteristic amounts (i.e., loudness, pitch, timbre, etc.) of the voices of the users in the forms of graphics or colors, and converts the mapped physical characteristic amounts into image data pieces for visually displaying characteristics of the voices on the screen.

The conversation display information calculation subunit 503 outputs, to the positional relationship display unit 4, the image data pieces generated by the aforementioned conversion processing in one-to-one correspondence with the identification information pieces indicating the users.

Furthermore, as the conversation display information calculation subunit 503 sequentially performs the aforementioned conversion/output processing, the positional relationship display unit 4 can dynamically display temporal changes in the voices of the users.

(4) Group Conversation Activity Level Calculation Subunit 504

With reference to the physical characteristic amounts of and temporal changes in the voices of the users belonging to the respective groups, the group conversation activity level calculation subunit 504 calculates how actively each user is joining the conversation with other users, and estimates an activity level of conversations made in each group.

More specifically, the group conversation activity level calculation subunit 504 acquires (i) the group configuration information pieces of the groups (e.g., $G\alpha=\{a, b, c, d, e\}$) from the user grouping unit 3, (ii) the speech frequency $N_c$, the speech duration rate $R_s$, and the standard deviation $S_{rs}$ of each user, which have been calculated by the time domain information analysis subunit 501, and (iii) the frequency Na of cheer/laughter periods of each user, which has been calculated by the frequency domain information analysis subunit 502. Based on these information pieces, the group conversation activity level calculation subunit 504 calculates a group conversation activity level Ag (m) of a group m by using, for instance, the following evaluation expression. It is assumed that each of k0, k1, and k2 is a positive constant. In the following evaluation expression, AVE [X] means averaging physical quantities X of users belonging to the group m.

$$Ag(m)=k0*AVE[Nc]+k1*(AVE[Rs]-Srs)+k2*AVE[Na]$$

In the above manner, the group conversation activity level calculation subunit 504 can analyze the sound information pieces of the users, and therefore can calculate the conversation activity level Ag as a numerical value indicating the activity level of conversations made in the group.

Thereafter, in accordance with the value of the calculated group conversation activity level Ag, the group conversation activity level calculation subunit 504 outputs, to the positional relationship display unit 4, (i) data for visually expressing the activity level of conversations made in the group (e.g., color information generated by mapping the activity level in the form of color, saturation, or color darkness, in correspondence with (ii) an identifier indicating the group targeted for the calculation of Ag.

2.2 Positional Relationship Display Unit 40

Figure 20:
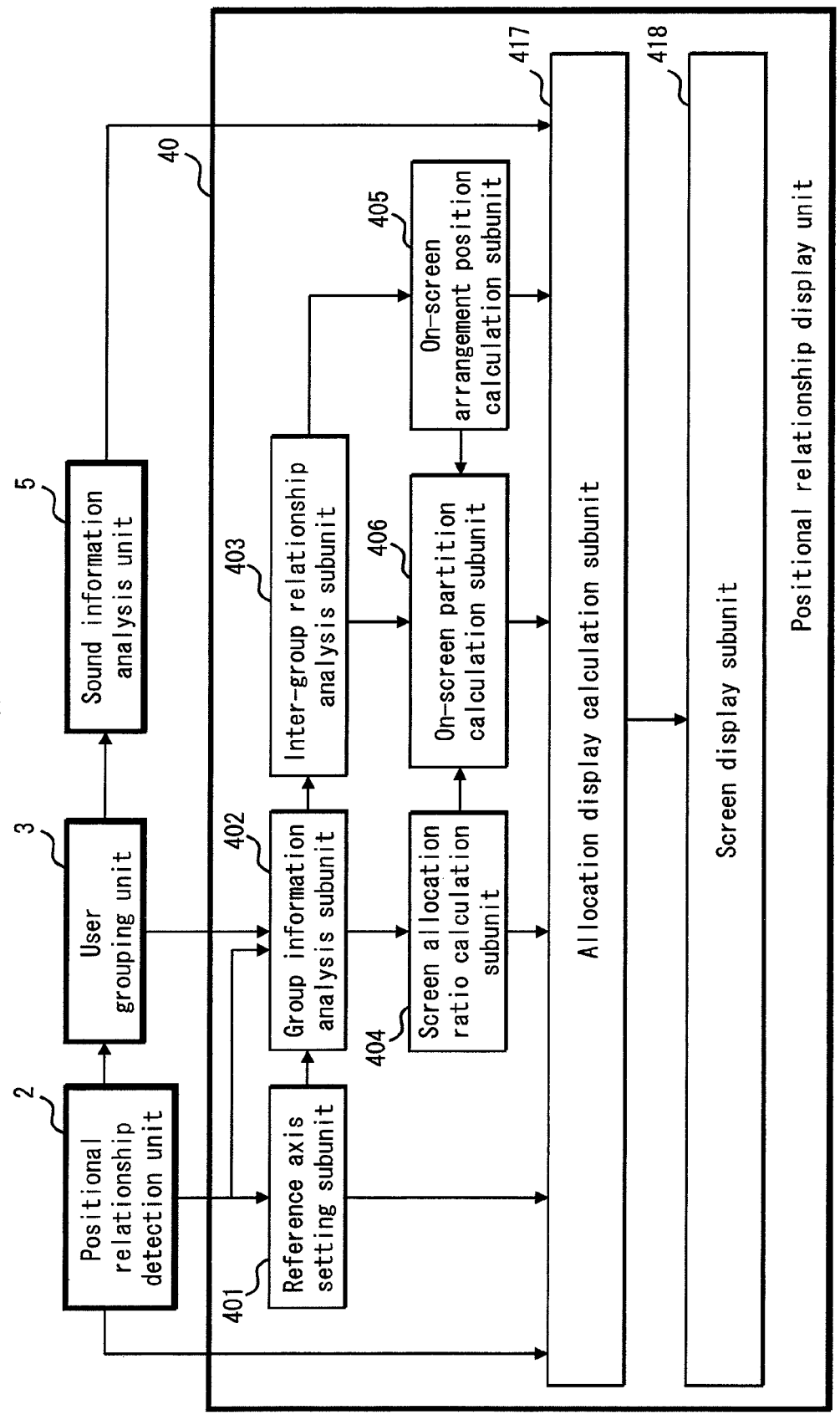
FIG. 20 is a functional block diagram of an internal structure of the positional relationship display unit 4 pertaining to Embodiment 2.

FIG. 20 shows an internal structure of the positional relationship display unit 40. As functional components that are assigned the reference numbers 401, 402, 403, 404, 405, and 406 are structured the same as their counterparts that are shown in FIG. 4 and assigned the same reference numbers, their descriptions are omitted.

The positional relationship display unit 40 of FIG. 20 and the positional relationship display unit 4 of FIG. 4 are different from each other in that an allocation display calculation subunit 417 and a screen display subunit 418 of the former perform processing differently from those of the latter. In the present embodiment, the allocation display calculation subunit 417 is provided with information pieces indicating conversation statuses (i.e., the physical information indicating speeches made by each user, and the conversation activity level information of each group), which are output from the sound information analysis unit 5. More specifically, the allocation display calculation subunit 417 receives (i) the image data pieces generated by mapping the physical information pieces of voices of the users, (ii) the color information generated by mapping the conversation activity level of each group, and (iii) an identifier indicating each group.

As with the allocation display calculation subunit 407 pertaining to Embodiment 1, the allocation display calculation subunit 417 acquires (i) the information pieces relating to the between-user positional relationships, which are detected by the positional relationship detection unit 2, (ii) the X- and Y-axes set by the reference axis setting subunit 401, (iii) the ratio between areas of the screen to each of which the corresponding group is allocated, the ratio being calculated by the screen allocation ratio calculation subunit 404, (iv) the on-screen arrangement positions of the groups, which are calculated by the on-screen arrangement position calculation subunit 405, and (v) the information relating to the on-screen partition calculated by the on-screen partition calculation subunit 406. Based on these information pieces, the allocation display calculation subunit 417 calculates, for each group, a size with which the positional relationship between the users belonging to the group would be displayed in the corresponding area of the screen.

To be more specific, the allocation display calculation subunit 417 calculates, for instance, on-screen display positions/sizes of the users belonging to each group as well as display positions/directions of the image data pieces showing the speech statuses of the users, in such a manner that each of the smallest circles C (in the example of FIG. 5, Cα and Cβ), which includes coordinates of the users u belonging to the corresponding group G around the centroid c, can easily fit in the corresponding area of the screen (note, each display direction denotes the direction that the body of the corresponding user is facing, and is measured with the display position of the corresponding user serving as a base point).

Based on the screen display method calculated by the allocation display calculation subunit 417, the screen display subunit 418 displays the information pieces relating to the between-user positional relationships, and images that visually express the speech statuses of the users. Furthermore, the screen display subunit 418 (i) creates the linkage between data pieces (e.g., images and sounds) sensed by the sensors worn/carried by the users and the between-user positional relationships displayed, and (ii) constructs a UI for the operator. If the operator selects a position of one of the users while the between-user positional relationships are being displayed, this UI will cause playback or pop-up display of data pieces sensed by the sensor worn/carried by said one of the users.

Figure 21:
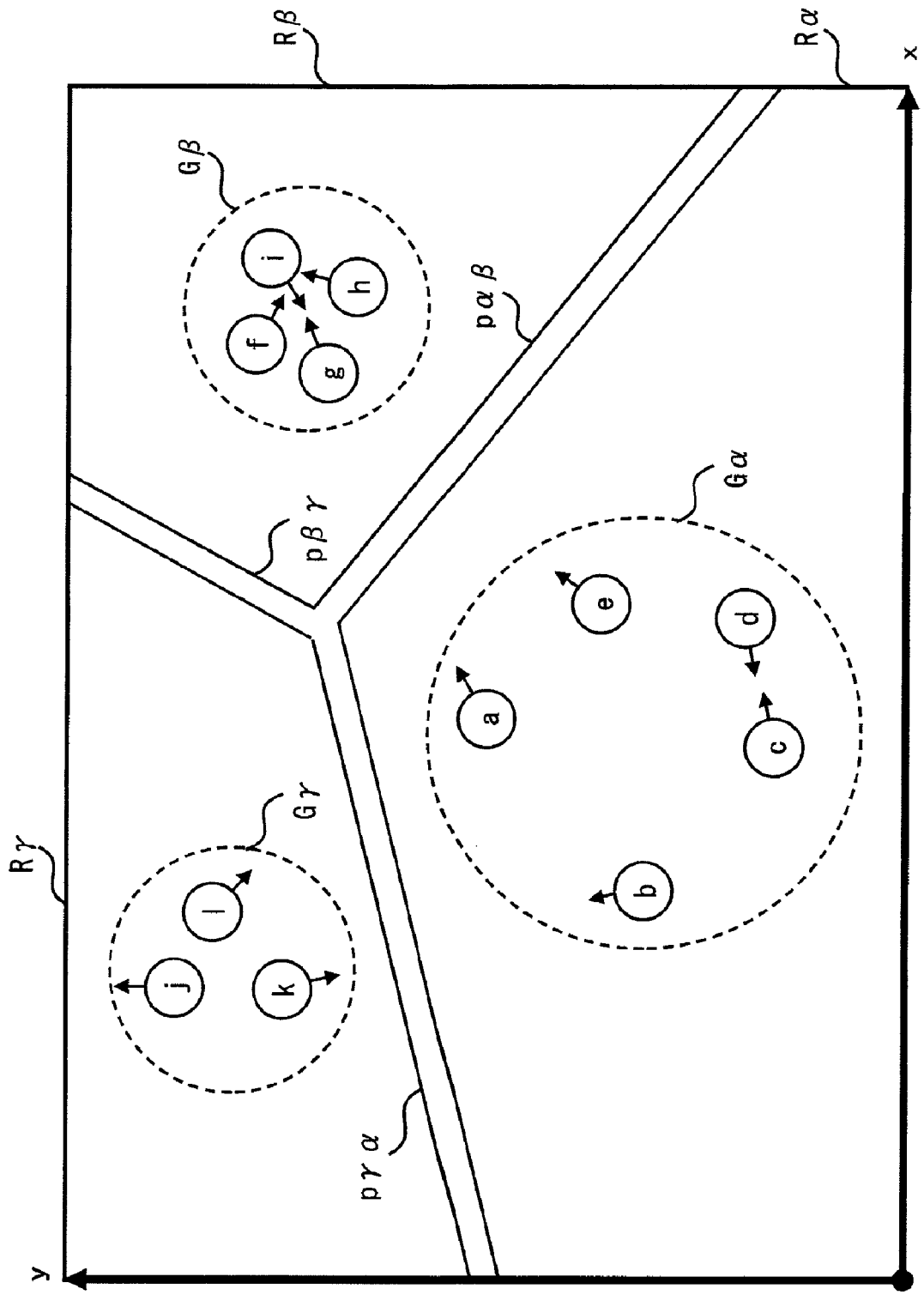
FIG. 21 exemplarily illustrates a screen displayed by the positional relationship display unit 4, the screen showing the between-user positional relationships and the relationships between the directions that the users are facing, which are acquired as a result of grouping performed by the user grouping unit 3.

FIG. 21 exemplarily shows a screen displayed when the processing shown in FIG. 5 has been performed by the user grouping unit 3 and the positional relationship display unit 4. Direction information pieces are added to the users a to i shown in FIG. 21 in the forms of arrows, the direction information pieces indicating the directions the users a to i are facing. At this point, the screen of FIG. 21 does not reflect the information pieces for visually expressing the speech statuses of the users.

Figure 22:
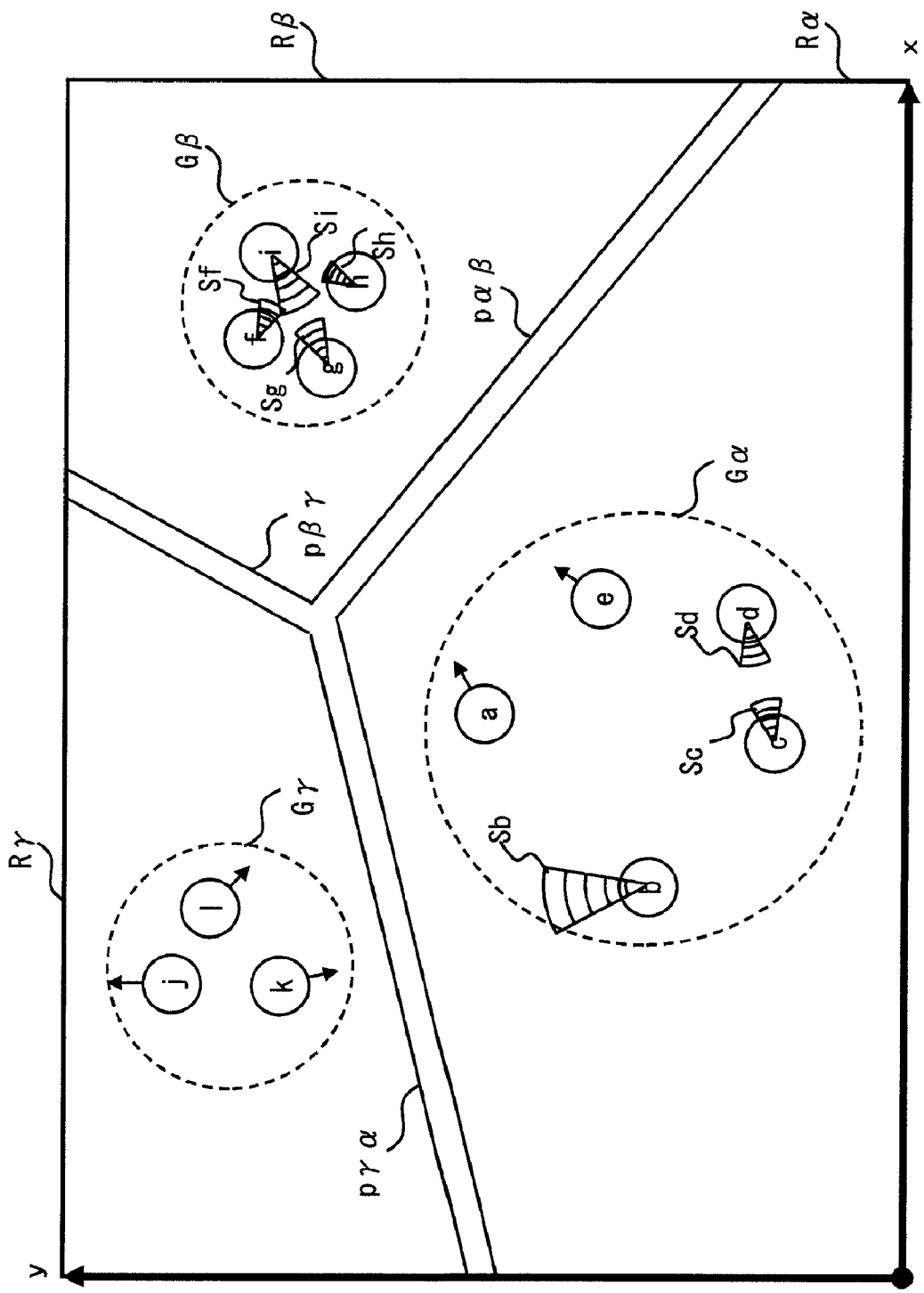
FIG. 22 exemplarily illustrates a screen displayed by the positional relationship display unit 4, the screen visually showing the conversation statuses of the users, which are acquired by the sound information analysis unit 5.

FIG. 22 exemplarily shows the screen of FIG. 21 to which fan-shaped graphics have been added, the fan-shaped graphics expressing the loudness of voices using the method shown in FIG. 24. Physical information indicating the speech status of each user (i.e., information indicating the loudness, pitch, and timbre of each voice) will be added to a corresponding one of the fan-shaped graphics. The screen of FIG. 22 visually shows the following situations of the groups Gα, Gβ, and Gγ. In the group Gα, the user b is talking to a user(s) who does not belong to the group Gα to which the user b belongs. The users c and d are having a conversation, facing each other. Each of the users a and e (i) is facing the direction in which none of the users who belong to the group Gα, to which the users a and e belong, exists, and (ii) has not spoken for a while. On the other hand, in the group Gβ, the four users f, g, h, and i are having a conversation, facing one another. In the group Gγ, each of the three users j, k, and l is facing the direction in which none of the users who belong to the group Gγ exists. None of the three users j, k, and l is speaking. The display of FIG. 22 enables the operator to visually grasp (i) the speech statuses of the users belonging to all of the three groups and (ii) the directions these users are facing.

Figure 23:
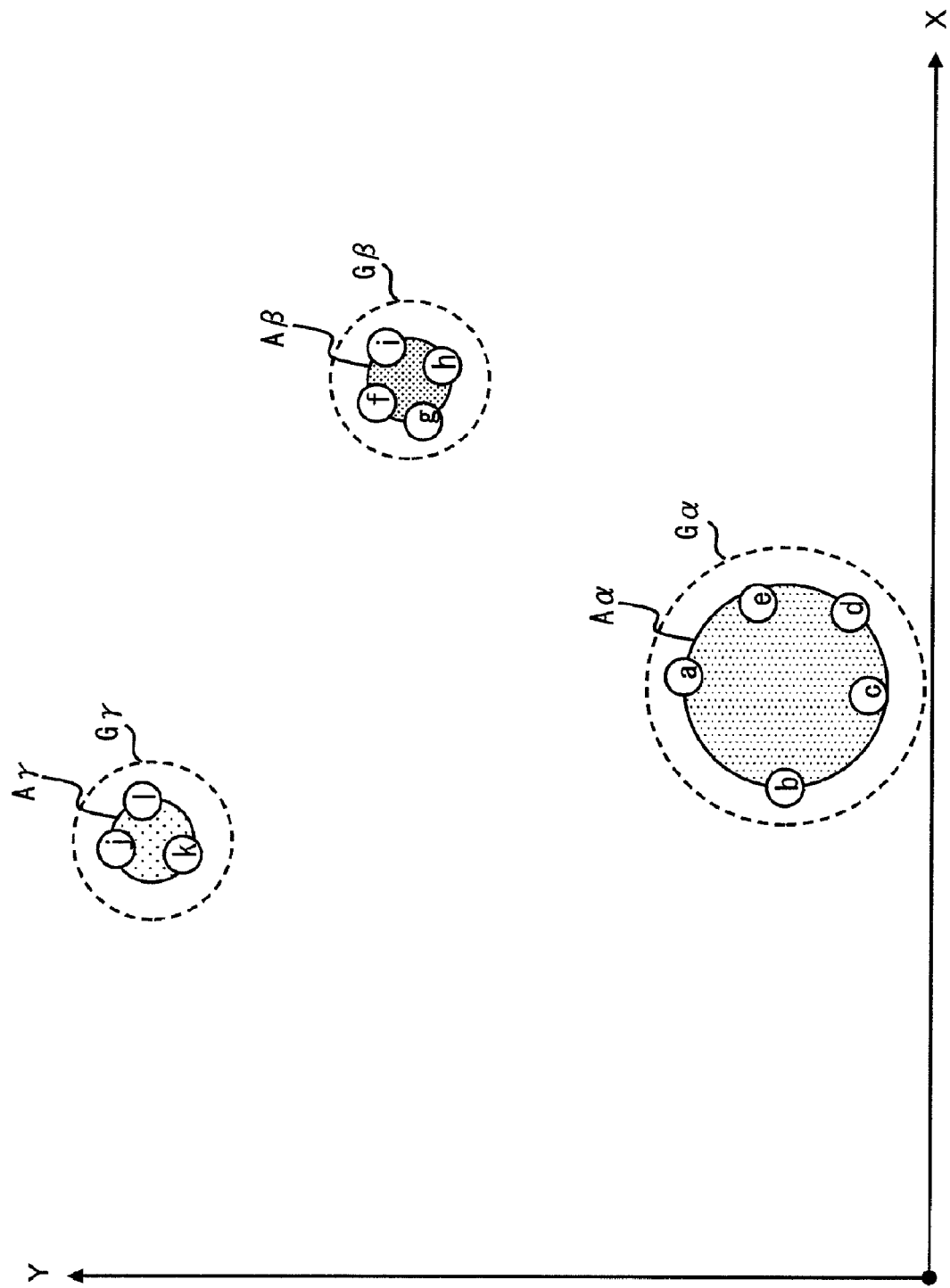
FIG. 23 exemplarily illustrates a screen displayed by the positional relationship display unit 4, the screen visually showing conversation activity level information pieces of the groups as if the groups are viewed from above, the information pieces being acquired by the sound information analysis unit 5.

FIG. 23 exemplarily shows a case where the positional relationship between the groups is displayed as viewed from above. In this case, the allocation display calculation subunit 417 calculates the on-screen display positions of the users in accordance with the information pieces output from the positional relationship detection unit, the reference axis setting subunit, and the user grouping unit. The allocation display calculation subunit 417 does not take into consideration the information pieces output from the screen allocation ratio calculation subunit, the on-screen partition calculation subunit, and the on-screen arrangement position calculation subunit.

Although the screen of FIG. 23 allows the operator to grasp a relative positional relationship between the three groups, the display size of each user is small. That means, if graphics for visually expressing the physical information pieces indicating the speech statuses of the users are added to this screen, then such graphics would look too small or be overlaid on one another, and thus fail to visually express said physical information pieces in a successful manner. For this reason, when display is performed according to the display format of FIG. 23, the allocation display calculation subunit 417 outputs the color information pieces acquired by mapping the conversation activity levels of the groups, instead of outputting the display positions/directions indicating the speech statuses of the users.

The screen display subunit 418 displays the conversation activity levels of the groups based on the color information pieces corresponding to the respective groups, in such a manner that they can be compared to one another. Referring to FIG. 23, the screen display subunit 418 displays each of the smallest circle C (each group) in a color indicated by a corresponding one of the color information pieces. This way, the screen display subunit 418 can visually express the conversation activity levels of the groups by using different saturations or hues.

The screen display subunit 418 may switch between display of the screen shown in FIG. 22 and display of the screen shown in FIG. 23 by way of an operation by the operator.

2.3 Operations of Sound Information Analysis Unit 5

Figure 27:
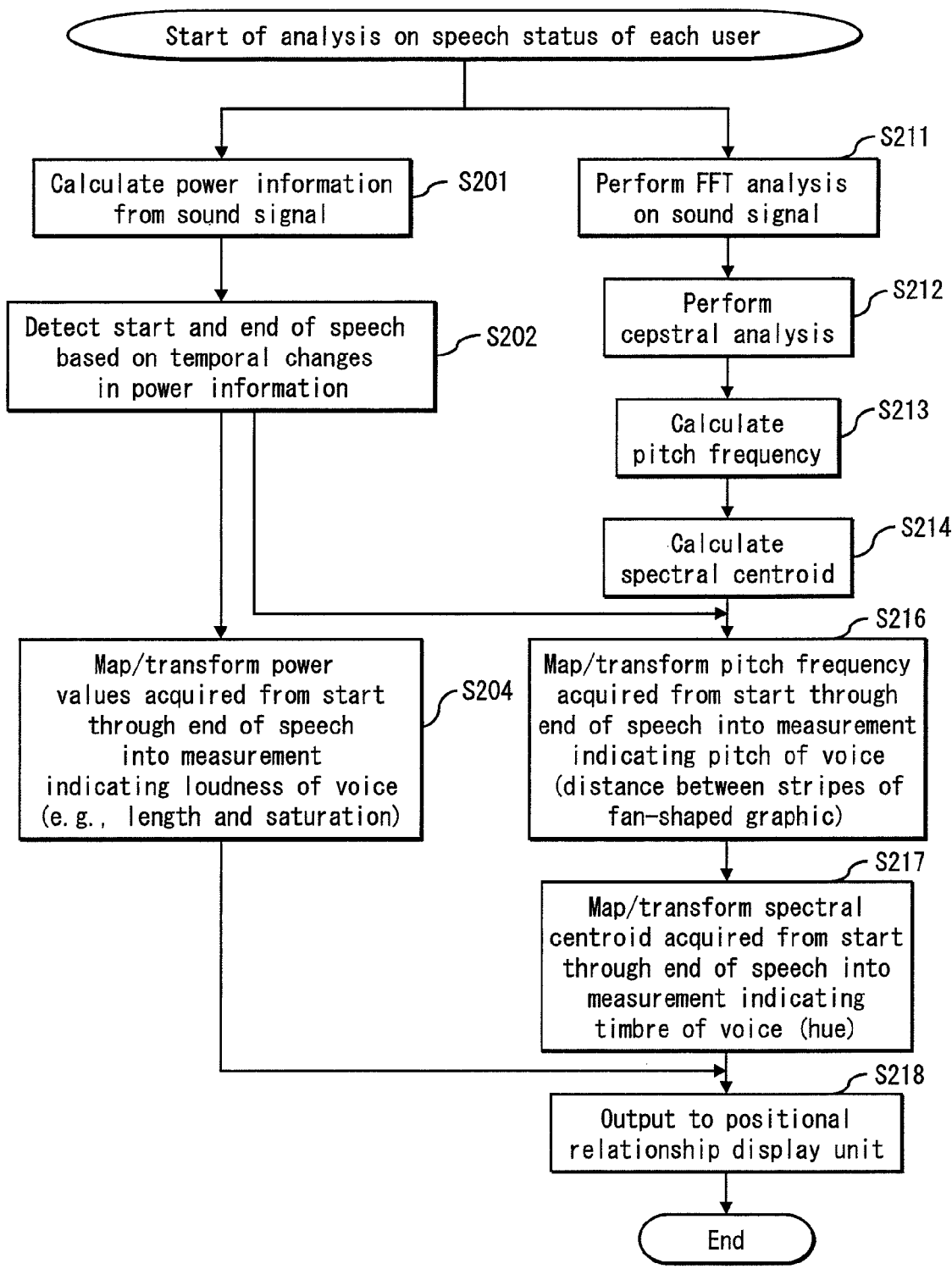
FIG. 27 is a flowchart of operations to analyze speech statuses of the users.
Figure 28:
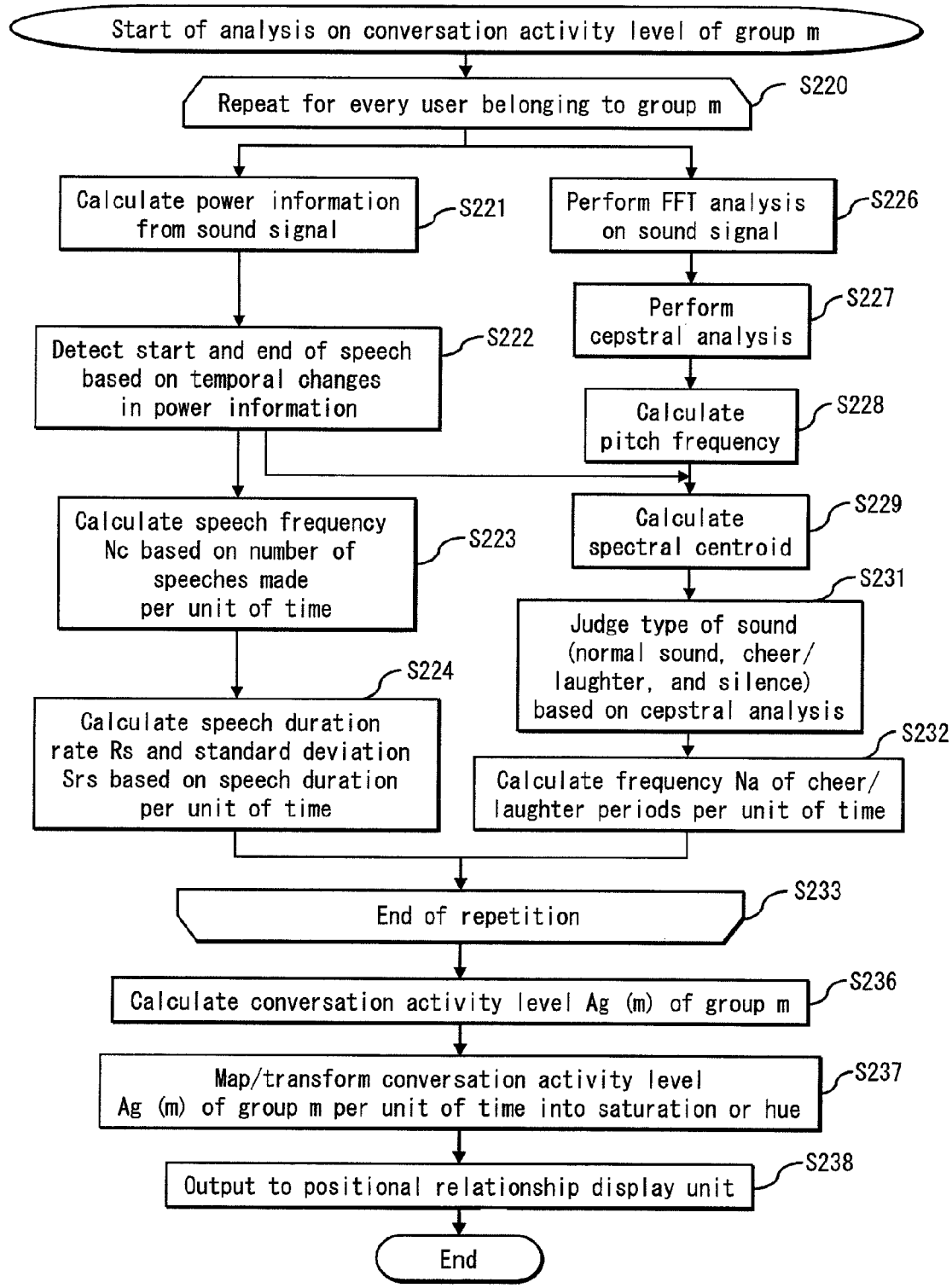
FIG. 28 is a flowchart of operations to analyze a conversation activity level of a group.

FIGS. 27 and 28 are flowcharts of operations performed by the sound information analysis unit 5. With reference to FIGS. 27 and 28, the following describes the operations performed by the sound information analysis unit 5.

The operations shown in FIG. 27 and the operations shown in FIG. 28 are illustrated on different drawing sheets for the purpose of simplicity. These two sets of operations may be performed either sequentially or in parallel. Alternatively, the operator may select and cause execution of only one of these two sets of operations.

(1) Analysis on Speech Status of Each User

FIG. 27 shows operations performed by the sound information analysis unit 5 to analyze a speech status of each user. Although FIG. 27 exemplarily shows analysis on a speech status of one user, the sound information analysis unit 5 repeatedly performs the same operations for all the users, one after another. Alternatively, the sound information analysis unit 5 may perform these operations concurrently for all the users in parallel.

The time domain information analysis subunit 501 calculates power information from a sound signal acquired from the data sensing unit 1 (Step S201). Then, based on the degree of temporal changes in the power information, the time domain information analysis subunit 501 detects a start and an end of the speech made by the user (Step S202).

The conversation display information calculation subunit 503 maps/transforms power values acquired from the start through the end of the speech into a measurement indicating loudness of the voice (e.g., the length of the radius of the fan-shaped graphic, and the saturation of the fan-shaped graphic) (Step S204).

Meanwhile, the frequency domain information analysis subunit 502 analyzes the sound signal acquired from the data sensing unit 1 using FFT (Fast Fourier Transform) (Step S211), and performs cepstral analysis on the sound signal (Step S212). The frequency domain information analysis subunit 502 then calculates a pitch frequency from results of the analyses (Step S213), and calculates a spectral centroid (Step S214).

The conversation display information calculation subunit 503 maps/transforms the pitch frequency into a measurement (e.g., a distance between stripes of the fan-shaped graphic) indicating pitch of the voice uttered from the start through the end of the speech (Step S216). The conversation display information calculation subunit 503 also maps/transforms the spectral centroid into a measurement (e.g., a hue) indicating timbre of the voice uttered from the start through the end of the speech (Step S217).

The conversation display information calculation subunit 503 then outputs, to the positional relationship display unit 40, data pieces indicating the loudness, pitch and timbre of the voice acquired as a result of performing the above mapping/transformation (Step S218).

(2) Analysis on Conversation Activity Level of Group m

FIG. 28 shows operations performed by the sound information analysis unit 5 to analyze a conversation activity level of a group m. Although FIG. 28 exemplarily shows analysis on a conversation activity level of one group, the sound information analysis unit 5 periodically performs the same operations for all the groups.

In Steps S220 through S233, the time domain information analysis subunit 501 and the frequency domain information analysis subunit 502 repeats the processing of Steps S221 to S232 for all the users belonging to the group m. Although it has just been described that the processing of Steps S221 to S232 is repeated for all the users for the purpose of simplicity, the processing of Steps S221 to S232 may instead be performed in parallel for all the users.

Firstly, the time domain information analysis subunit 501 sequentially calculates power information from sound data acquired from the data sensing unit 1 (Step S221). Then, based on the degree of temporal changes in the power information, the time domain information analysis subunit 501 detects a start and an end of the speech made by the user (Step S222).

Next, the time domain information analysis subunit 501 calculates a speech frequency Nc based on the number of speeches made per unit of time (Step S223). Based on the speech duration per unit of time, the time domain information analysis subunit 501 further calculates a speech duration rate Rs and standard deviation Srs (Step S224).

The frequency domain information analysis subunit 502 analyzes the sound signal using FFT (Step S226), and performs cepstral analysis on the sound signal (Step S227). The frequency domain information analysis subunit 502 then calculates a pitch frequency based on results of the analyses (Step S228), and calculates a spectral centroid (Step S229).

Next, the frequency domain information analysis subunit 502 judges a type of the voice (i.e., normal sound, cheer/laughter, and silence) based on the cepstral analysis performed on the voice uttered from the start through the end of the speech, the start and the end of the speech being detected by the time domain information analysis subunit 501 (Step S231). Based on a result of the judgment, the frequency domain information analysis subunit 502 calculates a frequency Na of cheer/laughter periods per unit of time (Step S232).

Once the processing of Steps S221 to S232 has been repeatedly performed for all the users (Step S233), the time domain information analysis subunit 501 outputs the speech frequency Nc, the speech duration rate Rs, and the standard deviation Srs of the speech duration rate Rs, of each user.

The frequency domain information analysis subunit 502 also outputs a frequency Na of cheer/laughter periods per unit of time, of each user.

The group conversation actively level calculation subunit 504 calculates a conversation activity level Ag (m) of the group m based on the data pieces output from the time domain information analysis subunit 501 and the frequency domain information analysis subunit 502 (Step S236). The group conversation activity level calculation subunit 504 then (i) maps/transforms the conversation activity level Ag (m) of the group m per unit of time into a saturation or hue (Step S237), and (ii) outputs, to the positional relationship display unit 40, data indicating the saturation or hue that has been generated by performing the above mapping/transformation (Step S238).

3. Embodiment 3

Figure 29:
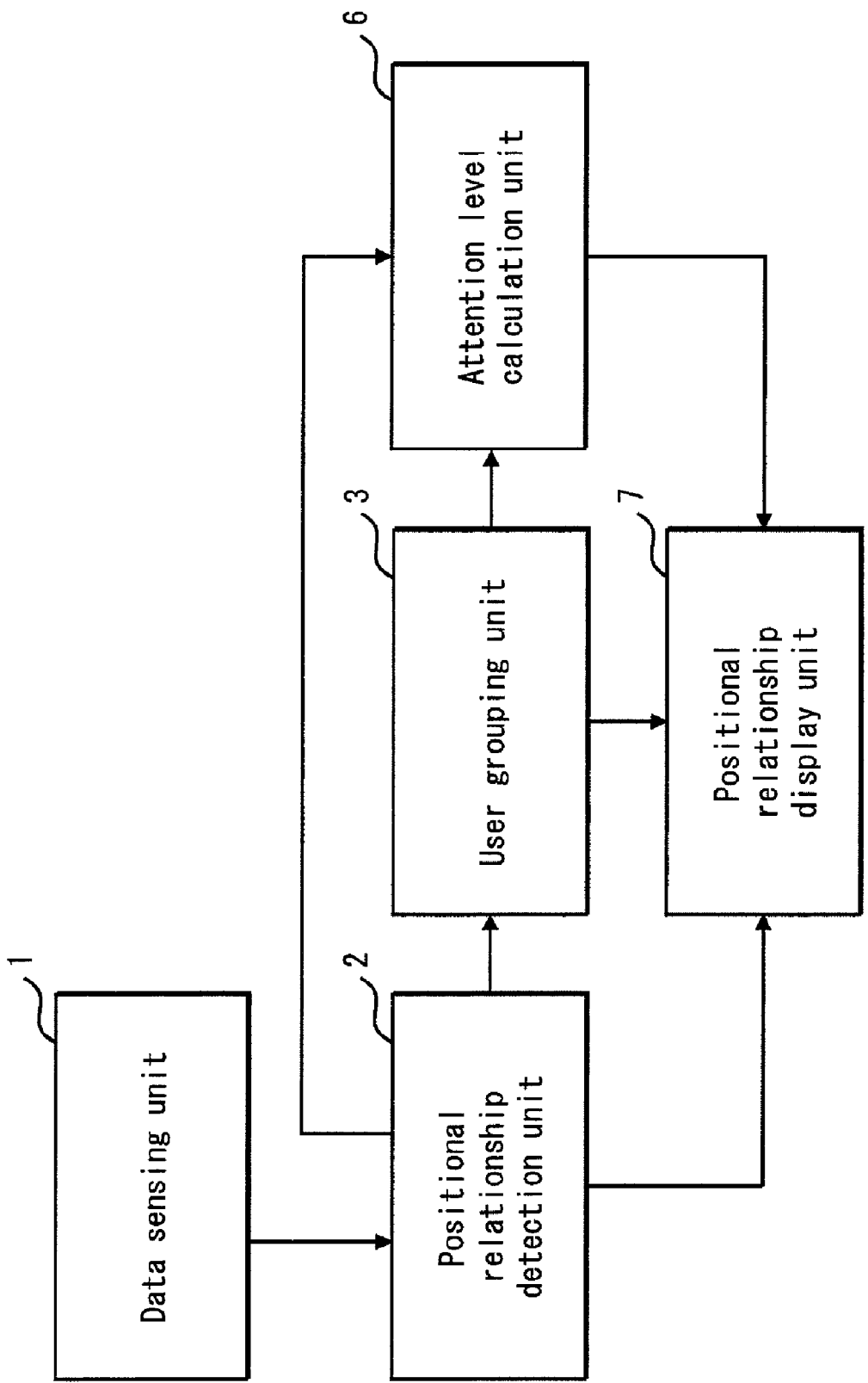
FIG. 29 is a functional block diagram of a system pertaining to Embodiment 3 of the present invention.

FIG. 29 is a block diagram of a system for, as is the case with Embodiment 1, picking up and displaying groups existing in a predetermined space based on the position of each user and the direction each user is facing. In addition, this system of Embodiment 3 visually expresses (i) a person/position that is attracting attention from the users, and (ii) an attention level indicating the level of attention the person/position is attracting from the users.

The system of Embodiment 3 groups a plurality of users existing in a certain area (e.g., in a room) into a plurality of groups, and displays the groups. Also, the system of Embodiment 3 enables an operator to acknowledge, in one glance, the object of the users' attention.

As a data sensing unit 1, a positional relationship detection unit 2, and a user grouping unit 3 constituting the system of Embodiment 3 are structured the same as their counterparts constituting the system of Embodiment 1, the descriptions thereof are omitted. The following description focuses on the features of the present embodiment.

3.1 Attention Level Calculation Unit 6

An attention level calculation unit 6 stores, in advance, angles of view of the sensors (in this case, cameras) worn by the users.

The attention level calculation unit 6 periodically acquires, from the positional relationship detection unit 2, the positions of the users and the directions the users are facing. Then, based on the acquired positions and directions of the users, the attention level calculation unit 6 calculates attention levels of predetermined positions, each attention level being a numerical value indicating to what extent a corresponding one of the predetermined positions is attracting attention from the users. Note, the positions and directions of the users that the attention level calculation unit 6 acquires from the positional relationship detection unit 2 are either (i) relative positions of the users in relation to one another, or (ii) relative positions of the users in relation to a sensor provided at a given location (both of which have been described in Embodiment 1). Here, as one example, the positions and directions of the users are expressed as coordinates on the xy-coordinate system that has been hypothetically determined with a position of one of the users serving as the origin. Similarly, each position to be the target of calculation of the attention level is also expressed as coordinates on the xy-coordinate system.

The attention level calculation unit 6 then categorizes the predetermined positions into a plurality of ranks according to the attention levels calculated therefor. Each time the attention level calculation unit 6 acquires a position/direction of a user, it calculates attention levels of the predetermined positions and categorizes the predetermined positions into a plurality of ranks.

The following describes procedures in which the attention level calculation unit 6 calculates attention levels and categories the predetermined positions into a plurality of ranks.

<Calculating Attention Level>

Based on the acquired positions/directions of the users and the acquired angles of view of the cameras, the attention level calculation unit 6 identifies one or more users wearing cameras whose angles of view include a predetermined position to be the target of calculation of the attention level (hereinafter, "calculation target position").

Figure 30A:
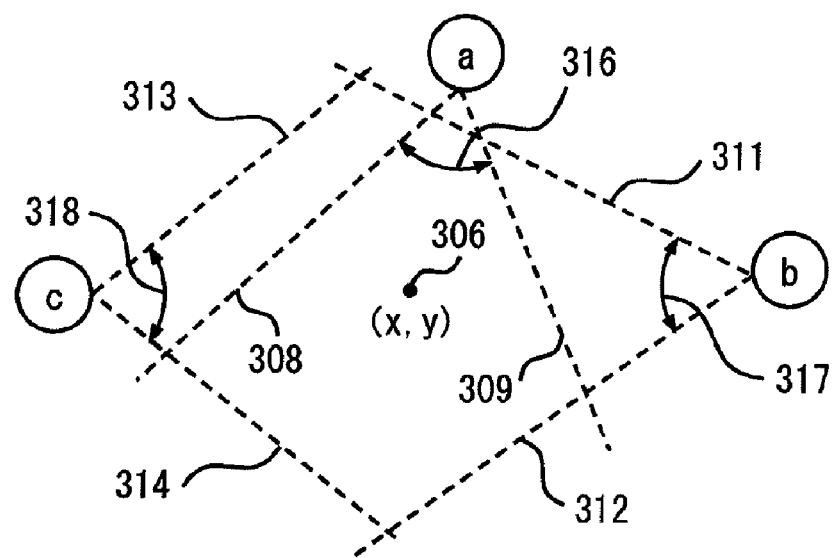
FIG. 30A shows (i) an attention level calculation target position 306 and (ii) a positional relationship between users who are taking images of the calculation target position 306.

FIG. 30A shows (i) a predetermined calculation target position 306 and (ii) a positional relationship between all the users (users a, b and c) wearing cameras each of whose angles of view includes the calculation target position 306. The dotted lines in FIG. 30A show ranges of scenes that can be imaged by the cameras worn by the users. An angle 316 between the dotted lines 308 and 309 is the angle of view of the camera worn by the user a. An angle 317 between the dotted lines 311 and 312 is the angle of view of the camera worn by the user b. An angle 318 between the dotted lines 313 and 314 is the angle of view of the camera worn by the user c.

Figure 30B:
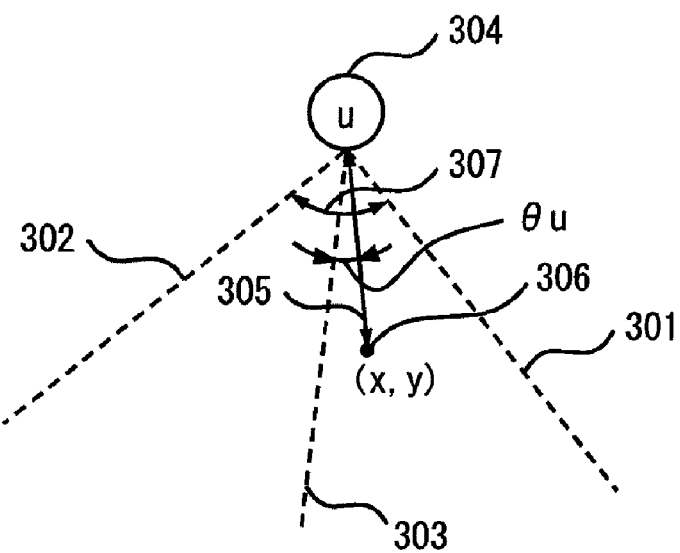
FIG. 30B shows (i) a positional relationship between a user u and the calculation target position 306 and (ii) data pieces relating to calculation of the attention level.

FIG. 30B shows a positional relationship between (i) the calculation target position (x, y) 306 and (ii) a user u 304 (u=a, b, or c) wearing a camera whose angle of view includes the calculation target position (x, y) 306. The dotted lines 301 and 302 show a range of a scene that can be imaged by the camera worn by the user u 304. An angle 307 between the dotted lines 301 and 302 is the angle of view of this camera. The dotted line 303 is a bisector of the angle 307.

It is presumed that the closer the calculation target position 306 is to the user u 304 and to the dotted line 303 extending in the direction the user u 304 is facing, the more attention the calculation target position 306 is attracting from the user u 304. That is to say, an attention level Pu at which the user u 304 pays attention to the calculation target position 306 relies upon (i) the length of the line 305 connecting between the calculation target position 306 and the user u 304, and (ii) an angle θu between the line 305 and the dotted line 303.

As one example, the attention level Pu can be acquired by using the following (Equation 3).

< Expression 3 >

$$Pu(x, y) = a \cdot \exp\left\{-\frac{(x - xu)^2 + (y - yu)^2}{b}\right\} \cdot \exp\left(-\frac{\theta u^2}{c}\right) \quad \text{(Equation 3)}$$

$(a > 0, b > 0, c > 0)$

In the above (Equation 3), (xu, yu) represents coordinates indicating the position of the user u 304 at a time t. Also, in the above (Equation 3), each of a, b, and c is a positive constant, and the following relationship is satisfied: $-\pi < \theta u < \pi$.

The same calculation is performed for each of the users a, b, and c. The sum of Pa (x, y), Pb (x, y), and Pc (x, y), namely P (x, y), is the attention level of the calculation target position (x, y) 306.

The following (Equation 4) is one example of equations for calculating an attention level P (x, y).

< Expression 4 >

$$P(x, y) = \omega n \sum_{u=1}^{n} Pu(x, y) \quad \text{(Equation 4)}$$

In the above (Equation 4), n is the total number of users wearing cameras each of whose angles of view includes the calculation target position 306 (in the example of FIG. 30A, n is 3), u represents a number assigned to a user wearing a camera whose angle of view includes the calculation target position 306 (e.g., "u=1" indicates the user a), and on is a variable that varies in accordance with n.

Note, if no camera is imaging the calculation target position (x, y) (i.e., if n=0), then P (x, y)=0.

In order to moderate flicker on the screen that occurs due to a user training his/her eyes on a different object (e.g., rapidly looking away), an integrated value calculated by using the following (Equation 5) may be used as the attention level, instead of a value calculated by using the above (Equation 4).

< Expression 5 >

$$E(x, y) = \int_{t-T}^{t} P(x, y) dt \quad \text{(Equation 5)}$$

The above (Equation 3), (Equation 4) and (Equation 5) are merely examples. These equations may be replaced with other calculation formulae, as long as the other calculation formulae lead to the following relationship: the smaller the absolute values of the length of the line 305 and the angle θu, the higher the attention level.

In the above-described procedures, an attention level P (x, y) is calculated for each of calculation target positions on the xy-plane. The calculation target positions, the number of the calculation target positions, and a distance between one calculation target position and another calculation target position are predetermined. For example, the calculation target positions may be predetermined to be 0.2 meter away from one another in the x and y directions, with one of the calculation target positions located on the origin; in this case, the calculation target positions form a square lattice. Alternatively, the calculation target positions, the number of the calculation target positions, and a distance between one calculation target position and another calculation target position may be calculated as needed, in accordance with the size of an area (e.g., a room) in which the users exist and the total number of the users. Alternatively, the attention level calculation unit 6 may receive, from the operator of the system, an input specifying the calculation target positions.

<Ranking Calculation Target Positions>

Prestored in the attention level calculation unit 6 are threshold values th1, th2, th3 . . . (th1>th2>th3 . . . >thm, where m is a natural number).

The attention level calculation unit 6 compares the value of each of the calculated attention levels A (x, y) to the threshold values th1, th2, th3 . . . , and ranks each of the calculation target positions in accordance to the attention level thereof. For example, the attention level calculation unit 6 categorizes (i) any calculation target position satisfying the relationship A≧th1 into rank 1, (ii) any calculation target position satisfying the relationship th1>A≧th2 into rank 2, and (iii) any calculation target position satisfying the relationship th2>A≧th3 into rank 3. The attention level calculation unit 6 then outputs, to the positional relationship display unit, (i) rank information pieces that respectively indicate ranks of the calculation target positions, in one-to-one correspondence with (ii) coordinates of the calculation target positions belonging to the respective ranks. However, it should be noted here that as an exception, the attention level calculation unit 6 does not output coordinates of the calculation target positions satisfying the relationship thm>A to the positional relationship display unit 7.

3.2 Positional Relationship Display Unit 7

The structure of the positional relationship display unit 7 is substantially the same as the structure shown in FIG. 4 (pertaining to Embodiment 1). Hence, descriptions of features of the structure of the positional relationship display unit 7 that are shown in FIG. 4 are omitted. A description is now given of an allocation display calculation subunit, which is different from its counterpart shown in FIG. 4.

As is the case with Embodiment 1, the allocation display calculation subunit calculates display sizes/positions of the areas on the screen to each of which the corresponding group is allocated, and display sizes/positions of the groups, based on information pieces received from the positional relationship detection unit 2 and functional components of the positional relationship display unit 7.

Furthermore, the allocation display calculation subunit receives, from the attention level calculation unit 6, (i) the rank information pieces each of which indicates a different one of ranks, and (ii) coordinates indicating positions of the calculation target positions belonging to respective ranks shown by the rank information pieces.

Upon receiving the above information pieces, the allocation display calculation subunit converts all the received coordinates on the xy-coordinate system into coordinates on the XY-coordinate system, by using the conversion matrix generated by the reference axis setting subunit.

Next, the allocation display calculation subunit calculates display positions of the calculation target positions. The allocation display calculation subunit also assigns the same color to all of the display positions of the calculation target positions belonging to the same rank.

The screen display subunit displays the users belonging to the groups, the on-screen partitions and the calculation target positions, in their respective display positions calculated by the allocation display calculation subunit. At this time, the screen display subunit displays each of the calculation target positions in the color that has been assigned thereto.

Figure 31:
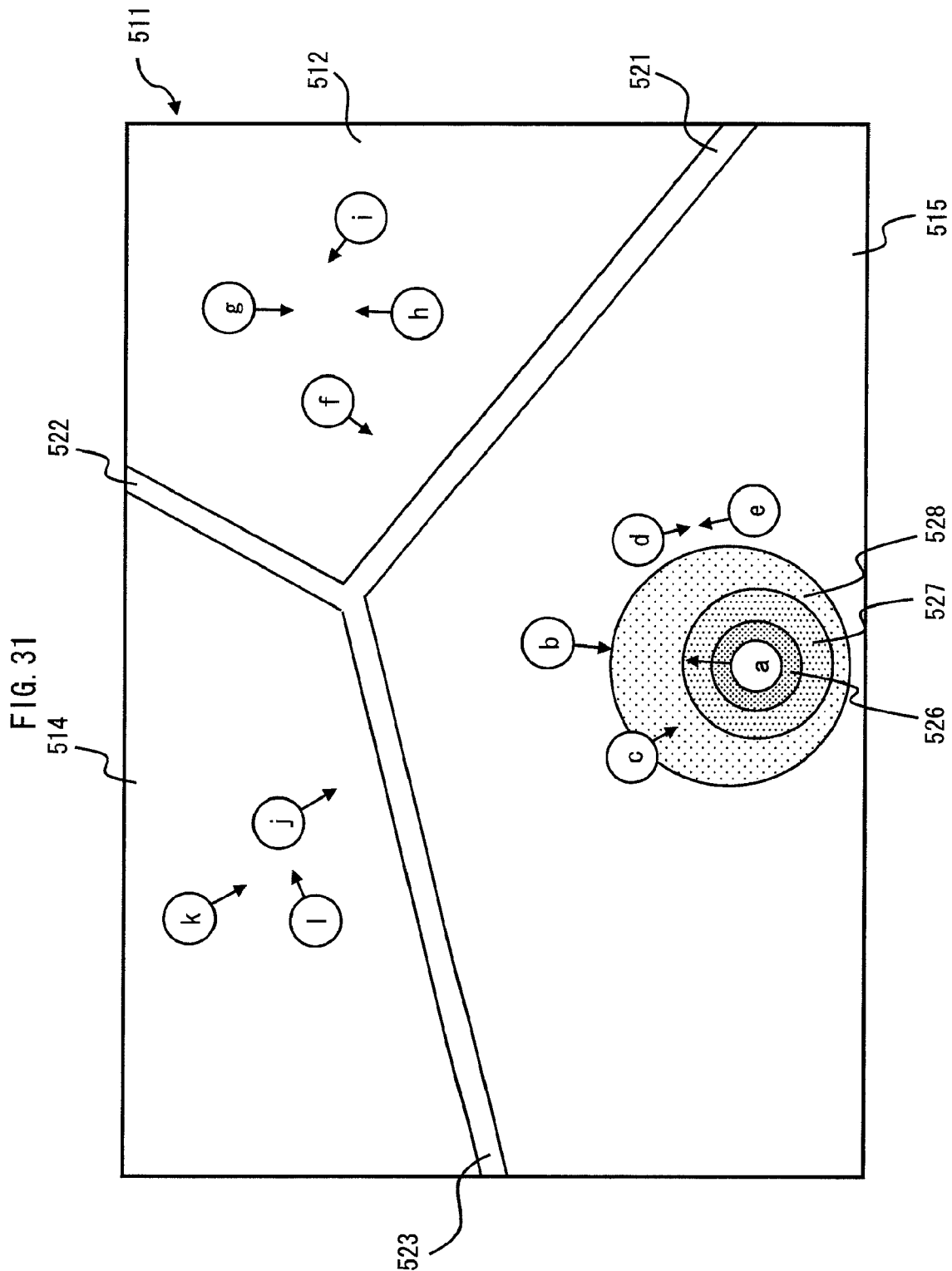
FIG. 31 exemplarily shows a screen to be displayed, the screen reflecting a result of calculation performed by an attention level calculation unit 6.

FIG. 31 exemplarily shows a screen to be displayed by the screen display subunit. Referring to FIG. 31, a screen 511 is partitioned into areas 512, 514 and 515 by on-screen partitions 521, 522 and 523. A group constituted from users a, b, c, d and e is shown in the area 515. A group constituted from users f, g, h and i is shown in the area 512. A group constituted from users j, k and l is shown in the area 514. Each arrow shown in FIG. 31 indicates a direction in which a corresponding one of the users is looking.

Currently, the vicinity of the user a is attracting attention from many users. An area 526, which includes the user a, is an area of rank 1 that is receiving the highest attention and thus shown in the darkest color. An area 527 is an area of rank 2 that is receiving the second highest attention and shown in a color that is slightly less dark than the color of the area 526. An area 528 is an area of rank 3 that is receiving the third highest attention and shown in a color that is slightly less dark than the color of the area 527.

3.4 Operations of Attention Level Calculation Unit 6

Figure 32:
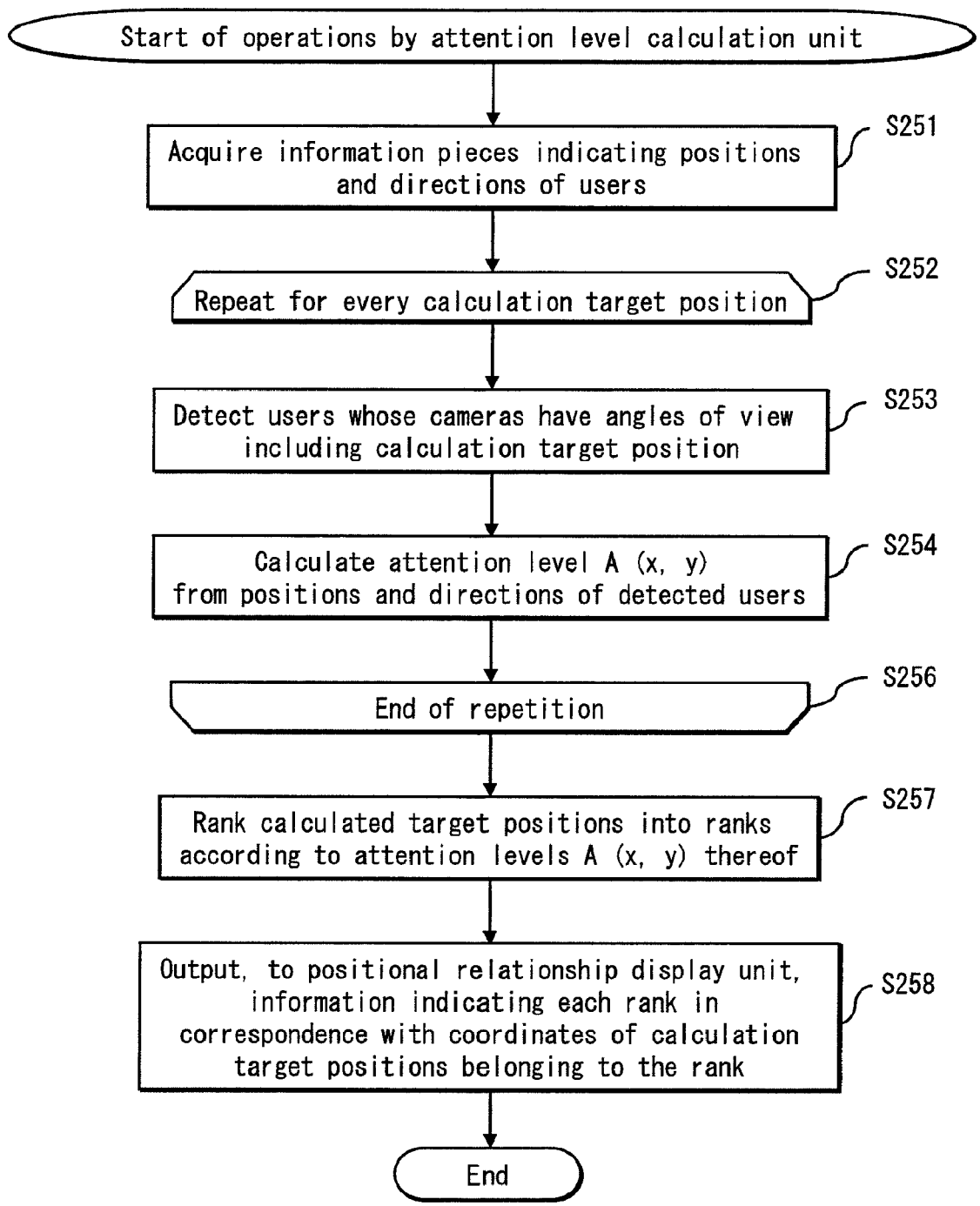
FIG. 32 is a flowchart of operations of the attention level calculation unit 6.

FIG. 32 is a flowchart of operations performed by the attention level calculation unit 6. The attention level calculation unit 6 periodically or sequentially repeats a series of operations shown in FIG. 32. The following describes the operations performed by the attention level calculation unit 6 with reference to FIG. 32.

Firstly, the attention level calculation unit 6 acquires, from the positional relationship detection unit 2, information pieces indicating the positions of the users and information pieces indicating the directions the users are facing (Step S251).

In Steps S252 through S256, the attention level calculation unit 6 repeatedly performs the processing from Steps S253 to S254 for all of the calculation target positions.

The attention level calculation unit 6 detects one or more users whose cameras each have an angle of view including a calculation target position (x, y) (Step S253). Based on the positions of the detected users, the directions the detected users are facing, and the like, the attention level calculation unit 6 calculates an attention level A (x, y) (Step S254).

Once the processing of Steps S253 and S254 has been performed for all of the calculation target positions (Step S256), the attention level calculation unit 6 ranks each of the calculation target positions into a corresponding one of ranks (Step S257). Then, for each rank, the attention level calculation unit 6 associates (i) the rank information piece indicating the rank with (ii) coordinates of the calculation target positions belonging to the rank. Thereafter, the attention level calculation unit 6 outputs, to the positional relationship display unit 7, the rank information piece indicating each rank in correspondence with the coordinates of the calculation target positions belonging to the rank (Step S258).

3.5 Additional Notes to and Modifications of Embodiment 3

(1) In Embodiment 3, attention levels are calculated for a plurality of positions that are evenly scattered in the entirety of a predetermined area (e.g., a room). An attention level, however, is not limited to being calculated in such a manner.

For example, an attention level may be calculated for the vicinity of each group detected by the user grouping unit. In this case, for instance, the attention level calculation unit 6 firstly calculates, for each group, (i) a centroid c' and (ii) a radius r' of the smallest circle including all the users belonging to the group.

Secondly, the attention level calculation unit 6 calculates, for each group, an attention level of a circular area having a radius of (r'+n) from the centroid c' to its perimeter (here, n may be an arbitrary constant, or a variable that varies in accordance with the radius r' and the number of users belonging to the group).

Finally, the attention level calculation unit 6 regards an arbitrary position within each circular area as a calculation target position.

(2) In Embodiment 3, the attention level calculation unit 6 ranks each calculation target position into a corresponding one of ranks according to its attention level calculated; on the screen to be displayed as a result of such ranking, the calculation target positions belonging to the same rank are displayed in the same color. However, instead of thus discretely ranking each calculation target position into the corresponding one of ranks, the attention level calculation unit 6 may be configured to change the darkness and saturation of a color in proportion to the value of each attention level calculated.

(3) In Embodiment 3, an attention level is calculated only in accordance with a positional relationship between (i) the position of a camera that is imaging a calculation target position and (ii) the calculation target position. Alternatively, an attention level may be calculated in the following procedure while assuming that the object of attention is likely to be any of the positions of users.

An attention level E is acquired by adding (i) P (x, y), which has been described in Embodiment 3, to (ii) a term Q (x, y), which indicates effects that the users existing in the vicinity of a calculation target position (x, y) has on the calculation target position (x, y).

In this case, the attention level calculation unit 6 identifies one or more cameras whose angles of view each include the calculation target position (x, y). Based on the identified cameras, the attention level calculation unit 6 further identifies one or more users who are being imaged together with the calculation target position (x, y).

An effect Qu that one of the identified users (a user u) has on the calculation target position (x, y) is calculated by, for example, using the following (Equation 6).

< Expression 6 >

$$Qu(x, y) = d \cdot \exp\left\{-\frac{(x - xu)^2 + (y - yu)^2}{e}\right\} \cdot \exp\left(-\frac{\phi u^2}{f}\right) \quad \text{(Equation 6)}$$

$$(d > 0, e > 0, f > 0)$$

In the above (Equation 6), (xy, yu) represents coordinates indicating the position of the user u, and $\phi u$ represents an angle between (i) a line extending in the direction the user u is facing and (ii) a line connecting between the position of the user u and the calculation target position (x, y) ($-\pi < \phi u < \pi$). Each of d, e, and f is a positive constant.

Next, the attention level calculation unit 6 calculates effects Q (x, y) that all of the identified users have on the calculation target position (x, y), by using the following (Equation 7).

< Expression 7 >

$$Q(x, y) = \omega m \sum_{u=1}^{m} Qu(x, y) \quad \text{(Equation 7)}$$

In the above (Equation 7), m represents the total number of users who are being imaged together with the calculation target position (x, y), u represents a variable for counting the number of users who are being imaged together with the calculation target position (x, y), and $\omega m$ is a variable that varies in accordance with m.

Note, if m=0, then Q (x, y)=0.

Next, by using P and Q calculated using the above Equations, the attention level calculation unit 6 calculates an attention level E (x, y) of the calculation target position (x, y).

$$E(x,y) = P(x,y) + Q(x,y)$$

In order to moderate flicker on the screen that occurs due to a user training his/her eyes on a different object (e.g., rapidly looking away), an integrated value calculated by using the following (Equation 8) may be used as the attention level E (x, y), instead of a value calculated by using the above (Equation 7).

< Expression 8 >

$$E(x, y) = \int_{t-T}^{t} P(x, y) + Q(x, y)dt \quad \text{(Equation 8)}$$

(4) In Embodiment 3, the attention level calculation unit 6 calculates an attention level for each of the calculation target positions on the coordinate plane. Alternatively, the attention level calculation unit 6 may calculate an attention level as a value indicating to what extent each user in the room is attracting attention from other users.

In this case, each calculation target position is a position of a corresponding one of users.

Therefore, an attention level E (xj, yj) of a user j (a calculation target user) can be acquired by substituting coordinates (xj, yj) indicating the position of the calculation target user j into the above (Equation 4).

The attention level calculation unit 6 then compares the calculated attention level Ej to a predetermined threshold value Th. When the relationship Eu≧Th is satisfied, the attention level calculation unit 6 outputs, to the positional relationship display unit 7, user identification information indicating the calculation target user j.

The allocation display calculation subunit of the positional relationship display unit 7 receives the user identification information from the attention level calculation unit 6. Upon receiving the user identification information, the allocation display calculation subunit assigns, to the user indicated by the received user identification information, an on-screen display format that is different from on-screen display formats assigned to other users. For example, the user indicated by the received user identification information may be assigned an icon having a different shape/size than icons assigned to other users, or may be assigned a color that is different from colors assigned to other users.

(5) In Embodiment 3 and in the above modification examples, an attention level is calculated for each of calculation target users, assuming that the calculation target users are respectively staying in predetermined positions. Alternatively, an attention level may be calculated for a moving calculation target user j, assuming that the attention level of the calculation target user j is to be accumulated over time.

Figure 33:
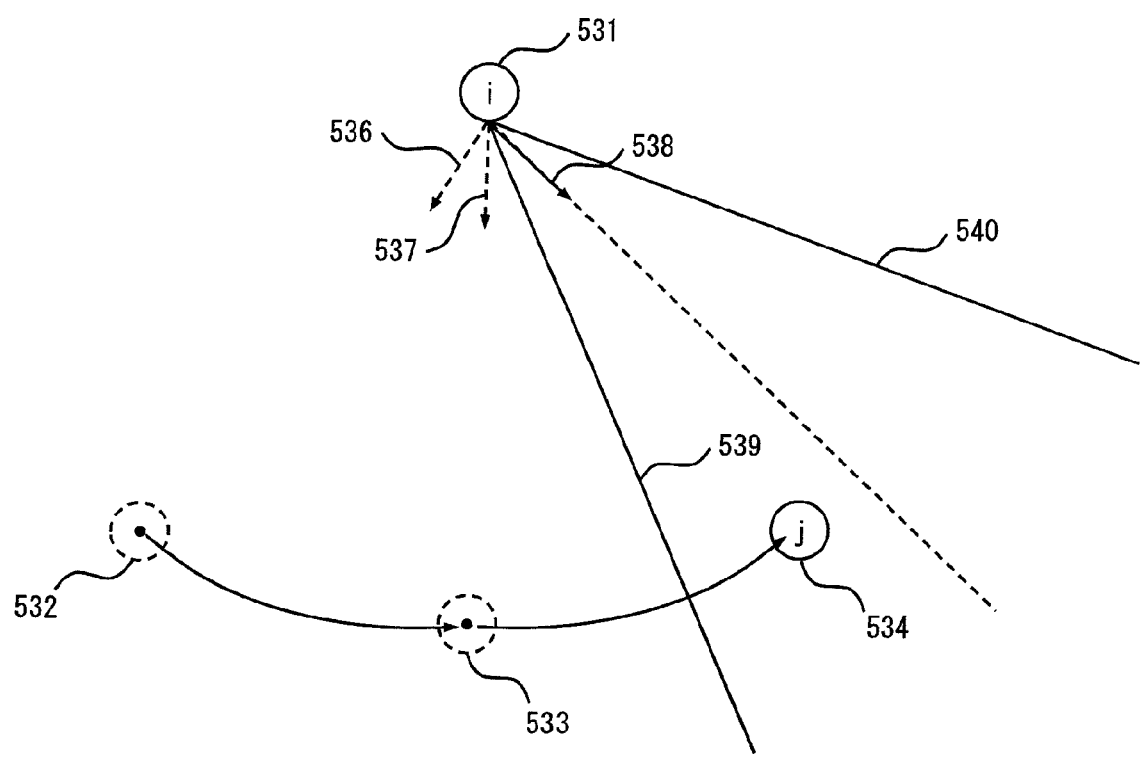
FIG. 33 shows movements of users i and j.

For example, as shown in FIG. 33, the calculation target user j is moving from a position 532 to a position 534, passing through a position 533.

A user i at a position 531 is paying attention to the calculation target user j. The user i changes the direction that his/her body faces in accordance with the movement of the calculation target user j. More specifically, the direction that the body of the user i faces changes from a direction 536 to a direction 537, and then from the direction 537 to a direction 538. Straight lines 539 and 540 show a range of a scene that can be imaged by a camera worn by the user at a time when the user j is at the position 534.

In the aforementioned case where the calculation target user j is moving, an attention level Ej at which the calculation target user j attracts attention from another user can be calculated by, for example, using the following (Equation 9).

< Expression 9 >

$$Ej = \omega n \sum_{i=1}^{n} \int_{tij}^{t} P(xj, yj) dt \quad \text{(Equation 9)}$$

In the above (Equation 9), a variable n represents the total number of users who are paying attention to the calculation target user j; more specifically, the variable n represents the number of users whose cameras each have an angle of view including the calculation target user j. Also, in the above (Equation 9), tij indicates a time at which the calculation target user j entered the angle of view of the camera worn by the user i, and ωn is an arbitrary constant determined by the variable n.

In the above manner, the attention level calculation unit 6 can calculate an attention level at which the calculation target user j attracts attention from another user, even when the calculation target user j is moving.

The attention level calculation unit 6 then compares the calculated attention level Ej to a predetermined threshold value Th, and when the relationship Ej≧Th is satisfied, outputs user identification information indicating the user j (a subject that is being imaged) to the positional relationship display unit 7.

The allocation display calculation subunit of the positional relationship display unit 7 receives the user identification information from the attention level calculation unit 6. Upon receiving the user identification information, the allocation display calculation subunit assigns, to the user indicated by the received user identification information, an on-screen display format that is different from on-screen display formats assigned to other users. For example, the user indicated by the received user identification information may be assigned an icon having a different shape/size than icons assigned to other users, or may be assigned a color that is different from colors assigned to other users.

4. Other Modification Examples

Although the present invention has been described based on the above embodiments, it goes without saying that the present invention is not limited to the above embodiments. Cases such as the following are included in the present invention.

(1) In Embodiments 1 to 3 and the modification examples thereof, the positional relationship display unit may further have the following functions.

The positional relationship display unit may further comprise an input subunit (i.e., a touchscreen, a mouse, and a keyboard) that receives an operation from an operator. For example, when the operator selects one of the users while each group is being displayed by the screen display subunit, the allocation display calculation subunit acquires, from the data sensing unit, an image taken by a camera worn by the selected user, and outputs the acquired image to the screen display subunit. The screen display subunit creates a pop-up window on the screen that is currently being displayed, and displays the acquired image in the pop-up window.

Figure 34:
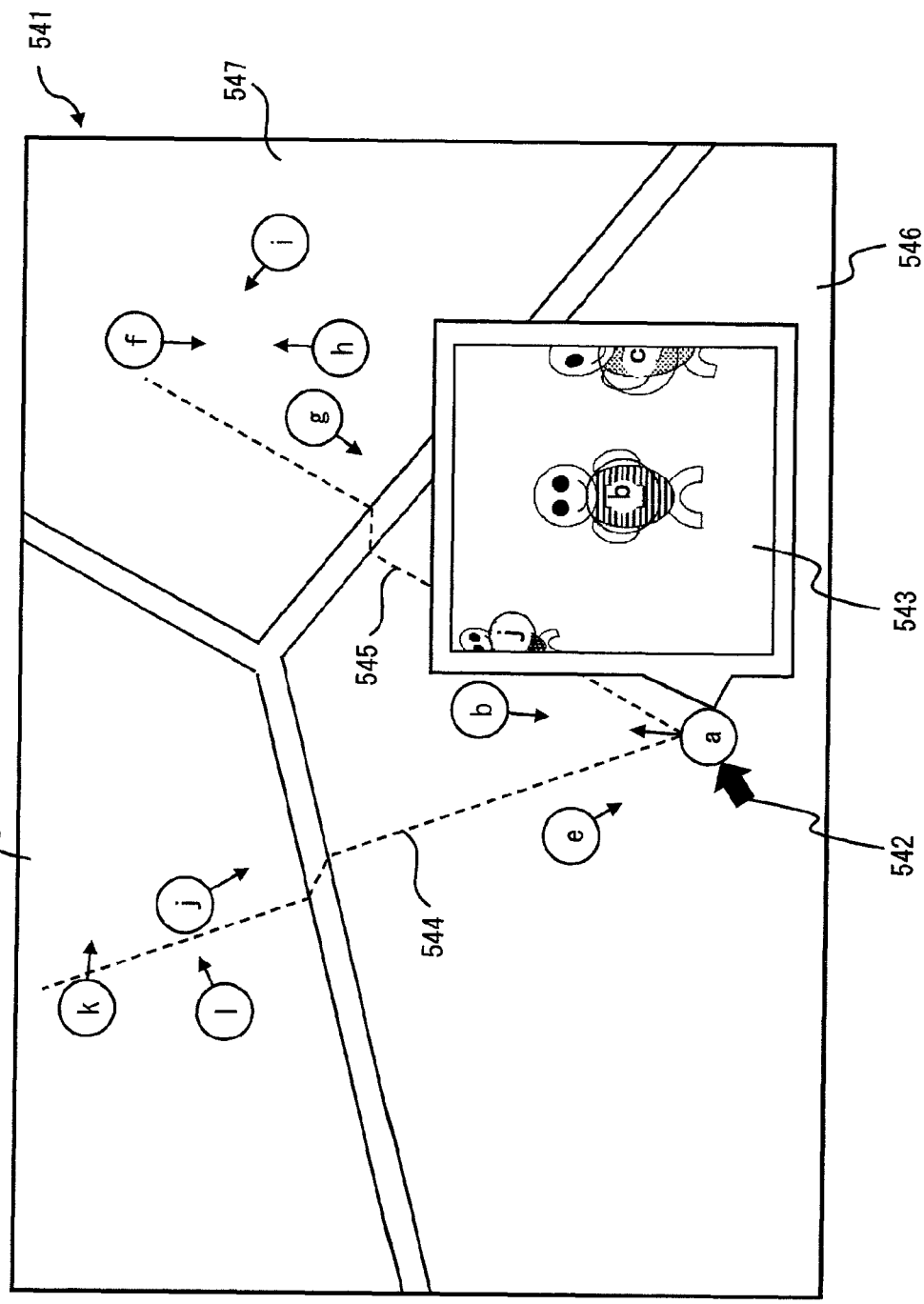
FIG. 34 exemplarily shows a screen to be displayed in a modification example (1)

FIG. 34 shows an example of the screen to be displayed as a result of the above processing. On a screen 541, each of the users that constitute a plurality of groups is displayed in a corresponding one of areas 546, 547 and 548. Each arrow shown in FIG. 34 indicates a direction a corresponding one of the users is facing. Via the input subunit, the operator has moved a cursor 542 and selected the user a. Once the user a has been selected, the screen display subunit creates, on the screen that is currently being displayed, a pop-up window in the vicinity of the user a, and displays, in the pop-up window, an image 543 taken by a camera worn by the user a. Dotted lines 544 and 545 show a range of a scene that can be imaged by the camera worn by the user a.

(2) In addition to the above modification example (1), the screen display subunit may display, from among all the images taken by cameras worn by the users, one or more images that have captured one of the users selected by the operator.

To be more specific, the allocation display calculation subunit identifies one or more users wearing cameras whose angles of view include the selected user, based on the positions/directions of the users and the angles of view of the cameras. Then, the allocation display calculation subunit acquires, from the data sensing unit, images taken by the cameras worn by the identified users, and outputs the acquired images to the screen display subunit. The screen display subunit creates pop-up windows on the screen that is currently being displayed, and displays each of the acquired images in a corresponding one of the pop-up windows.

Figure 35:
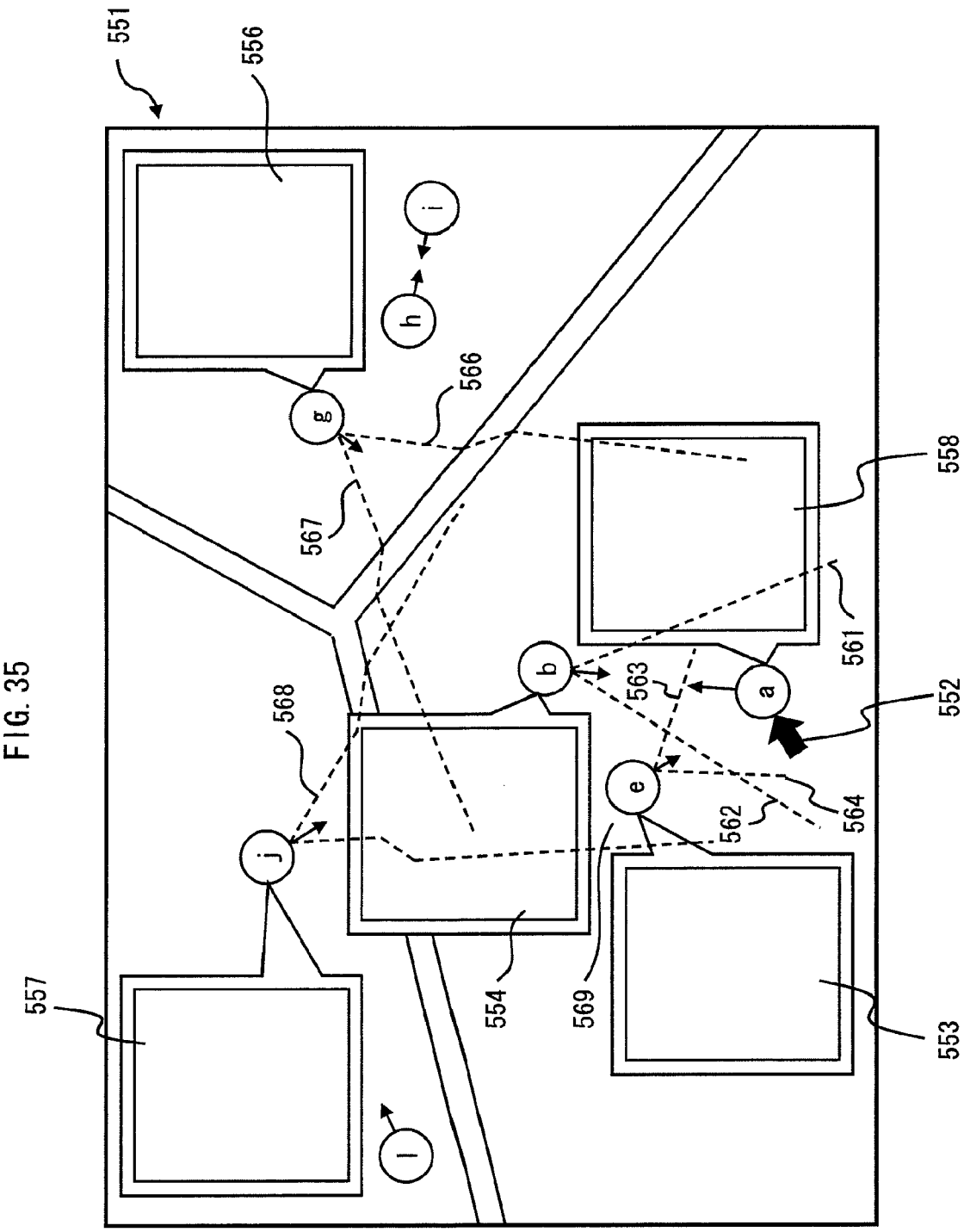
FIG. 35 exemplarily shows a screen to be displayed in a modification example (2)

FIG. 35 shows an example of a screen 551 to be displayed as a result of the above processing. Referring to FIG. 35, dotted lines 561 to 599 show ranges of scenes that can be imaged by cameras worn by uses b, e, g and j. The dotted lines 561 and 562 show a range of a scene that can be imaged by the camera worn by the user b. An angle between the dotted lines 561 and 562 is an angle of view of the camera worn by the user b. The dotted lines 563 and 564 show a range of a scene that can be imaged by the camera worn by the user e. The dotted lines 566 and 567 show a range of a scene that can be imaged by the camera worn by the user g. The dotted lines 568 and 569 show a range of a scene that can be imaged by the camera worn by the user j. It is apparent from the above that the angles of view of the cameras worn by the users b, e, g and j all include the position of the user a.

Via the input subunit, the operator has moved a cursor 552 and selected the user a. Once the user a has been selected, the screen display subunit creates a pop-up window, and displays an image 558, which was taken by the camera worn by the user a, in the pop-up window. Thereafter, the screen display subunit creates other pop-up windows, and displays images 553, 554, 556 and 557, which were respectively taken by the cameras worn by the users b, e, g and j, in a corresponding one of said other pop-up windows. Here, every one of the images 553, 554, 556 and 557 shows the user a.

(3) In the above modification examples (1) and (2), an image associated with a selected user is displayed in a pop-up window on the screen. However, an image associated with a selected user is not limited to being displayed in such a manner.

For example, in a case where the screen display subunit includes a plurality of display devices, or in a case where a plurality of images can be displayed in respective areas on a single screen by using a split screen technique, the positions of the users belonging to respective groups may be displayed on one of the display devices (or in one of the areas on the screen), whereas the image associated with the selected user may be displayed on another one of the display devices (or in another one of the areas on the screen).

Figure 36:
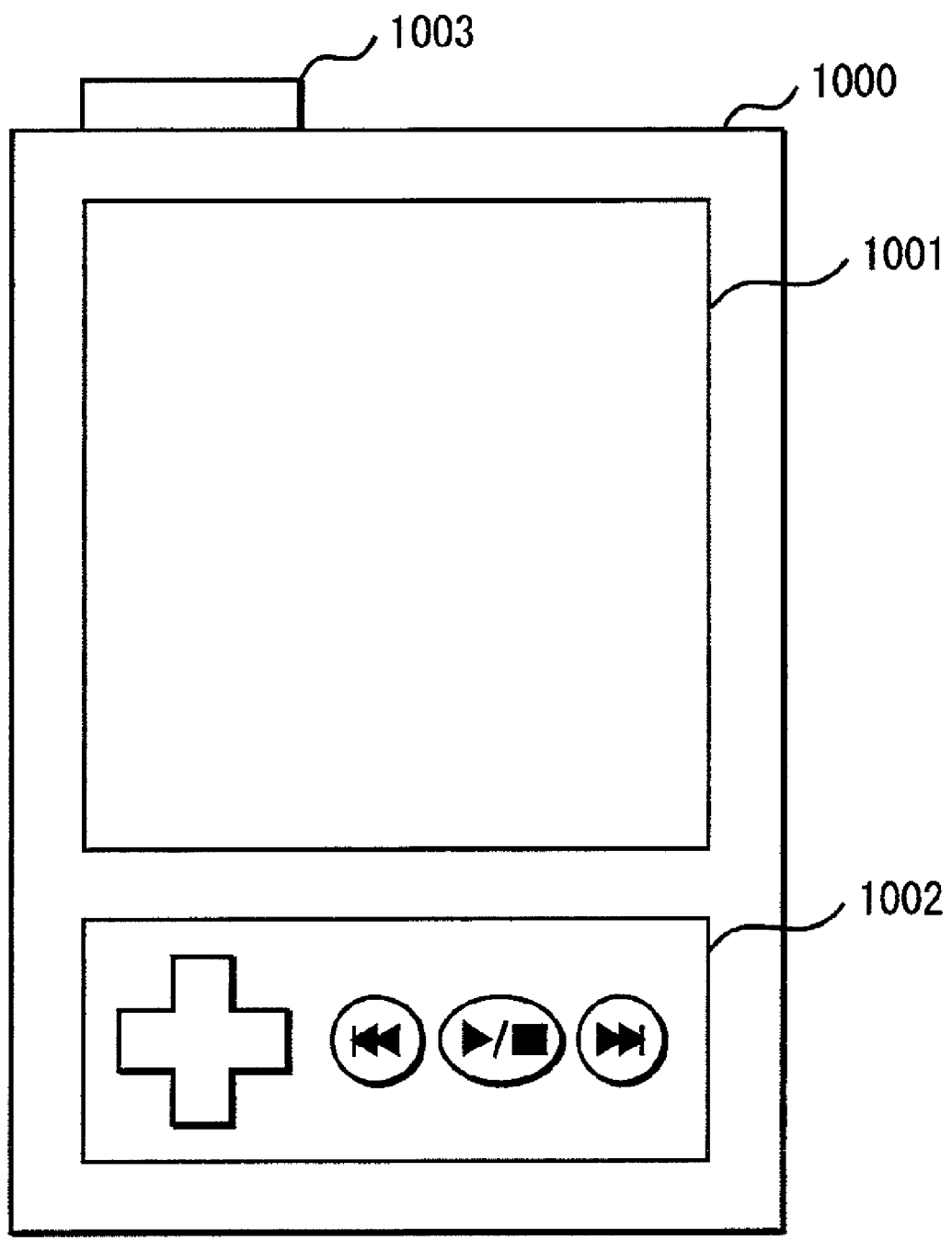
FIG. 36 exemplarily shows a device incorporating the system of the present invention.

(4) FIG. 36 shows an external appearance of a terminal device 1000, which is an example of a device incorporating the system explained in Embodiments 1 to 3 and the modification examples.

Specifically, the terminal device 1000 is a computer system constructed from a microprocessor, RAM, and ROM. Computer programs are stored in RAM and ROM. The terminal device 1000 realizes a part of its functions by the microprocessor operating in accordance with the computer programs.

The terminal device 1000 is composed of a display 1001, an input unit 1002, and a communication unit 1003.

The display 1001 is a display device constituting a screen display unit, and displays various types of images.

The input unit 1002 is composed of a plurality of buttons to be operated by an operator.

The communication unit 1003 has a wireless communication mechanism, and collects data pieces from sensors worn by users. The communication unit 1003 functions as the above-described data sensing unit.

The microprocessor and the computer programs provided in the terminal device 1000 realize the functions of the above-described positional relationship detection unit, user grouping unit, sound information analysis unit, attention level calculation unit, and positional relationship display unit.

The terminal device 1000 may have only a part of the functions of the system. For example, the data sensing unit and the positional relationship detection unit may be provided in a separate detection device. In this case, the terminal device 1000 may perform analyses and screen display by acquiring various information pieces, such as position information pieces of the users, from the detection device via the communication unit 1003.

The terminal device 1000 is not limited to being a special-purpose device dedicated to the system. The terminal device 1000 may be, for instance, a mobile telephone, a portable game console, and PDA.

Figure 37:
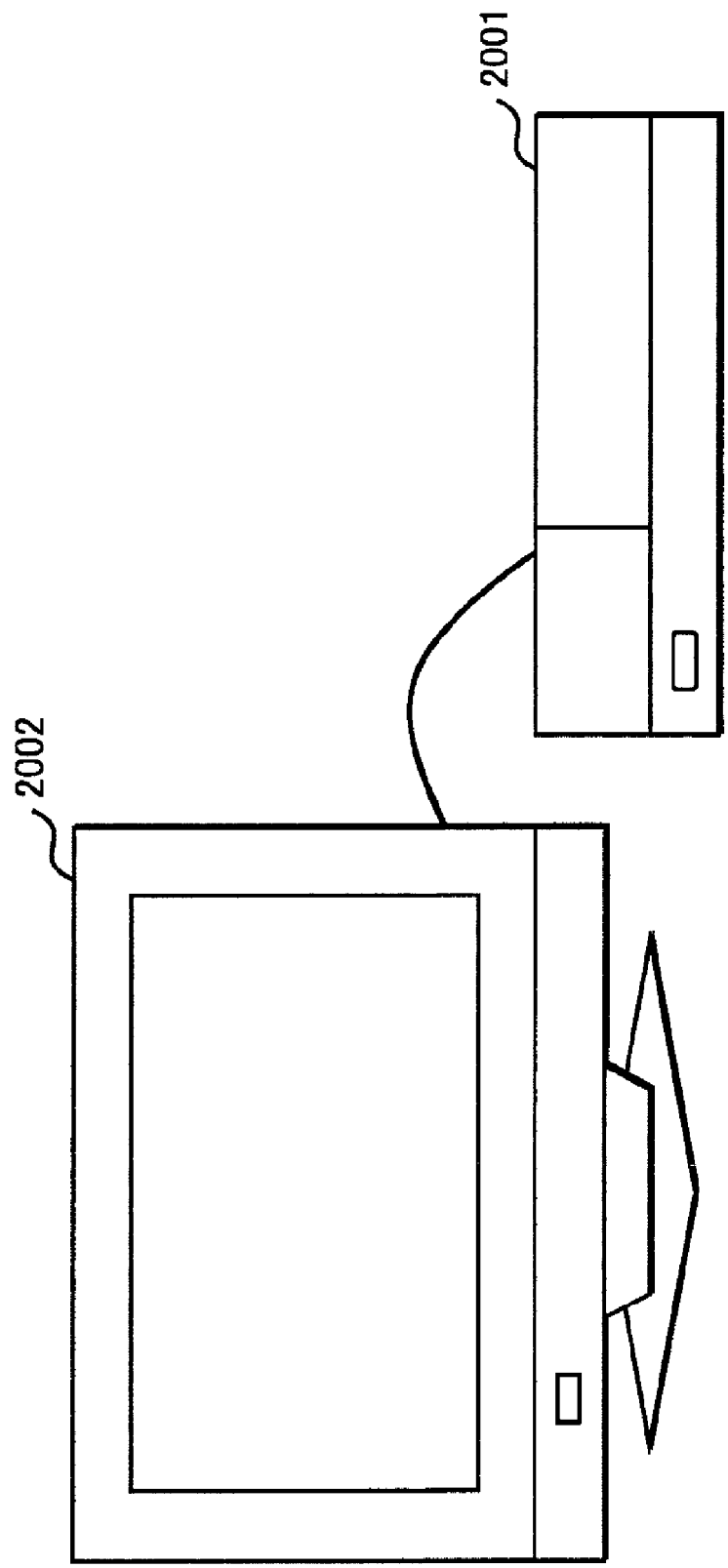
FIG. 37 exemplarily shows another device incorporating the system of the present invention.

(5) FIG. 37 shows another example of a device structure that realizes the system explained in the above embodiments and modification examples.

In the example of FIG. 37, the system is constructed from an STB (Set Top Box) device 2001, a TV device 2002, a controller (not illustrated), and a data sensing device (not illustrated).

The data sensing device (not illustrated) has the function of the data sensing unit, and acquires image data pieces, sound data pieces, and the like from sensors worn by users. The data sensing device outputs the acquired data pieces to the STB device 2001 via wireless communication.

The STB device 2001 is, for instance, an HDD recorder, a DVD recorder, and an audio component. Specifically, the STB device 2001 is a computer system constructed from a microprocessor, RAM, and ROM. Computer programs are stored in RAM and ROM. The STB device 2001 realizes a part of its functions by the microprocessor operating in accordance with the computer programs.

The STB device 2001 has most of the functions of the positional relationship detection unit, the user grouping unit, the sound information analysis unit, the attention level calculation unit and the positional relationship display unit, which are included in the system explained in the above embodiments.

The TV device 2002 is, for instance, PDP and LCD, and is connected to the STB device 2001. The TV device 2002 functions as the screen display subunit of the positional relationship display unit. That is, the TV device 2002 displays calculated positional relationships between the users, an image taken by a camera worn by a specified one of the users, and the like.

(6) The above embodiments and modification examples have described a technique for grouping a plurality of users (i.e., humans) existing in a predetermined area (e.g., a room) and displaying positional relationships between the users. However, the targets of such grouping and display of positional relationships are not limited to being humans, but may instead be vehicles (e.g., cars and bicycles), grazed livestock, wild animals, and the like.

(7) Also, the present invention is a user relationship display device, comprising: a user grouping unit operable to group a plurality of users into a plurality of groups based on information pieces relating to relationships between the users; and a user relationship display unit operable to arrange and display the groups on a screen based on information pieces relating to the groups extracted by the user grouping unit.

(8) The user relationship display device according to the above modification example (7) may further comprise a positional relationship detection unit operable to detect positional relationships between the users, wherein the user grouping unit groups the users into the groups based on information pieces relating to the positional relationships between the users detected by the positional relationship detection unit, and the user relationship display unit arranges the groups on the screen and displays a positional relationship between the users belonging to each group based on the information pieces relating to the groups extracted by the user grouping unit.

(9) The user relationship display unit of the user relationship display device according to the above modification example (8) may arrange and display the groups on the screen, in such a manner that a relationship between the groups extracted by the user grouping unit can be grasped.

(10) In the user relationship display device according to the above modification example (7) or (8), the user relationship display unit may display, on the screen, one or more partitions for separating the groups from one another, in such a manner that a relationship between the groups extracted by the user grouping unit can be grasped.

(11) The user relationship display unit according to the above modification example (7) or (8) may set sizes of areas on the screen to each of which a corresponding one of the groups is allocated, in accordance with the information pieces relating to the groups extracted by the user grouping unit.

(12) In the user relationship display device according to the above modification example (7) or (8), the user relationship display unit may display information that makes it possible to grasp differences between actual sizes of the groups extracted by the user grouping unit.

(13) The user relationship display device according to the above modification example (7) may further comprise: a positional relationship detection unit operable to detect positional relationships between the users; and a sound information analysis unit operable to analyze sound information pieces each indicating a sound made by a corresponding one of the users, wherein the user grouping unit groups the users into the groups based on information pieces relating to the positional relationships between the users detected by the positional relationship detection unit, and the user relationship display unit arranges the groups on the screen and visually displays a positional relationship between the users belonging to each group and a conversation status of each group based on the information pieces relating to the groups extracted by the user grouping unit.

(14) The sound information analysis unit of the user relationship display device according to the above modification example (13) may analyze time domain information and frequency domain information of each of the sound information pieces, and calculate a conversation activity level of each group based on the analyzed time domain information and frequency domain information of each of the sound information pieces.

(15) The user relationship display unit of the user relationship display device according to the above modification example (13) or (14) may display, for each group extracted by the user grouping unit, a physical characteristic of and temporal changes in a conversation made by each user belonging to the group, in such a manner that they can be visually grasped from the screen.

(16) The user relationship display unit of the user relationship display device according to the above modification example (13) or (14) may display, on the screen, a comprehensive conversation activity level of each group extracted by the user grouping unit, in such a manner that the comprehensive conversation activity level of one group can be compared to that of another group.

(17) The user relationship display unit of the user relationship display device according to the above modification example (13) or (14) may set sizes of areas on the screen to each of which a corresponding one of the groups is allocated, and select a display format in which the conversation statuses should be displayed on the screen, in accordance with the information pieces relating to the groups extracted by the user grouping unit.

(18) The present invention may also be a user relationship display method comprising: a user grouping step of grouping a plurality of users into a plurality of groups based on information pieces relating to relationships between the users; and a user relationship display step of arranging and displaying the groups on a screen based on information pieces relating to the groups extracted in the user grouping step.

(19) The present invention may also be a computer program for causing a user relationship display device to perform user relationship display processing, the computer program comprising: a user grouping step of grouping a plurality of users into a plurality of groups based on information pieces relating to relationships between the users; and a user relationship display step of arranging and displaying the groups on a screen based on information pieces relating to the groups extracted in the user grouping step.

(20) The present invention may also be an integrated circuit provided in a user relationship display device, the integrated circuit comprising: a user grouping unit operable to group a plurality of users into a plurality of groups based on information pieces relating to relationships between the users; and a user relationship display unit operable to arrange and display the groups on a screen based on information pieces relating to the groups extracted by the user grouping unit.

(21) The user relationship display method according to the above modification example (18) may further comprise a positional relationship detection step of detecting positional relationships between the users, wherein the user grouping step groups the users into the groups based on information pieces relating to the positional relationships between the users detected in the positional relationship detection step, and the user relationship display step arranges the groups on the screen and displays a positional relationship between the users belonging to each group based on the information pieces relating to the groups extracted in the user grouping step.

(22) The computer program according to the above modification example (19) may further comprise a positional relationship detection step of detecting positional relationships between the users, wherein the user grouping step groups the users into the groups based on information pieces relating to the positional relationships between the users detected in the positional relationship detection step, and the user relationship display step arranges the groups on the screen and displays a positional relationship between the users belonging to each group based on the information pieces relating to the groups extracted in the user grouping step.

(23) The integrated circuit according to the modification example (20) may further comprise a positional relationship detection unit operable to detect positional relationships between the users, wherein the user grouping unit groups the users into the groups based on information pieces relating to the positional relationships between the users detected by the positional relationship detection unit, and the user relationship display unit arranges the groups on the screen and displays a positional relationship between the users belonging to each group based on the information pieces relating to the groups extracted by the user grouping unit.

(24) The user relationship display method according to the above modification example (18) may further comprise: a positional relationship detection step of detecting positional relationships between the users; and a sound information analysis step of analyzing sound information pieces each indicating a sound made by a corresponding one of the users, wherein the user grouping step groups the users into the groups based on information pieces relating to the positional relationships between the users detected in the positional relationship detection step, and the user relationship display step arranges the groups on the screen and visually displays a positional relationship between the users belonging to each group and a conversation status of each group based on the information pieces relating to the groups extracted in the user grouping step.

(25) The computer program according to the above modification example (19) may further comprise: a positional relationship detection step of detecting positional relationships between the users; and a sound information analysis step of analyzing sound information pieces each indicating a sound made by a corresponding one of the users, wherein the user grouping step groups the users into the groups based on information pieces relating to the positional relationships between the users detected in the positional relationship detection step, and the user relationship display step arranges the groups on the screen and visually displays a positional relationship between the users belonging to each group and a conversation status of each group based on the information pieces relating to the groups extracted in the user grouping step.

The integrated circuit according to the above modification example (20) may further comprise: a positional relationship detection unit operable to detect positional relationships between the users; and a sound information analysis unit operable to analyze sound information pieces each indicating a sound made by a corresponding one of the users, wherein the user grouping unit groups the users into the groups based on information pieces relating to the positional relationships between the users detected by the positional relationship detection unit, and the user relationship display unit arranges the groups on the screen and visually displays a positional relationship between the users belonging to each group and a conversation status of each group based on the information pieces relating to the groups extracted by the user grouping unit.

(27) The above system is, specifically, a computer system composed of a microprocessor, ROM, RAM, a hard disk unit, a display unit, a keyboard, a mouse, and the like. Computer programs are stored in the aforementioned RAM, ROM, and hard disk unit. The system achieves its functions by the microprocessor operating according to the computer programs. Here, to achieve predetermined functions, the computer programs have been configured by combining a plurality of operation codes that are instructions issued to a computer.

(28) All or part of the compositional elements of the above system may be composed of one system LSI (Large Scale Integration or Integrated circuit). The system LSI is a super-multifunctional LSI on which a plurality of compositional units are manufactured integrated on one chip, and is specifically a computer system that includes a microprocessor, ROM, RAM, and the like. A computer program is stored in RAM. The system LSI achieves its functions by the microprocessor operating according to the computer program.

The units that are the compositional elements of the above system may be realized separately with individual chips, or part or all may be included on one chip. Here, the LSI may be an IC, a system LSI, a super LSI, or an ultra LSI, depending on the degree of integration.

Furthermore, the integration of circuits is not limited to being realized with LSI, but may be realized with a special-purpose circuit or a general-use processor. Alternatively, the integration may be realized with use of an FPGA (Field Programmable Gate Array) that is programmable after manufacturing of the LSI, or a re-configurable processor that enables re-configuration of the connection and settings of circuit cells in the LSI.

Furthermore, if technology for an integrated circuit that replaces LSIs appears due to advances in or derivations from semiconductor technology, that technology may be used for integration of the functional blocks. Bio-technology is one possible application.

(29) Part or all of the compositional elements of the above system may be composed of a removable IC card or a removable single module. The IC card or the module is a computer system composed of a microprocessor, ROM, RAM, or the like. The IC card or the module may include the aforementioned super-multifunctional LSI. The IC card or the module achieves its functions by the microprocessor operating according to a computer program. The IC card or the module may be tamper-resistant.

(30) The present invention may be methods shown by the above. Furthermore, the methods may be a computer program realized by a computer, and may be a digital signal representing the computer program.

Furthermore, the present invention may be a computer-readable recording medium such as a flexible disk, a hard disk, CD-ROM, MO, DVD, DVD-ROM, DVD-RAM, BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on an electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(8) The present invention may be any combination of the above-described embodiments and modification examples.

INDUSTRIAL APPLICABILITY

A user relationship display device of the present invention is a useful technique to construct an interface for properly displaying relationships between a plurality of users.

The invention claimed is:

1. A display device for visually displaying, on a display screen, positional relationships between a plurality of target objects, the display device comprising:
an acquisition unit operable to acquire position information pieces each of which indicates a position of a corresponding one of the target objects;
a categorization unit operable to categorize the target objects into a plurality of groups in accordance with the acquired position information pieces;
a calculation unit operable to calculate an inter-group positional relationship by using the acquired position information pieces, the inter-group positional relationship indicating a positional relationship between the groups;
a determination unit operable to determine one or more partitions by which the display screen is partitioned into a plurality of areas, each partition being tilted with respect to a reference axis in accordance with the calculated inter-group positional relationship, the reference axis being parallel to one of edges of the display screen; and
a display unit operable to display, in each of the areas partitioned by the one or more partitions on the display screen, a positional relationship between the target objects belonging to a corresponding one of the groups.

2. The display device of claim 1, wherein
the calculation unit further calculates (i) two group positions that respectively indicate positions of two of the groups, and (ii) an angle of tilt of a first straight line with respect to the reference axis, the first straight line being perpendicular to a second straight line connecting between the two group positions, and
the determination unit determines the one or more partitions so that one of the one or more partitions that is to be displayed between the two groups has the calculated angle of tilt with respect to the reference axis.

3. The display device of claim 1, wherein
the determination unit determines the one or more partitions so that a size of each area on the display screen is proportional to an areal size of the corresponding group.

4. The display device of claim 3, wherein
the inter-group positional relationship calculated by the calculation unit further indicates, for each pair of the groups, a distance therebetween, and
the determination unit determines the one or more partitions so that a width of each partition that is to be displayed between a corresponding one of the group pairs is proportional to the distance between the corresponding group pair.

5. The display device of claim 3, wherein
the display unit displays the positional relationship between the target objects belonging to each group at a different reduction ratio, and
the display unit further displays, in each area on the display screen, information indicating a reduction ratio at which the corresponding group is displayed.

6. The display device of claim 1, wherein
the categorization unit further calculates a distance between each pair of the target objects by using the position information pieces, and categorizes the target objects into the plurality of groups so that, in each group, the calculated distance between any pair of the target objects belonging to the group is smaller than a threshold value.

7. The display device of claim 1, wherein
the acquisition unit further acquires direction information pieces each of which indicates a direction that the corresponding target object is facing, and
the categorization unit further calculates a distance between each pair of the target objects by using the position information pieces, and categorizes the target objects into the plurality of groups so that the following conditions are both satisfied in each group: (i) the calculated distance between any pair of the target objects belonging to the group is smaller than a threshold value; and (ii) extended lines of the directions that the target objects belonging to the group are facing intersect with one another.

8. The display device of claim 1, further comprising:
a sound acquisition unit operable to acquire sound made by each target object; and
a sound information analysis unit operable to perform time-domain analysis and frequency-domain analysis on each sound acquired, wherein
the display unit further generates images respectively in accordance with results of the analyses made by the sound information analysis unit, and displays each image in one of the areas on the display screen where the corresponding target object is displayed.

9. The display device of claim 8, wherein
the sound information analysis unit further extracts, from each sound acquired, a characteristic thereof,
each of the results of the analyses made by the sound information analysis unit shows the characteristic of the sound made by the corresponding target object, and
the display unit further displays each image, which indicates the characteristic of the sound made by the corresponding target object, in one of the areas on the display screen where the corresponding target object is displayed.

10. The display device of claim 8, wherein
by using each sound acquired, the sound information analysis unit further generates, for each group, a conversation activity level indicating how actively conversations are made between the target objects belonging to the group,
each of the results of the analyses made by the sound information analysis unit shows the conversation activity level calculated for the corresponding group, and
the display unit further displays each image, which indicates the conversation activity level calculated for the corresponding group, in one of the areas on the display screen where the corresponding group is displayed.

11. The display device of claim 1, wherein
the acquisition unit further acquires direction information pieces each of which indicates a direction that the corresponding target object is facing,
the display device further comprises:
a calculation target position acquisition unit operable to acquire calculation target positions whose attention levels are to be respectively calculated, each attention level indicating to what extent a corresponding one of the calculation target positions is attracting attention from the target objects; and
an attention level calculation unit operable to calculate the attention level of each calculation target position in accordance with (i) the directions indicated by the direction information pieces and (ii) a distance between the calculation target position and each of the positions indicated by the position information pieces, and
the display unit further displays, on the display screen, the calculation target positions in such a manner that each calculation target position is highlighted according to the attention level thereof.

12. The display device of claim 11, wherein
each target object carries a camera,
the attention level calculation unit further identifies, for each calculation target position, at least one of the target objects whose camera has an angle of view including the calculation target position, and
the attention level of each calculation target position is higher as (i) the distance between the calculation target position and the at least one target object identified therefor is smaller, and (ii) an absolute value of an angle between (a) a bisector of the angle of view of the camera carried by the at least one target object and (b) a line connecting between the calculation target position and the at least one target object is smaller.

13. The display device of claim 11, wherein
the calculation target position acquisition unit acquires the positions of the target objects respectively as the calculation target positions.

14. The display device of claim 11, wherein
when each of the calculated attention levels is higher than a predetermined value, the display unit displays the corresponding calculation target position on the display screen in such a manner that the corresponding target position is highlighted.

15. The display device of claim 1, further comprising
a repetition control unit operable to cause the acquisition unit, the categorization unit, the calculation unit, the determination unit, and the display unit to respectively repeat the acquisition of position information pieces, the categorization of the target objects, the calculation of an inter-group positional relationship, the determination of one or more partitions, and the display of each partition, groups, and a positional relationship between the target objects belonging to each group.

16. A display method used in a display device for visually displaying, on a display screen, positional relationships between a plurality of target objects, the display method comprising:
    an acquisition step of acquiring position information pieces each of which indicates a position of a corresponding one of the target objects;
    a categorization step of categorizing the target objects into a plurality of groups in accordance with the acquired position information pieces;
    a calculation step of calculating an inter-group positional relationship by using the acquired position information pieces, the inter-group positional relationship indicating a positional relationship between the groups;
    a determination step of determining one or more partitions by which the display screen is partitioned into a plurality of areas, each partition being tilted with respect to a reference axis in accordance with the calculated inter-group positional relationship, the reference axis being parallel to one of edges of the display screen; and
    a display step of displaying, in each of the areas partitioned by the one or more partitions on the display screen, a positional relationship between the target objects belonging to a corresponding one of the groups.

17. A display program used in a display device for visually displaying, on a display screen, positional relationships between a plurality of target objects, the display program comprising:
    an acquisition step of acquiring position information pieces each of which indicates a position of a corresponding one of the target objects;
    a categorization step of categorizing the target objects into a plurality of groups in accordance with the acquired position information pieces;
    a calculation step of calculating an inter-group positional relationship by using the acquired position information pieces, the inter-group positional relationship indicating a positional relationship between the groups;
    a determination step of determining one or more partitions by which the display screen is partitioned into a plurality of areas, each partition being tilted with respect to a reference axis in accordance with the calculated inter-group positional relationship, the reference axis being parallel to one of edges of the display screen; and
    a display step of displaying, in each of the areas partitioned by the one or more partitions on the display screen, a positional relationship between the target objects belonging to a corresponding one of the groups.

18. A display device for visually displaying, on a display screen, positional relationships between a plurality of target objects, the display device comprising:
    an acquisition unit operable to acquire (i) position information pieces each of which indicates a position of a corresponding one of the target objects, and (ii) direction information pieces each of which indicates a direction that the corresponding target object is facing;
    a calculation target position acquisition unit operable to acquire calculation target positions whose attention levels are to be respectively calculated, each attention level indicating to what extent a corresponding one of the calculation target positions is attracting attention from the target objects;
    an attention level calculation unit operable to calculate the attention level of each calculation target position in accordance with (i) the positions indicated by the position information pieces and (ii) the directions indicated by the direction information pieces; and
    a display unit operable to display, on the display screen, (i) the positional relationships between the target objects and (ii) the calculation target positions in such a manner that the calculation target positions are highlighted according to the attention levels thereof.

19. The display device of claim 18, wherein
each target object carries a camera,
the attention level calculation unit further identifies, for each calculation target position, at least one of the target objects whose camera has an angle of view including the calculation target position, and
the attention level of each calculation target position is higher as (i) the distance between the calculation target position and the at least one target object identified therefor is smaller, and (ii) an absolute value of an angle between (a) a bisector of the angle of view of the camera carried by the at least one target object and (b) a line connecting between the calculation target position and the at least one target object is smaller.

20. The display device of claim 18, wherein
the calculation target position acquisition unit acquires the positions of the target objects respectively as the calculation target positions.

21. The display device of claim 18, wherein
when each of the calculated attention levels is higher than a predetermined value, the display unit displays the corresponding calculation target position on the display screen in such a manner that the corresponding target position is highlighted.

* * * * *